US011133953B2

(12) United States Patent
Shive et al.

(10) Patent No.: US 11,133,953 B2
(45) Date of Patent: Sep. 28, 2021

(54) SYSTEMS AND METHODS FOR HOME AUTOMATION CONTROL

(71) Applicants: Catherine Lois Shive, Menlo Park, CA (US); Dirk John Stoop, Menlo Park, CA (US)

(72) Inventors: Catherine Lois Shive, Menlo Park, CA (US); Dirk John Stoop, Menlo Park, CA (US)

(73) Assignees: Catherine Lois Shive, Palo Alto, CA (US); Dirk John Stoop, Palo Alto, CA (US)

(*) Notice: Subject to any disclaimer, the term of this patent is extended or adjusted under 35 U.S.C. 154(b) by 0 days.

(21) Appl. No.: 16/407,066

(22) Filed: May 8, 2019

(65) Prior Publication Data

US 2019/0349213 A1 Nov. 14, 2019

Related U.S. Application Data

(60) Provisional application No. 62/670,633, filed on May 11, 2018, provisional application No. 62/670,626, filed on May 11, 2018, provisional application No. 62/670,623, filed on May 11, 2018, provisional application No. 62/670,618, filed on May 11, 2018.

(51) Int. Cl.
*G05B 15/02* (2006.01)
*H04L 12/28* (2006.01)
*G06N 5/02* (2006.01)
*G05B 23/02* (2006.01)

(52) U.S. Cl.
CPC ............ *H04L 12/282* (2013.01); *G05B 15/02* (2013.01); *G05B 23/0229* (2013.01); *G06N 5/025* (2013.01); *H04L 12/2814* (2013.01); *H04L 12/2829* (2013.01)

(58) Field of Classification Search
None
See application file for complete search history.

(56) References Cited

U.S. PATENT DOCUMENTS 7,577,312 B2 8/2009 Sandrew
7,734,461 B2 6/2010 Kwak
2014/0098247 A1 4/2014 Rao
(Continued)

OTHER PUBLICATIONS

International Search Report and Written Opinion for International Application No. PCT/US2019/031519, dated Jul. 23, 2019.

*Primary Examiner* — Ryan A Jarrett
(74) *Attorney, Agent, or Firm* — Baker Botts L.L.P.

(57) ABSTRACT

In one embodiment, a computing system may receive one or more input signals comprising information related to a user of the computing system. The computing system may determine an interpretation of the one or more input signals using a knowledge graph. The knowledge graph may include a number of layers of knowledge about the user or an environment of the computing system. The interpretation of the input signals may be determined based on the knowledge in the knowledge graph. The system may perform one or more execution operations based on the determined interpretation of the one or more input signals. The execution operations may include configuring one or more controllable systems associated with the computing system.

21 Claims, 19 Drawing Sheets

(56) References Cited

U.S. PATENT DOCUMENTS

| | | |
|---|---|---|
| 2015/0156031 A1 | 6/2015 | Fadell |
| 2015/0227118 A1 | 8/2015 | Wong |
| 2015/0276239 A1 | 10/2015 | Fadell |
| 2016/0156768 A1* | 6/2016 | Kim .................. H04M 1/72533 455/420 |
| 2016/0321573 A1* | 11/2016 | Vangala ................ G06F 16/635 |
| 2017/0293690 A1 | 10/2017 | Malhotra |
| 2017/0357637 A1* | 12/2017 | Nell .................... H04L 12/2823 |
| 2018/0367329 A1* | 12/2018 | Shin ........................ G06F 1/163 |
| 2019/0205839 A1* | 7/2019 | Dotan-Cohen .... G06Q 10/1093 |

\* cited by examiner

SYSTEMS AND METHODS FOR HOME AUTOMATION CONTROL

PRIORITY

This application claims the benefit, under 35 U.S.C. § 119(e), of U.S. Provisional Patent Application No. 62/670,633, filed 11 May 2018, U.S. Provisional Patent Application No. 62/670,626, filed 11 May 2018, U.S. Provisional Patent Application No. 62/670,623, filed 11 May 2018, and U.S. Provisional Patent Application No. 62/670,618, filed 11 May 2018, which are incorporated herein by reference.

TECHNICAL FIELD

This disclosure generally relates to interacting with users and controlling multiple devices for home automation.

BACKGROUND

A home (e.g., a residential house, apartment, condominium, etc.) may have a number of different types of rooms or spaces for different purposes, such as, a living room, a bedroom, a bathroom, a kitchen, and an entryway. Different types of rooms and spaces may have different types of devices to control the environments for different activities. For example, the bedrooms may have one or more lamps suitable for waking up or sleeping. The living room may have one or more lamps suitable for reading, relaxing, or social activities. The home may have one or more air conditioners with thermostats to control the temperature. The windows may have or more blinds to block the external light.

The devices and facilities in the home may use certain controlling mechanism to allow the users to control the devices and facilities. For example, the users may use a switch to turn on and off a lamp in a specific room. The users may use a knob to adjust the light brightness of a lamp. The users may use a thermostat to control the air conditioner. The users may manually adjust the adjusting mechanism of the window blinds to control how much external light comes into the room.

SUMMARY OF PARTICULAR EMBODIMENTS

In particular embodiments, a smart home system 100 may include one or more user interfaces, one or more controlling devices, and a number of controllable devices. The smart home system 100 may use a declarative interaction model to interact with users. The smart home system 100 may receive declarative commands from users and interpret the declarative commands based on multiple layers of knowledge, data from sensors, other available metadata, configuration parameters, and data derived from any combination of the above, and control a number of devices appropriately. The smart home system 100 may detect that the user is in the bedroom and the time is 11 pm. The smart home system 100 may interpret the user's declarative commands using the knowledge of "a bedroom should have warm light around or during sleeping time" and turn on a warm light for the user.

In particular embodiments, the smart home system 100 may detect the user's activities automatically based on the sensor data without receiving any commands from the user. As an example and not by way of limitation, the smart home system 100 may detect some activities of the user using the data from a motion sensor. The smart home system 100 may interpret the user's activities using the multiple layers of knowledge which indicates that the user usually starts to cook for dinner about 5:00 pm and the smart home system 100 may detect that the current time is 5:05 pm and the user is in the kitchen. The smart home system 100 may determine that the user is about to start cooking and may turn on the light in the kitchen based on the user preference of kitchen light for cooking.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Natural Interactions

Figure 1A:
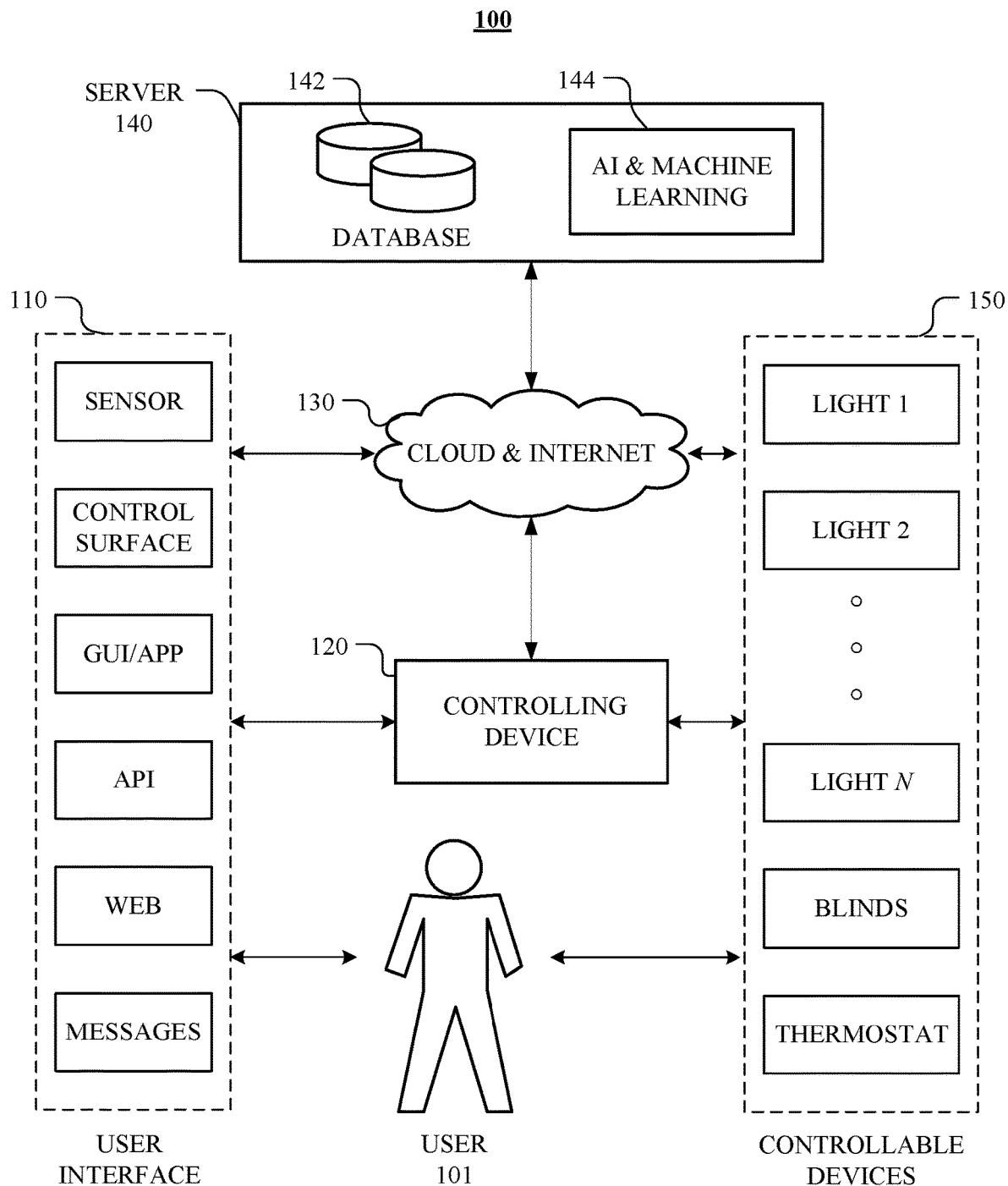
FIG. 1A illustrates an example smart home system.

In particular embodiments, the smart home system may be a presence, activity, and intent inference-based smart home system. In particular embodiments, the smart home system may use its understanding of the home and what is happening inside the home to provide natural interactions to the user, to autonomously respond to changes in a variety of conditions and inputs, and to anticipate user needs and take actions on behalf of the user when appropriate. In particular embodiments, the smart home system may improve the comfort, convenience, and usability of the home.

In particular embodiments, the smart home system may be designed for people to live with in a way that feels comfortable and natural to them. To achieve this, the system may be designed to support natural interactions. In particular embodiments, the smart home system may enable natural interactions by accepting imperfect input and using intent-based and dialog-oriented interactions. Note that while this disclosure is focused on use cases in the residential/house settings, many of the functionalities here are applicable to analogous use cases in business/office and hospitality settings. In particular embodiments, the system may be designed for use in an office environment to support the comfort, productivity, and wellbeing of people working in that environment, while also allowing the monitoring, management, and optimization of energy efficiency, security, and resource utilization. The system may minimize the need for people in the office environment to individually instruct or configure the system. To achieve this, the system may employ an intent-based, inference-based, and dialog-oriented control system that allows it to be managed both locally and remotely, while responding dynamically to input, such as control input, sensor input, and changes in inferred presence, intent, and activities throughout the environment.

Intention-Based Interactions

In particular embodiments, the smart home system may have an intent-based control interface, as opposed to a command-based control interface. In particular embodiments, the smart home may have an intent-based interface in addition to a command-based control interface. With the intent-based control interface, the smart home system may enable users to tell the system what they want by expressing their intents, activities, or desired outcomes, instead of telling the system what to do by issuing imperative commands. As an example and not by way of limitation, the users may tell the smart home system with intention-based commands, such as, "I need more light here" or "We're expecting guests", instead of issuing imperative commands, such as, "set living room lights to 100% brightness", "turn on bedside table light", or "increase brightness in living room."

In particular embodiments, the smart home system may include an intent-based system, which may allow users to control their environment without needing to know or understand the technical details of how the system works. In particular embodiments, the smart home system may allow users to get good outcomes even when they don't know how to achieve those on their own. In particular embodiments, user input may be considered to be an expression of an intent by tapping a light switch, issuing a command with a mobile app, or speaking to a voice-controlled device. In particular embodiments, the smart home system may have different outcomes for the same user input depending on the system's reasoning. As an example and not by way of limitation, setting a light switch to the "on" position may send raw input to the system which may be used to infer the "more light" intent by the inference system. From there, the smart home system may determine the brightness and color temperature of the light using contextual information like the time of day or/and the weather. As another example and not by way of limitation, pushing the same light switch in the middle of the night may result in a different type of light than doing the same in the middle of the day because the context of the action is different.

Accepting Ambiguous Input

In particular embodiments, the smart home system may accept ambiguous user inputs and allow users to be imprecise and incomplete in their commands. In particular embodiments, the smart home system may lower the requirements placed on users to effectively control their environment and improve both usability and accessibility. In particular embodiments, an imprecise and/or incomplete expression can still be meaningful to the system, unlike other systems where it would create errors or unexpected results. In particular embodiments, when input is received and the user's intent has been determined, the ambiguity inference and resolution system may unpack the input into several components, some of which may be imprecise or incomplete. Then, the smart home system may use contextual information to resolve imprecise components into exact alternatives, and to fill in incomplete or missing components.

In particular embodiments, the smart home system may receive imprecise addressing of entities from users. In particular embodiments, rooms, areas, people, or devices in a home may be referred or addressed in various different ways by users. In particular embodiments, the smart home system may figure out the meaning even if users refer or address things in a variety of different ways. In particular embodiments, the smart home system may eliminate the need for selecting a canonical name for each room and requiring everyone in the home to know and remember that name. As an example and not by way of limitation, an entity in a home may be referred by using synonyms, which allow the same entity to be addressed by a variety of names. For example, the same room may be referred as "the living room", "the family room", "the TV room", or other names, and all these names may be used interchangeably. The smart home system may recognize the room correctly without no need for programming all these possible names into the system. As another example and not by way of limitation, a device in a home may be referred by only naming the category of the device, for example, "the lights" may be used to refer a particular light or a group lights. When user tells the system "turn on the lights", the smart home system may determine which lights to turn on based on time of day, user location, or/and other associated conditions. As yet another example and not by way of limitation, an entity in a home may be referred by using a search-based approach that describes the relationship of the entity to other entities in the knowledge graph, such as, "turn on the dining room light", or "turn on the lamp over the dining table". The smart home system may determine the particular lights to be turned on are the same light although they are described in different ways.

In particular embodiments, the smart home system may receive expression for time in a variety of ambiguous ways. In particular embodiments, the smart home may determine the time without requiring the user to provide exact times for every anticipated event. In particular embodiments, times may be relative to user activities that the system may attempt to be aware of, for example and not limited to, "when I wake up" or "when I am preparing dinner". In particular embodiments, times may reference celestial events or daylight conditions, for example and not limited, "sunset", "dusk", or "when it gets dark". In particular embodiments, times may be specified as before or after another reference time has occurred or will occur, for example and not limited to, "after dark" or "before sunset". In particular embodiments, times may be specified very broadly by referring to a segment of a day, like morning, afternoon, evening or night, for example and not limited to, "make sure the front door is locked tonight" or "keep the porch light on tonight".

In particular embodiments, users may use combinations of the above different ways that times may be expressed imprecisely, to create a compound imprecise time, for example and not limited to, "after dinner", "before it gets dark", or "tonight, after sunset". In particular embodiments, the compounding of different imprecise times may express additional precision. In particular embodiments, the compounding of different imprecise times may make the statement more ambiguous.

In particular embodiments, the smart home system may use a combination of one or more of live sensor data, contextual information, natural language processing, knowledge graph, and any programmed and/or learned user preferences and/or behaviors to determine when an imprecise time is occurring or an imprecise time is received. Depending on the confidence level with which the smart home system may determine that an imprecise time is occurring, the smart home system may either (1) do nothing, (2) carry out the appropriate action based on the user's earlier input, or (3) use the dialog system to request the user's help to disambiguate.

As an example and not by way of limitation, users may combine intent-based interactions and imprecise times by telling the system "I'm expecting guests tonight", and the system may not need an exact time to know the outdoor light in front of the main entrance of the home should always be adequately lit. In particular embodiment, when received user input of "I'm expecting guests tonight", the smart home system may decide to turn on the appropriate lights at the main entrance of the home as soon as it starts to get dark outside. In particular embodiments, the smart home system may also decide to leave an exterior gate unlocked and/or leave alarm system functionality of the system in a less alert mode than in a scenario where no guests were expected.

In particular embodiments, the smart home system may record a schedule that uses dinner time as its trigger time instead of a conventional schedule that uses an exact time, for example, "turn on scene 1 at dinner time every day". With this schedule created, the smart home system may determine every day when dinner time occurs and may activate the requested scene at such time.

In particular embodiments, the smart home system may receive user input of "turn on the hallway lights when it gets dark". In particular embodiments, given the time that it gets dark is somewhat different every day, the smart home system may resolve this condition dynamically using one or more of local sensor data (if available), astronomical events for the system's approximate geolocation, time of day, other external conditions such as the local weather, or any combination of these information. In particular embodiments, there may be also an intent-based aspect, namely that the system may determine the correct brightness level and color temperature for the lights when it turns them.

In particular embodiments, the smart home system may receive incomplete input from users. In particular embodiments, the smart home system may allow the user to leave out part of commands and may figure things out contextually by itself. In particular embodiments, the smart home system may ask the user to disambiguate the commands. As an example and not by way of limitation, the smart home system may receive user command of "I'm expecting guests", in which the temporal component of the expression is missing. In particular embodiments, the smart home system may infer that the command most likely means "later today". As another example and not by way of limitation, the smart home system may receive user command of "turn on hallway lights", in which the temporal component is missing. In particular embodiments, the smart home system may infer this to most likely mean "now" unlike the previous example. As another example and not by way of limitation, the smart home system may receive user command of "more", in which the expression contain very limited information, In particular embodiments, the smart home system may use a history of recent previous expressions to infer the complete meaning of the incomplete command. For instance, if the last command was "make the lights brighter", the smart home system may infer that the command "more" as a request to make the lights even brighter. As another example and not by way of limitation, the smart home system may receive user command of "I'm watching TV", in which the spatial component of the expression is missing. In particular embodiments, the system may use a combination of sensor information and the knowledge graph to infer that the user is watching TV in the living room.

Dialog-Oriented Interaction

In particular embodiments, the smart home system may have dialog-oriented interactions with users through the user interfaces (UIs) of the system. In particular embodiments, the smart home system may treat the user experience as an ongoing conversation between the occupants of the home and the system. In particular embodiments, the system may have a conversational (UI). In particular embodiments, the conversational UI may afford the system the opportunity to reach out the user when the user input is needed (e.g., whether or not to set the alarm) or when to notify the user that something is out of ordinary (e.g., bathroom window was left open). In particular embodiments, the conversational UI may afford the system the opportunity to guide users through complex situations including, for example, but not limited to, the setup experience, troubleshooting, adding a new device. In particular embodiments, the conversational UI may free the user to initiate an interaction with the system in a familiar way (e.g., no application needed).

Autonomous Behavior

In conventional home automation systems, automations are typically achieved by creating presets, which are also called "moods", "scenes", or "routines", that are triggered by either: (1) recalling the preset by name, (2) running them on a schedule, or (3) an if-then rule system. This conventional approach is mechanical and unpleasant for users to live with and often results in the perception of errors like lights turning on and off at inappropriate times.

In particular embodiments, the smart home system may have a reasoning system which allows the system to have more sophisticated autonomous behavior. In particular embodiments, the autonomous behavior of the system may allow users to feel more like the system is responding to users, user activities, and/or environment instead of just executing a script. In particular embodiments, the smart home system may allow users to feel more natural to live with the system.

In particular embodiments, the smart home system may emphasize the continuity of the user's experience. In particular embodiments, the smart home system may have real life events taking precedence over scheduled automations. Since the system may know what activities are happening in the home at any given time, the system may decide whether or not and how to execute an automation. In particular embodiments, the system may maintain the continuity of the user's experience in the home and lessens perceived errors. As an example and not by way of limitation, if there is a scheduled automation to turn the lights off in the dining room at midnight, the system may not execute that scheduled automation if the system knows there are people in the room eating.

In particular embodiments, the smart home system may understand the context of certain events or user activities. In some conventional home automation systems, a naive reaction to a motion sensor is often worse than no reaction. In particular embodiments, the smart home system may have the knowledge base which gives the system an understanding of room types and other contextual information that allows the system to provide different outcomes for the exact same inputs. As an example and not by way of limitation, when motion is detected in a bedroom in the evening, the system may turn on the lights at full brightness. When motion is detected in the same bedroom late at night when someone is sleeping, the system may decide to turn on a dim light, a night light, or bedside table light with just enough light to find the way, but not so much as to wake the other person.

In particular embodiments, the smart home system may adapt to change based on a variety of conditions. Another way that automations in conventional systems fail is when they don't to adapt to a change in the home. Change may happen for a variety of reasons and should be considered normal and expected. For example, routines may change over time, family members may change, furniture may be moved around, devices may be added and removed, the time of the sunset changes throughout the year. In particular embodiments, the smart home system may be less rigid and more adaptable because the system may be not set up around absolute times and strict schedules, but around activities and imprecise concepts like "after dinner". In particular embodiments, the system may be more resilient to change because it is dialog oriented, so the system may be capable of reaching out to users and asking questions when it detects anomalies. As an example and not by way of limitation, some lights may need to turn on as it gets dark, which happens at a different time throughout the year. In particular embodiments, the smart home system having a schedule automation referring to the time of the day for getting dark may adapt accordingly for the actual time when it gets dark each day. In particular embodiments, the system may use support for imprecise times to enable a certain level of adaptability for changing circumstances.

As another example and not by way of limitation, the user may replace connected lightbulbs (e.g., upgrade, or replace a broken device) and have none of the system functionality impacted after they associate the new device with the existing fixture. The system may achieve this by keeping a separate concept of fixtures (e.g. a lamp) vs/devices (e.g. a connected lightbulb). As another example and not by way of limitation, the system may notice a deviation from a scheduled or learned regular routine (i.e., anomaly detection). If the deviation is relatively small, the system may choose to treat the situation as if nothing has changed, or to trigger the response to a routine at an earlier or later time in response to the change in input. If the deviation is larger and/or has occurred multiple times, the system may update the notion of routines going forward and/or use the dialog system to verify this with the user.

Agentive Behavior

In particular embodiments, the smart home system may be capable of performing agentive behaviors by anticipating the user's needs and autonomously taking action on behalf of the user instead of only responding to commands and requests from the user. In particular embodiments, the system may be capable of predicting and anticipating activities and user intents. In particular embodiments, the system may use this ability to detect and alert users to anomalies or to make recommendations to the user. As an example and not by way of limitation, if no one has come home and it is late, the smart home system may decide on behalf of the user whether to arm the alarm, set the home go into vacation mode, or ask one of the users what to do.

System Architecture

FIG. 1A illustrates an example of the smart home system 100. In particular embodiments, the smart home system 100 may include a number of user interfaces 110, a controlling device 120, a cloud with an internet connection 130, one or more servers 140, and a number of controlled devices 150. In particular embodiments, a user 101 may interact with the smart home system 100 through the user interfaces 110. In particular embodiments, the user interfaces 110 may include, for example, but are not limited to one or more sensors, one or more control surfaces, one or more graphic user interfaces (GUI), one or more applications, one or more application public interface (API), a website interface, an interface for message or chat, or one or more speakers. In particular embodiments, the user interfaces 110 may be on a smart phone, a tablet, a suitable mobile device, or a central control device. In particular embodiments, the central control device may be a third-party control device, such as, for example, an Amazon Alexa, a Google Home, or other similar devices. In particular embodiments, the central control device may be a dedicated device specifically developed for the smart home system 100. In particular embodiments, the sensors may include, for example, but are not limited to one or more motion sensors, one or more microphone sensors, one or more light sensors, one or more thermal infrared video cameras, other suitable sensors, or any combination thereof. In particular embodiments, the user interfaces 110 may capture a variety of information about the user 101 and send the information to the controlling device 120. In particular embodiments, the controlling device 120 may be connected to a cloud 130 (e.g., via an internet connection). In particular embodiments, the controlling device 120 may be connected to a server through the cloud 130.

In particular embodiments, the server 140 may include a database 142 and an artificial intelligence (AI) and machine learning (ML) algorithm 144. In particular embodiments, the smart home system 100 may have the database 142 and the artificial intelligence (AI) and machine learning algorithm (ML) 144 implemented locally in the controlling device 120. In particular embodiments, the controlling device 120 may collect information using the user interfaces 110 and may analyze the information using a computing and controlling program of the controlling device. In particular embodiments, the user interface 110 may directly communicate to the cloud 130. In particular embodiments, the controlling device 120 may communicate with the cloud 130 and the server 140. In particular embodiments, the controlling device 120 may access the database 142 of the server 140 via the cloud 130 for saving or retrieving information. In particular embodiments, the controlling device 120 may save or retrieve information in a local database within the controlling device 120. In particular embodiments, the controlling device 120 may send data to the cloud 130 and the server 140 to have the data analyzed by the artificial intelligence (AI) and machine learning (ML) algorithm 144 and receive the analysis results from the server 140. In particular embodiments, the controlling device 120 may analyze the data using the local computing and controlling programs within the controlling device 120. In particular embodiments, the controlling device 120 may process the data collected from the user interfaces 110 and control a number of controllable devices 150 based on the processed results of the data. In particular embodiments, the controlling device may process the data collected from the user interfaces 110 using multiple layers of knowledge in the database. In particular embodiments, the controllable devices 150 may include, for example, but are not limited to a number of lights (e.g., lamps), a number of light attenuation devices (e.g., blinds), a number of thermostats, other suitable controllable devices, or any combination thereof.

In particular embodiments, the controllable devices may directly communicate with the cloud 130. In particular embodiments, the user 101 may control the controllable devices through the cloud 130 using a smart phone, a tablet, a computing device, or a suitable mobile device. In particular embodiments, the user 101 may directly control the controllable devices through the cloud 130 bypassing the controlling device 120. In particular embodiments, the user 101 may control the controllable devices through the cloud 130 using the controlling device 120. In particular embodiments, the user 101 may directly receive information (e.g., sensor data or control surface status) from the user interfaces 110 (e.g., sensor or control surface) through the cloud 130 remotely using a smart phone, a tablet, a computing device, or a suitable mobile device. In particular embodiments, the user 101 may send commands or information to the smart home system 100 through the cloud 130 using a smart phone, a tablet, a computing device, or a suitable mobile device. In particular embodiments, the user 101 may directly interact with the controllable devices 150. As an example and not by way of limitation, the user 101 may use a messaging or chatting interface for receiving information from and sending commands to the smart home system 100. Although this disclosure describes and illustrates a particular smart home system having a particular number of particular components in a particular arrangement, this disclosure contemplates any suitable smart home system having any suitable number of any suitable components in any suitable arrangement. The example smart home system as illustrated in FIG. 1A is for illustration purpose of particular embodiments only and the smart home system is not limited thereof.

Figure 1B:
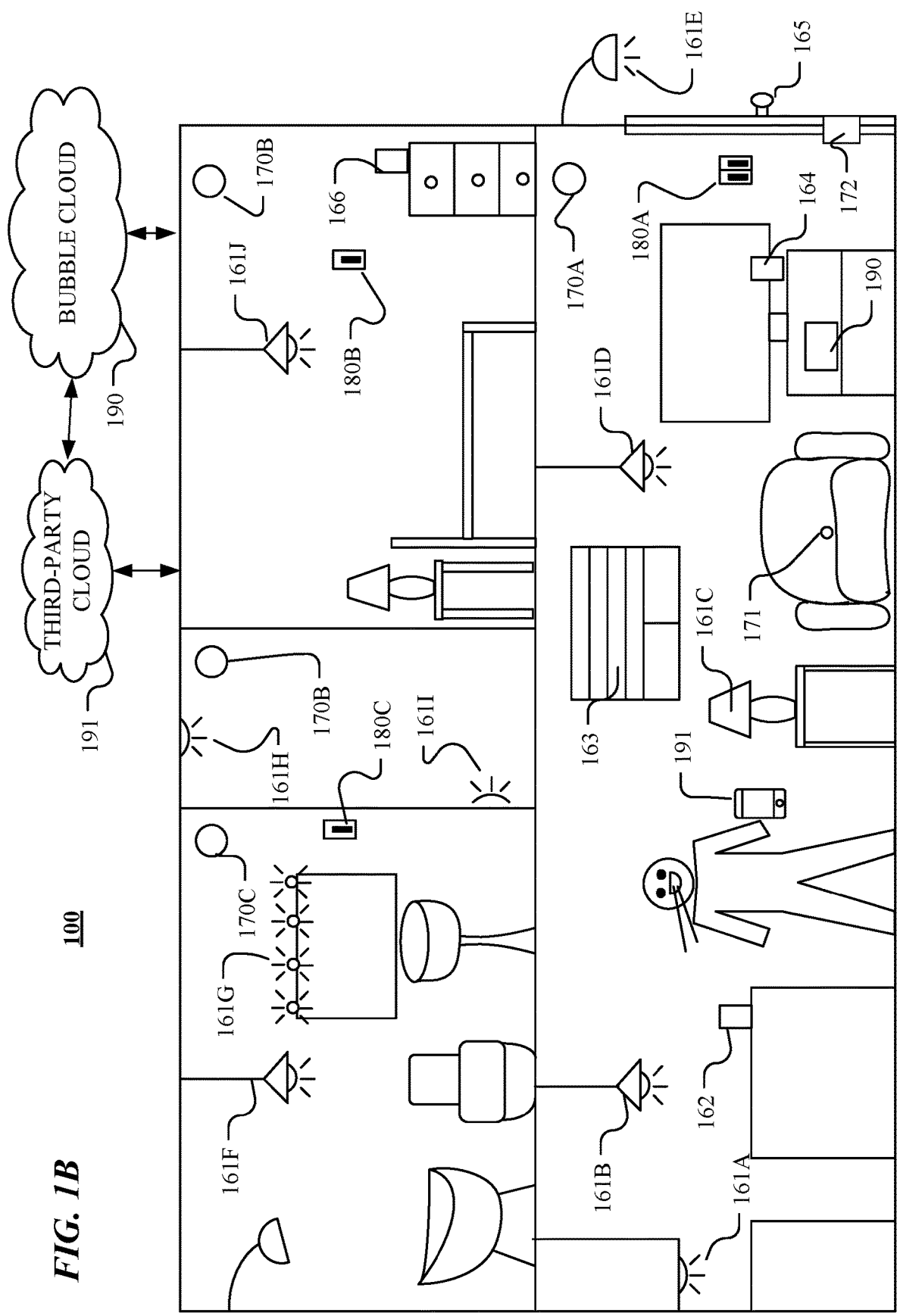
FIG. 1B illustrates an example application environment of smart home system.

FIG. 1B illustrates an example application environment of smart home system. In particular embodiments, the smart home system may include a variety of devices and subsystems installed at the interior or exterior of the home. The system may include one or more controlling devices including, for example, but not limited to, hubs 190, smartphones and apps 191, and third-party control devices (e.g., Amazon Echo 162, Google home 164, or Apple Kit Hue 166). The system may include a number of controlled devices, for example, but not limited to, smart or normal light bulbs (e.g., 161A, 161B, 161C, 161D, 161E, 161F, 161G, 161H, 161I, 161J), automatic controlled shutter 163, and automatic controlled door lock 165. The system may include a number of sensors, for example, but not limited to, motion and presence sensors (e.g., 170A, 170B, 170C), pressure sensor (e.g., 171), door open state sensor (e.g., 172), and etc. The system may include a number of light switches, for example, switches 180A, 180B, 180C. In particular embodiments, the control devices, controlled devices, sensors, switches may be made by the first-party or by a third-party vendor. The system may include any combination of the first-party devices and software with third-party devices and software. Although this disclosure describes and illustrates a particular smart home system having a particular number of particular components in a particular arrangement, this disclosure contemplates any suitable smart home system having any suitable number of any suitable components in any suitable arrangement. The example smart home system as illustrated in FIG. 1B is for illustration purpose of particular embodiments only and the smart home system is not limited thereof.

Hardware System

Hub

In particular embodiments, the hub may be a general-purpose computer, running a general-purpose operating system, with specialized software code that performs some or all of the functions of the smart home system. In particular embodiments, the hub may have multiple peripheral radio systems that enable it to communicate with the various devices in and around the home over a variety of wired and wireless protocols. In particular embodiments, the hub may be a microcontroller or computer that may not run a general-purpose operating system, but may perform some or all of the functions of the software system.

Figure 2:
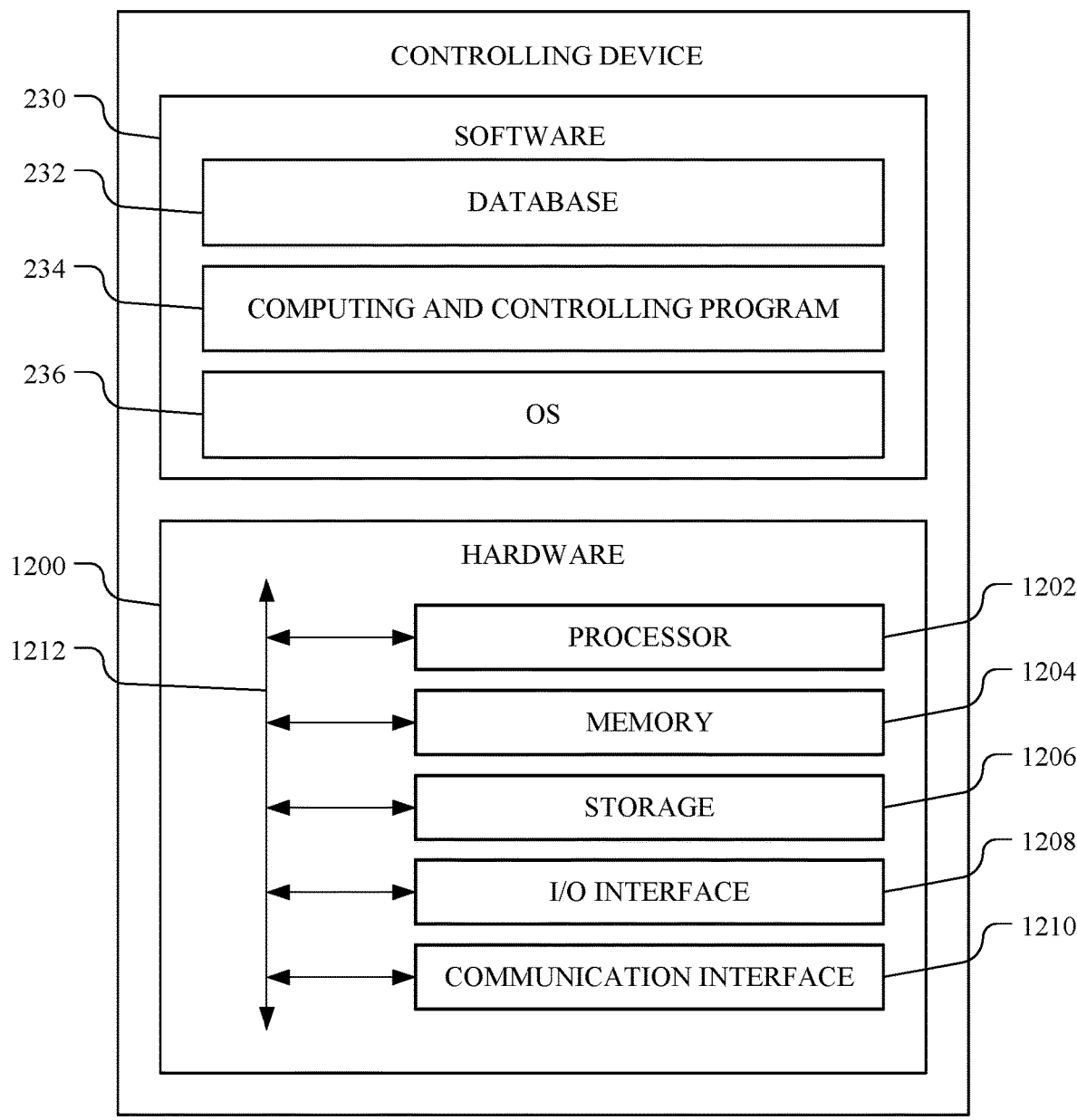
FIG. 2 illustrates an example controlling device of the smart home system.

FIG. 2 illustrates an example controlling device 220 of the smart home system. In particular embodiments, the controlling device 220 may be a hub implemented on an embedded system platform including micro-controller, digital signal processor (DSP), or field-programmable gate array (FPGA). In particular embodiments, the controlling device 220 may be implemented on general purpose computer. In particular embodiments, the controlling device may be implemented on a central controlling device from a third party, for example, an Amazon Alexa, a Google Home, an Apple TV, or other suitable devices. In particular embodiments, the controlling device 220 may include software 230 and hardware 1200 for computing system. In particular embodiments, the software 230 may include a database 232, a computing and controlling program 234, and an operating system 236. In particular embodiments, the hardware 1200 may include a processor 1202, memory 1204, storage 1206, an input/output (I/O) interface 1208, a communication interface 1210, and a bus 1212. Although this disclosure describes and illustrates a particular controlling device having a particular number of particular components in a particular arrangement, this disclosure contemplates any suitable controlling device having any suitable number of any suitable components in any suitable arrangement. The example controlling device as illustrated in FIG. 2 is for illustration purpose of particular embodiments only and the controlling device is not limited thereof.

In particular embodiments, the hub may be a relatively powerful computing device, such as a computer powerful enough to run machine-learning (ML) algorithms locally.

Most software of the system may run on hub. A cloud may be used for backup, mirror image, or routing of requests from other devices, servers, or services. A cloud may refer to an information technology (IT) paradigm that enables ubiquitous access to shared pools of configurable system resources and higher-level services that can be rapidly provisioned with minimal management effort, often over the Internet. In particular embodiments, the hub may be a thin hub having relative limited functionality compared to the powerful hub. The thin hub may be composed of a microcontroller routing messages between devices and a cloud service. The thin hub may have various radios connected with other devices. The thin hub may work as a bridge to a cloud, and other functions of the system may be actually running in the cloud. The cloud may determine the actions to be executed and instruct the system to execute the actions. The thin hub may be mapping the actions to the corresponding protocols of the controlled devices. After executing the actions, the hub may respond to the cloud to confirm or inform it that the hub has executed or failed to execute the actions. In particular embodiments, the hub may have functionality beyond that of the thin hub but less so than the powerful hub. In particular embodiments, the hub may continue to function for some capacities (e.g., controlling devices, making decisions), even if the internet is not accessible. Without a functioning internet connection, the hub may stop only services that actually require the cloud. In particular embodiments, the hub may have different radio profiles, and radio and wired communications (e.g., z-wave, ZigBee controller, X-10 controller extended wired protocol for home automation) from the third-party control devices. In particular embodiments, the hub may have customized software running on it.

In particular embodiments, the hub may be designed for complex decision making which cannot be performed by third-party control devices. For example, the hub may autonomously initiate an action without the need for the user to explicitly initiate an interaction with the hub or the needs of pre-setup by the users, while third-party control devices (e.g., Amazon Skill) cannot initiate an action unless they are firstly preset by the users or there are some user action triggers (e.g., user command). For example, the user may not be able to trigger the third-party control device to do something (even if the system detects presence) unless the user initiates an interaction first (e.g., speaks to the third-party control device).

In particular embodiments, the hub may be a customized device rather than general computing system. The hub may include efficient micro controllers that do not run a conventional full OS. The hub may securely connect to a cloud and may be assigned to a particular device and users in a particular home. The hub may receive commands from the cloud and execute lightweight processing in response to those commands. When the internet connection is down, or the cloud cannot be reached, the hub may be not able to reach a specific online service over its internet connection, therefore, the hub may offer limited functionality such as receiving input from switches and sensors in the home, and changing state on connected devices in the home in response to those inputs or stored/cached rules and automations. In particular embodiments, the connected switches may have different behavior profiles depending on conditions like whether or not they can reach the hub, whether or not the hub is connected to the internet, whether or not the hub can reach the cloud, and whether or not the switches can reach other devices. The connected switches may be configured with associated devices, and attempt to send commands to those associated directly when the switch cannot reach the hub, and send input to the hub and not to the associated devices when it can reach the hub. The hub may have similar features where the behavior profile changes depending on whether it can connect to the internet, the cloud, and/or devices around the home. For example, the hub may no longer route the "light on" input from the connected switch to the cloud. Instead, the hub may pick a sensible default setting and use that to turn the light on. The hub may still enable the user to use the switches to operate the controlled devices in default or preset models when it is not connected to the cloud. It is more important for the user to be able to turn the light on, than to turn the light on with ideal brightness and color temperature for the conditions. Depending on whether the hub can reach the cloud services or not, the system may switch profiles and the ways to interpret input.

Integrated Thermal Imaging Sensor (ITIS)

In particular embodiments, the integrated thermal imaging sensor (ITIS) may be composed of a thermal infrared camera, or long-wave infrared (LWIR) sensor array, and a computer. In particular embodiments, the computer may run the computer vision code to interpret the data from the thermal infrared camera and may connect to other components in the system over Wi-Fi or other wireless protocols. In particular embodiments, the integrated TIS may have two or more thermal cameras. In particular embodiments, multiple cameras may be used to improve the sensor's field of view of the thermal image by allowing the image captured by each camera to be combined in software into a single larger image. In particular embodiments, multiple cameras may be used to measure in different directions using one sensor, where the individual camera views may not overlap with each other. In particular embodiments, multiple cameras may be used to improve the fidelity of the thermal image, by placing multiple camera next to each other and being pointed at roughly the same spot, to create multiple measurements of approximately the same image. In particular embodiments, multiple cameras may be used to create a stereoscopic image, by placing multiple camera at a known distance away from each other, allowing the computer vision system to perceive depth to some degree.

Some of the description below may be for the one camera scenario, but the same principles may apply similarly to a sensor equipped with multiple cameras. In particular embodiments, the sensor may divide its field of view into multiple zones, and report for zones collectively or each zone individually. In particular embodiments, the system may use computer vision code to determine motion in the area observed by the sensor, by comparing subsequent frames from the camera to each other, after some or no amount of noise reduction has been performed on these frames. In particular embodiments, the system may compare more than two frames as another means of noise reduction. The result may be a bitmap image where the values of each pixel express the amount of difference between two frames. In particular embodiments, more than two frames may be compared, in an effort to further separate noise from signal.

In particular embodiments, the system may perform foreground/background separation in the field of view of the sensor, by comparing one or more recent frames captured from an earlier recorded (and possibly dynamically adjusted) background reference image. The system may record multiple frames (e.g. 20 or 50) and store the average value for each corresponding pixel across the frames as the pixel value in the background reference image. The system may record multiple frames and store the maximum deviation, average deviation, or other derivative of the deviation in recorded values for each corresponding pixel across the frames as the pixel value in a "noise-print". The result of comparing one or more recent frames against the background image may be a bitmap image where the values of each pixel express the amount to which a current frame, or the average, median, maximum, or minimum of recent frames, differs from the background reference image. In particular embodiments, the noise-print may be used as a filter to eliminate false positives when comparing one or more recent frames to the background image. In particular embodiments, multiple frames of input data, multiple frames of output data from the above motion-detection and foreground/background separation may be used by another algorithm to determine a score of the overall likelihood of motion, the presence of foreground objects, and/or the presence of a person. In particular embodiments, in an effort to reduce false negatives, the system may dynamically adjust the background image by observing a drop in temperature in certain pixels in one or more recent frames, before or after performing additional noise reduction, relative to the corresponding pixels in the background image. If the new lower temperature is consistent and not significantly lower than other pixels in the background image, and if the higher temperature of the corresponding pixels in the background image is consistent with the approximate temperature range expected for people in an environment with an ambient temperature consistent with other sensor data, such as overall background temperature or thermistor temperature, the system may treat this as an observation that a person or other foreground object moved away from these pixels revealing the actual background behind them, and update the corresponding pixels in the background image to the new lower temperature value, improving background accuracy without requiring a full recalibration.

In particular embodiments, additional computer vision algorithms may be used to describe other aspects of the image or derivative data that uses the image loosely as an input, which may result in additional data to be shared by the sensor with the system, or that may be used by the sensor itself to further determine its internal confidence score for the likelihood of motion, the presence of foreground objects, and/or the presence of a person. Examples of additional data to be determined and possibly reported or used internally may include, but are not limited to, number of detected objects in foreground, size of objects relative to 2D plane of measurement (i.e., within the bounds of the field of view/bitmap), size and/or distance of objects in 3D space relative to location of sensor (e.g., in the case of stereoscopic version of sensor), time or number of frames likely including motion, presence of foreground objects, and/or presence of a person, confidence scores for any of the reported determinations, time or number of frames the determination has been at, time or frames of the determination above a given confidence level, time since last background image has been generated or updated, sensor calibration data describing noise levels, data that can be used to further evaluate precision of sensor (e.g. a multiple frame recording of the background to determine how much each pixel of the thermal imaging device fluctuates, which can later be used for noise reduction purposes (hereinafter: "noise-print")), score that describes how concentrated and scattered detected motion and/or foreground objects are, time or number of frames there has been likely no motion, no presence of a foreground object, no presence of a person, data describing the shape and movements of any of the determinations (e.g. describing shape of foreground object, rate and/or amplitude of motion), reported thermal imaging device thermistor data and other metadata that can be used to assess the performance of the imaging device or to process the data reported from it (e.g. sufficient change in thermistor value may trigger the sensor to generate a fresh background image, or adjust its other algorithms with the goal to improve accuracy).

In particular embodiments, additional algorithms (e.g., machine learning algorithms) may be run on the sensor or elsewhere (e.g. hub or cloud service) to store the reported sensor data and combine with other data available to the system (e.g. contextual data, inferred intent, inferred activity, etc.) to make further determinations that can be used online (e.g., by the system to determine how to respond to the given input) and offline (e.g., to further train the system).

In particular embodiments, the sensor may be comprised of a medium-resolution thermal imaging device (e.g. 80×60 pixels, 45-degree field of view), a general-purpose computer running a general-purpose OS, with the computer vision code running on that computer hosted by that OS. In particular embodiments, the sensor may be comprised of a low-resolution thermal imaging device (e.g. 8×8 pixels, 60-degree field of view), a programmable micro-controller running the computer vision code and other library code that enables the micro-controller to communicate with the thermal imaging device, other peripherals, and wired and/or wirelessly with other components of the System. In particular embodiments, the sensor may be battery-powered, mains-powered, solar-powered, or powered in multiple ways, where the sensor may maintain all or a degraded level of functionality during partial disruption to its power sources. In particular embodiments, the sensor may share its calibration images (e.g. background image, noise-print) with the hub for storage, analysis, and/or later recall.

In particular embodiments, the sensor may request calibration and configuration data from the hub on first start, after a power loss, on a regular interval, or whenever the sensor determines it needs to refresh this data. In particular embodiments, the hub may act as a persisted cache for sensor calibration and configuration data that cannot be stored by the sensor itself when it loses power. In particular embodiments, the sensor may have a special learning mode, where the user may be instructed by the system (e.g., through the dialog system or other UIs) to go to different areas of their room(s) and home and to behave in a variety of ways, to help the system to generate configuration and calibration data for one or more sensors that can later be used in the normal mode of the sensor.

In particular embodiments, the integrated thermal imaging sensor may have improved performance and capability than conventional cameras by using computer vision software. As an example and not by way of limitation, the integrated thermal imaging sensor may be capable of detecting presence or motion by itself. In particular embodiments, the system may use multiple cameras to get better or more complete data than with a single camera. In particular embodiments, the overlapping FOVs of multiple integrated thermal imaging sensors may provide larger combined FOV and stereo perception with distance or depth information (e.g., how far the objects are to BITS with some level of accuracy). In particular embodiments, multiple sensors (e.g., integrated thermal imaging sensor, RGB cameras, other sensors) may have a small distance to each other and may have overlapping FOVs to deal with sensor deficiency. As an example and not by way of limitation, for a low-resolution sensor, the image of an object of interest at a far distance from the sensor may fall between pixels due to sensor deficiencies or optical limitations. Another sensor (e.g., integrated thermal imaging sensor), which may be slightly tilted or slightly offset, may have overlapping FOV and may allow to increase the fidelity of the single 2D image of the low-resolution sensor for motion detection and other measurement. In particular embodiments, the overlapping FOVs of multiple sensor may be used for noise reduction and avoiding false negatives. In particular embodiments, the overlapping FOVs of multiple sensor may be used for determining depth which may allow more accurate separation of foreground objects from the background. In particular embodiments the system may share its overall presence score for an area, which can be based on data from multiple sensors and other knowledge, such as whether the users informed the system they are not home. The users may inform the system, for instance, by arming the alarm system in "Away" mode. With individual integrated thermal imaging sensor or other sensors, the system may allow the individual sensors to reset their background image and noise-print without retaining any foreground pixels, or record that their current and recent foreground pixels are most likely false positives and subsequently use that information to more accurately interpret future readings.

In particular embodiments, the integrated thermal imaging sensor may have multiple zones within the same sensor FOV. As an example and not by way of limitation, one sensor may have its FOV covering entrance, sitting area, and kitchen. The integrated thermal imaging sensor may divide the video stream frame into smaller rectangular areas or any shape of objects masking the rest out. In order to detect whether there is motion in particular areas (e.g., entrance, sitting area, kitchen), instead of using separate cameras, the integrated thermal imaging sensor may use multiple virtual sensors with one camera running with a particular software to detect motions in all these areas in its FOV. In particular embodiments, the integrated thermal imaging sensor may determine a mask area and have a special training mode for the zones. For example, the integrated thermal imaging sensor may put sensor in this training model and instruct user to go seat at dining table, move around the dining table, and go around all the corner of the table, and tell the sensor when the user completes. The system may collect data from that training section and generate mask to be used later for determining presence in the dining table. Similarly, the system may train the sensor for other zones within the sensor FOV and generate mask for those zones for detecting presence of the respective zones. In particular embodiments, dividing the FOV of sensor into multiple virtual sensors may be conceptually opposite direction of using multiple cameras.

In particular embodiments, the computer vision code may have different algorithms using the same raw input data for motion detection and foreground and background separation. For the motion detection, the computer vision code may compare one frame to next, or multiple frames, detect if there is motion, and report when motion is detected. For example, the computer vision code may determine that there is motion when it detects there is change in a concentrated area with a certain size or determine that there is no motion when the changes are scattered in the frame.

In particular embodiments, for foreground and background separation, the system may create a background image and compare new frames from the camera to background images instead of comparing between frames. In particular embodiments, by using foreground and background separation, the system may clearly separate a motionless foreground object from the background. Detecting a motionless object cannot be done with the motion algorithm. In particular embodiments, the background image may be dynamically updated. In particular embodiments, the system regenerates a new background image and noise-print on a scheduled basis (e.g. every 600 frames, approximately every minute), when there is a significant chance in sensor temperature (e.g. a 0.25° C. change recorded in the thermistor on the thermal camera). In particular embodiments, to reduce false negatives, the system will substitute pixels from the new background image and noise-print with the corresponding pixels from the old background image and noise-print, if those pixels are currently or were recently considered foreground pixels. In particular embodiments, to reduce false negatives, the system will substitute pixels from the new background image and noise-print with the corresponding pixels from the old background image and noise-print, if those pixels had an unusually large deviation in recorded values during the calibration process e.g. a high noise-print value. In particular embodiments, the system may use the complete set of currently and recently considered foreground pixels as well as some or all of their immediately neighboring pixels to substitute parts of the new background image with parts of the old background image. In particular embodiments, the system may use lower thresholds for the determination of currently and recently considered foreground pixels than those used to determine the current presence score to substitute pixels from the new background image with the corresponding pixels from the old background image. In particular embodiments, the system may calculate a score for a noise-print by determining the number of pixels in the noise-print that exceed a pre-determined or configurable maximum amplitude and dividing that by the total number of pixels in the noise print. If the score falls below a pre-determined or configurable value, the system may discard the noise-print and background image entirely, and schedule a new calibration cycle sooner than normally scheduled. The system may use a naïve computer vision algorithm for motion detection. The system may determine that the background is typically in a certain range based on the thermistor value and image values.

In particular embodiments, the background image may constantly/continuously improve itself and the system solves important problems with background detection because conventional background subtraction systems cannot appropriately determine when to regenerate their background images. Conventional background subtraction algorithms regenerate their background based on motion detection, for example when foreground objects stop moving for multiple subsequent frames they may now be considered part of the background. Instead, integrated thermal imaging sensor may use thermal imaging and knowledge of temperatures, including, for example, but not by way of limitation, knowledge of typical human body temperatures, typical visible body temperatures through clothing, room and ambient temperatures, the temperature of common household appliances and objects (e.g., a heating duct, a vent, a refrigerated drink, and pets), the effect of environmental factors on body temperature and visible body temperatures, the perception of these temperatures relative to recorded sensor thermistor and background temperatures and specific sensor hardware, to interpret the pixel data and determine more accurately when and how to refine the background image. In particular embodiments, the system may perform dynamic background image changes or updates to make the sensor immediately more accurate or precise using its knowledge of temperatures. In particular embodiments, the system may use the knowledge of temperatures to train a machine learning system that can then affect, when sensors recreate background images, how they change or update a background image, or how they perform foreground background separation, to enable improved sensor performance and accuracy. In particular embodiments, for the purposes of determining a presence score, the system may use its knowledge of temperatures to treat different types of foreground readings differently, for example ignoring entirely or treating with a lower score any foreground pixels with a thermal value that is inconsistent with the range of expected visible body temperatures, than those pixels which do correspond with that range.

In particular embodiments, the system may use combination of motion detection, background foreground separation, and/or dynamic background updates, to determine the likeness of presence. For example, when multiple foreground pixels corresponding to a foreground object are concentrated in one or a few areas in the image rather than scattered evenly throughout the image, the system may have a very high confidence level the foreground object is not false positives, which leads to a higher presence score expressing the confidence level that there is presence. When the difference between a foreground pixel thermal value and the background pixel thermal value is greater than a threshold after noise reduction, the system may have a higher confidence level that the foreground object is not a false positive, and thus have a higher presence score. For example, that the foreground pixels are concentrated rather than scattered may support an 80% confidence on its own. Similarly, that the foreground pixels thermal values are greater than the background pixels thermal values by more than a threshold may also support an 80% confidence on its own. When these two factors are combined, the overall confidence score may be even higher. In particular embodiments, the system may have multiple way to interpret raw data, make different derivative data, and combine different derivative data in different ways to make the overall determination that the thermal image sensor indicates presence or high motion activities in the room. For example, the system may determine that certain types of motion and/or high motion activities on certain days in certain rooms may mean that somebody is likely working out.

Multi-Sensor

In particular embodiments, the multi-sensor may be a group of different types of sensors whose data may be used together for more reliable real time inference of presence and activities as well as used offline to train the system to become better over time. In particular embodiments, the sensors may include fast vibration sensor which may be used to learn activity in a room (e.g., on a connected surface, like food preparation, or footsteps). In particular embodiments, the fast vibration sensor may include mechanism for vibration sensing, for example, a spring, a small ball associated with the spring, and a micro-controller. The fast vibration sensor may be installed on a surface to sense the vibration on the surface. In particular embodiments, the sensor may include dust level sensor which may be used to learn if there is or has been activity in a room that caused dust particles to circulate more, for example, but not limited to, making the bed, vacuum cleaning, walking around in a room with carpets, sitting down on an upholstered piece of furniture. In particular embodiments, the sensors may include motion sensor which may be third-party low-cost sensor for motion data, or thermal cameras.

In particular embodiments, the sensors may include multiple microphones to distinguish between people talking and the talking on the TV or radio. The system may use computer hearing code, combined with thermal data, to determine that nobody is in the room and any perceived talking is TV or radio talking. The system may score sound that from that particular location, which was determined as the source of the TV or radio talking, lower than other locations. The system may create a location map over time and may improve the location map and use the location map to train the system over time. In particular embodiments, the system solves the technical problem of conventional third-party control devices (e.g., an Amazon Alexa), where the news talk will falsefully trigger the system because the system cannot distinguish the difference between the TV or radio talking and actual user talking. In particular embodiments, the system may overcome that problem by determining that it is a TV or radio talking and actually no person is in room, therefore, the talking TV or radio should not be taken as the user talking. The system may require multiple sensors for invalidating the hearing data using other sensor data (e.g., dusk level data, with thermal imaging data, or any combination).

In particular embodiments, the sensor may include near-visible infrared (NVIR) camera, which may be similar to RGB camera in some aspects. The near-visible infrared cameras may have higher resolution than thermal imaging cameras. The near-visible infrared cameras may be used for computer vision applications, as well as security cameras. In particular embodiments, the near-visible infrared cameras may have a high-power LED array emitting the same near visible infrared light which the camera can see but remains dark to human eyes.

In particular embodiments, the sensors may include gyroscope and accelerometer as high fidelity fast vibration sensor. The gyroscope and accelerometer may be instated as wall plug for detecting motion at the locations where the sensors are stalled (e.g., on or near blender to detection blender vibration). The system may use different signatures of different sounds and vibrations to determine the meaning of the sound. The system may use the difference in the direction of sounds or vibration as signature of the meaning. The gyroscope and accelerometer may have high fidelity data (e.g., vibration amplitude) than the fast vibration sensor.

In particular embodiments, the system may use a variety of different types of sensors together including, for example, but not limited to, online sensors for inferring presence and activity information as the data comes in, offline sensors for improving machine-learned training of the presence and activity inference system using the collective sensor data, as well as structured user data in some cases. The multi-sensor may have distinction of real time usage and offline usage. As an example and not by way of limitation, when the sensors detect that the microwave is on, the system may infer, in real time, that somebody is in the kitchen. When the sensor didn't detect presence in this room at time index zero, but at time index four, the dust sensor has an increasing level, the system may know that this dust sensor typically takes a given time delta (e.g., delta equals to four or more times of index slots) between activity and registering and increase in dust level. Therefore, the system may determine that the inference for no presence in this room on time index zero was incorrect. The system may use this information as training data to do better inference next time when time index is zero.

In particular embodiments, the sensor may include motion sensor which may be used to learn if there is currently a certain minimum level of motion in a room. In particular embodiments, the sensor may include a microphone whose data may be used by algorithms to learn if there is noise in the room and what type of noise. In particular embodiments, the sensor may include stereoscopic or complex microphone arrays which may be used in the same way as microphone as well as to locate the origin of a sound in the room through additional algorithms. In particular embodiments, the sensor may include a pressure sensor which may be used to determine someone is or is not sitting on a piece of furniture that has this sensor installed. In particular embodiments, the sensor may include an RGB camera which may be used to run computer vision algorithms to detect shapes and poses, detect people and animals, recognize people and animals by their pose or face or other identifiable attributes, run algorithms to perform motion and presence detection, or/and infer activity from poses. In particular embodiments, the multi-sensor may include integrated thermal imaging sensor. In particular embodiments, the sensor may include near-visible infrared camera (with or without NVIR light source) which may be used, in a similarly way to RGB camera, to augment RGB data, and to function in a useful manner when there is insufficient visible light for an RGB camera. In particular embodiments, the sensor may include a gyroscope and an accelerometer which may be used to detect movement, motion, vibration, and etc. In particular embodiments, the sensor may include a humidity sensor which may be used to help estimate coarse locations and numbers of people in an area, or inferring activities that involve changes in humidity such as cooking, taking a bath or shower. In particular embodiments, all of the sensors may individually perform additional processing on the raw data they record, or have their raw data be streamed to or downloaded by another part of the system to perform additional analysis in real time as well as offline.

In particular embodiments, the system may include some types of sensors which may provide a very highly reliable indicator that there is presence or a certain activity or state, with a very low false negative ratio but a slow response time and/or high false positive ratio. As an example and not by way of limitation, a dust level sensor may increase only if there has been some activity in the room, but it may take a fair amount of time before an activity results in the dust level sensor being triggered. By the time the dust level rises significantly, the activity may have started a substantial amount of time ago, and it may already have ended.

In particular embodiments, the system may include some other types of sensors which may provide an indicator that there is presence of a certain activity or state with a very low false negative ratio and a very short response time, but may be more ambiguous in its meaning and/or has a higher false positive ratio. As an example and not by way of limitation, an RGB camera based sensor may detect any change in its field of view almost immediately, but many of the changes it detects may be not indicative of an activity change, or presence change, but instead be a result of the daylight or artificial lighting conditions changing or another environmental change that may be not meaningful for the type of information the system tries to infer.

In particular embodiments, the combination of both types of sensors (e.g., slow response and reliable sensor, fast response and ambiguous sensor) may allow the system to improve or reduce the confidence of an inference as more time passes in a room, during or after an activity, when additional signals are available from different types of sensors that are all monitoring the same or adjacent areas. In particular embodiments, the combination of both types of sensors may be used after the fact, in automated and unsupervised as well as supervised processes, to train the system to better interpret data from fast sensors, by using the data from slower or other sensors to train that this was indeed a sign of a specific activity. In particular embodiments, the combination of different types of sensors may enable the system to make more highly confident and/or more accurate inferences.

In particular embodiments, the sensors may have computational capability and be capable of making decisions. In particular embodiments, the sensors may transfer data to the hub or cloud and rely on the hub or cloud to make decisions. In particular embodiments, decisions may be made partially by the sensor and partially by the hub or cloud. In particular embodiments, the sensors may do some data processing including, for example, but not limited to, power management, turning on/off the radio, making or maintaining the connection for communication, or managing battery life. In particular embodiments, the integrated thermal imaging sensor may have computer vision capability on the device and may not rely on transmitting raw frame data to external for processing. In some embodiments, the integrated thermal imaging sensor may transmit raw data to external for processing but there may be some initial processing that happens on the devices in most situations. For example, the BITS may determine the pixels difference between the frame and the last for motion detection. When there is motion with a certain level of confidence, the BITS may transfer data to the hub or cloud, where the system can make the multiple derivative data from sensors into multi-sensor perception data on presence and activities. The multi-sensor computing may be performed on a local or remote computer, a microcontroller, or cloud.

In particular embodiments, the multi-sensor may include a first category sensor which is reliable but not fast enough to use on its own. For example, a dust level sensor is reliable but a slow indicator whether there is or is not presence in the room. In particular embodiments, the multi-sensor may include a second category is very fast in response, e.g., thermal image sensor, but may be more likely for false positive or have higher noise. In particular embodiments, the system may combine the first and second category sensor to have better real time analysis. For example, someone may enter the room far away and stay there. The person may show up in the cameras as a little dot which is slightly brighter than other portions of the thermal image. The system may have very low confidence (e.g., 0.5 confidence score of presence), from the tiny dot, that someone is in the room. However, the dust sensor may detect that the dust level goes up indicating that dot is not noise and someone is in the room, and may increase the confidence score to 0.8, or 0.9 of presence. The system may put this information in the log of data to retrain that sensor, or a sensor in general, that this tiny dot may look like noise but it is not noise. This information may go into training data as positive detection of presence. Similarly, if the dot shows up, stays, and goes away again, and the dust sensor never goes up, the system may put in the training data that the dot may indicate unclear possibility and probably does not indicate the presence of user.

Connected Switch

In particular embodiments, the system may include the connected switch as an input device, a display device, and/or an electrical output device. In particular embodiments, the connected switch may work as an input device allowing the user to use one or more buttons, switches, knobs, or other tactile controls to provide input to the system. The inputs may be passed on to other components of the system over wired or wireless communication protocols. In particular embodiments, the inputs may have an immediate impact on the display or output device aspects of the BCS depending on configuration parameter of the BCS. In particular embodiments, the BCS may work as a display device showing the user information on one or more computer displays or through various other lower-fidelity outputs such as indicator LEDs. The information presented by the BCS may be determined by the hub and sent to the BCS over wired or wireless communication protocols. In particular embodiments, the information presented may also be determined by the BCS itself for immediate display. In particular embodiments, the BCS may also immediately display some of the information that is determined by it itself, and then follow-up by refining or replacing the information displayed when it receives additional or substitutive information to display from the hub or another component of the system.

In particular embodiments, the BCS may work as an electrical output device actuating one or more relays that are connected to one or more lighting devices, or other electrical devices (e.g. a ceiling fan) to in effect turn those devices on and off In particular embodiments, the BCS may control one or more dimmer systems that are connected to one or more lighting devices, or other electrical devices to in effect dim the lights or manipulate the speed of a connect fan, and/or support other use-cases for an electrical dimmer. In particular embodiments, the BCS may use different dimming strategies for different classes of connected electrical devices (e.g. incandescent lights, LED lights, or electric motors).

In particular embodiments, the BCS may be configured by the hub or other components of the system to directly manipulate its electrical output and/or electrical display output in response to the input generated from the BCS itself in a variety of preprogrammed ways (e.g. on push down of button one: turn on AC power to relay 1; on push up (end of push down) of button on: turn set indicator LED 4 to 100% brightness and display graphic 1 on display 1). In particular embodiments, the BCS may not manipulate its electrical output and/or display output directly in response to input, but only when it receives explicit commands to do so from the hub or one or more other specific devices in the system. In particular embodiments, the BCS may use any combination of the above configurations allowing a complete coupling or complete decoupling of input and output. In particular embodiments, the BCS may have multiple behavioral profiles between which the BCS may switch dynamically based on various conditions including, for example, but not limited to, having or not having a seemingly functional Wi-Fi connection, being able to or being not able to reach the hub over Wi-Fi, Bluetooth, or other supported protocols, being able to or being not able to reach one or more other devices in the system over a supported wired or wireless protocol, being able to or being not able to reach a specific online service over Wi-Fi, being seemingly connected or not being connected to the internet, or detecting a specific level of electrical load on any of the electrical relays or dimmer circuits. In particular embodiments, the configuration of behavior or behavioral profiles with conditions may happen remotely from the hub or other components of the system and changing these parameters may be prompted by the user or without user intervention.

In particular embodiments, the BCS may be configured to decouple its electrical output subsystem from its input subsystems and to decouple its feedback system display device for its input mechanism. The BCS may include, for example, but is not limited to, input system, button, and knob, for user to interact with. The BCS may allow user to configure switches to send the user input to hub instead of changing dimmer setting on its own when the user interacts with the switches. The hub, rather than the switches, may determine the dimmer setting when in need. As an example and not by way of limitation, when the user presses a button on the BCS that corresponds with turning the lights on, the hub may determine which exact devices to turn on, and which settings such as brightness and color temperature to use for each device, which may be different for each press of the same button on the BCS. As an example and not by way of limitation, when there are visitors, new users, or the system has determined there is a high likelihood of unintentional input, the system may respond differently from the same inputs from the BCS.

Some smart lightbulbs may have embedded computer in the lightbulb assembly and the smart lightbulbs may rely on the embedded computer to process data and make decisions. However, when conventional switches are connected to the smart lightbulbs, the power on the smart lightbulb may be turned off when the switches turn the light off. Once it loses power, the smart lightbulb will lose the smart functionalities which are based on the embedded computer. In particular embodiments, the BCS may solve this problem. In particular embodiments, the user may use one light switch to control both of a normal lightbulb or a connected smart lightbulb. The BCS may coordinate both the normal lightbulbs and smart lightbulbs. The system may allow standardization on the switches without no need for standardizing the technologies on the light source. It is an important advantage that the system may provide. In particular embodiments, the system may allow the user to have both color changing lightbulbs (e.g., smart lightbulbs) and normal lightbulbs. The system may allow the user to install a smart switch (e.g., BCS) in the same box as non-smart switches used for light fixtures but to bypass those switches. The system may allow the user to continue to use the non-smart switches in a way that the BCS relays their input to the hub, and the non-smart switches may not change the power condition to the lights.

For conventional smart or connected switches, including but not limited to Z-Wave switches, there are several problems pertaining to installation, maintenance, and functionality. For example, replacing switches is hard because the switches may be installed in the wall or otherwise constrained spaces. A switch that keeps a smart lightbulb powered even when turned off (for example a switch that replaces a conventional light switch but is only designed as a control interface), it is not safe for the user to change the lightbulb because of the risk of getting shocked. It is also not possible to power cycle the smart lightbulb. The software on some conventional smart light switches is not designed to act as a remote control. Conventional smart light switches are often not responsive enough to allow for immediate feedback when controlling a light or other electrical device that is not directly connected to them. In particular embodiments, the system may solve these problems by combining remote control functionality with electrical output functionality in a configurable fashion. In particular embodiments, the system may allow the user to remove a smart lightbulb and install a regular lightbulb as its replacement, without replacing the switch or rewiring it, instead when the user informs the system that a regular lightbulb is now installed, the switch may now change its input and electrical output behavior to be similar to a conventional dimmer switch.

In particular embodiments, the BCS may fit in the regular wall box for switches. The BCS may include physical control, touch device, and feedback to this physical control. The BCS may allow the user to know what the result is by looking at the room without looking at the switch. In particular embodiments, the BCS may be a battery powered remote control unit sitting on the table. As a replacement to the regular switches, the BCS may allow user to use them just as regular switches.

In particular embodiments, the thin hub may have multiple behavior profiles. When user touches a switch, the hub may know the user's location by the switch location and may react accordingly. When the user touches the switches and the switches are unable to reach the hub, the switches may use different configuration profiles, which may try to switch the lightbulb directly. The behavior profiles of each switch may have the information of which lightbulbs the switch the typically controls and the actions take when it cannot reach the hub. As an example and not by way of limitation, the on button on the switches may set the lightbulb to 100% brightness. In particular embodiments, the system may have dynamical configuration switching, depending on reachability of the hub and other factors and provide resilience and continuity in user experience. For example, a smart light bulb is normally behind this particular switch, the switch may determine not to directly control the power for this lightbulb. But for some particular cases, for example, when disconnected and reconnected to power, the switch may control the lightbulb to go 100% brightness and morning white color. In some other cases, when the switches may not able to reach hub or any other devices over wireless connection, the configuration profile may allow the switch to turn on or off the power of the lightbulb when user presses on the switch's button. When the hub is reconnected, the lightbulb is back to normal mode, and the software may tell lightbulb to keep its current state when user is in the room so that the user will not be disturbed. The system may wait when nobody is in the room to change the light based on the hub decision. When the hub is reconnected, the lightbulb is back to normal mode, and the software may tell lightbulb to go dimmer when nobody is in the room and nobody will see the light blink. In particular embodiments, the system is resilience for partial infrastructure failure. After the hub is the connected, the switch may report to the hub for the actions that were executed during the time that the hub cannot be reached. The hub may use this information to decide what is next action to take. In particular embodiments, the system may have most of its smart functionality implemented in the hub but the switches may be programmed with all the fallback default when the hub cannot be reached.

Software System

Software Architecture

Figure 3A:
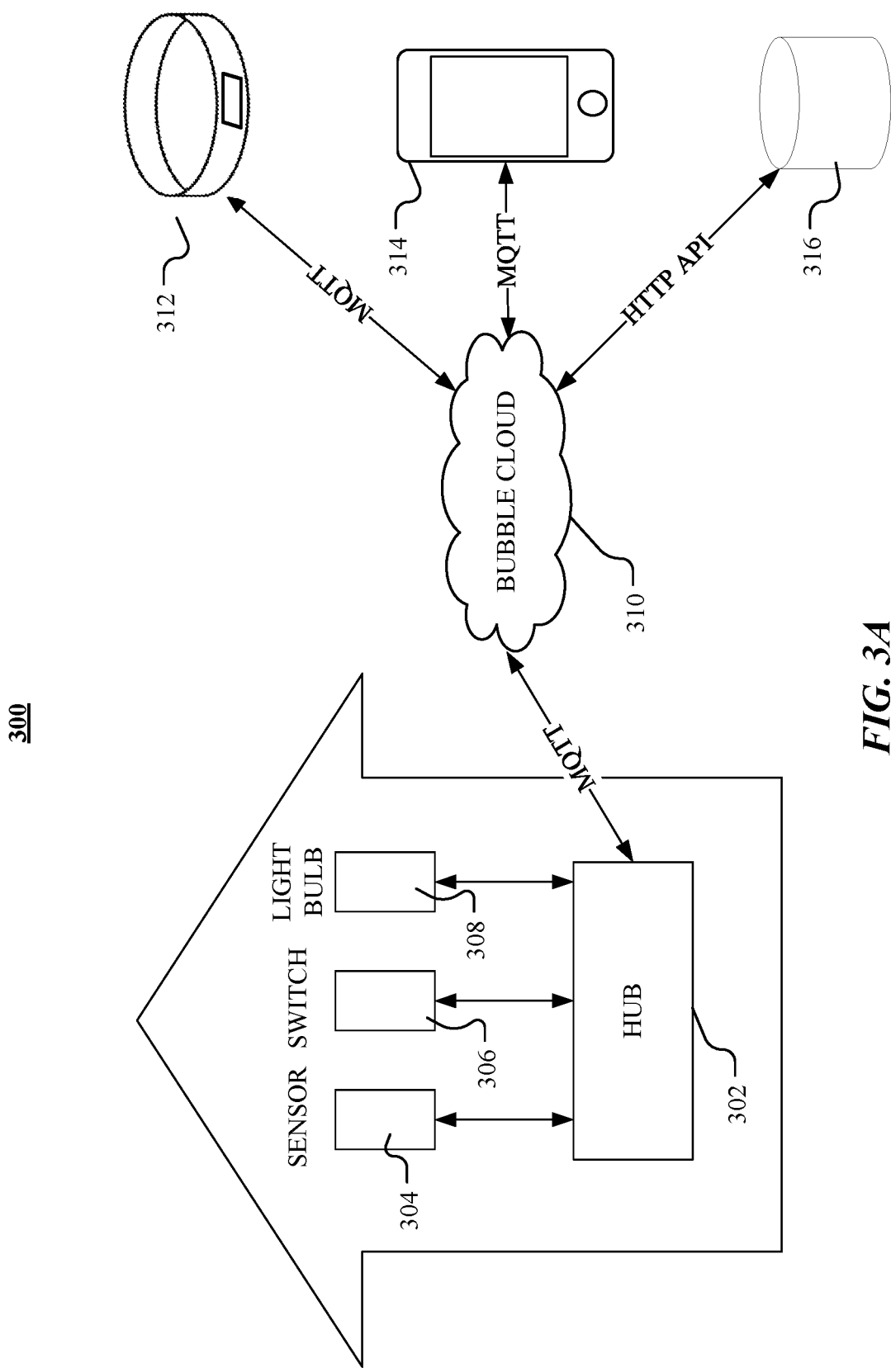
FIG. 3A illustrates an example high level software system architecture of the smart home system.

FIG. 3A illustrates an example high level software system architecture of the smart home system. In particular embodiments, the smart home system may be comprised of first-party hardware (e.g., hub 302, sensors 304, switches 306) and software and third-party hardware (e.g., lightbulbs Amazon Echo, Google, Home, Apple HomeKit Hue, or LifX, Z-wave locks) and software. In particular embodiments, the software may be running on a general purpose computer that's located in the home, and/or on a special built computing system (e.g., hub) that is either made by and/or provided by the first party, one of first party's business partners, or a third party. In particular embodiments, the third-party hardware and software may be connected to the first-party hardware and software via the first-party services, APIs, SDKs, or/and via the third-party APIs, SDKs with a variety of wireless protocols (e.g., z-wave, Zigbee, Bluetooth, etc.). In particular embodiments, the first-party hardware and software may communicate with other first-party hardware and software, as well as third-party hardware and software, using an MQTT API, other publish/subscribe-based APIs, a HTTP API, the Bubble TCP API, or other request/response-based APIs. In particular embodiments, the smart home system may include a hub, light switches, fixtures, light bulbs, door locks, thermostats, cameras, microphones, sensors, and other devices and subsystems. In particular embodiments, the hardware may be installed in the interior and/or exterior of home. In particular embodiments, hardware may also include wearables and mobile devices that the user carries around with her inside and outside of the home.

In particular embodiments, the hub and the cloud may create their respective database to maintain the concept of the home and the databased on the hub and in the cloud may be kept synchronized. In particular embodiments, the hub 302 may communicate with the devices (e.g., sensors 304, switches 306, light bulb 308, etc.) through the one or more wireless or wired communication protocols. As an example and not by way of limitation, the hub 302 may communicate with a first-party cloud 310 using a first-party cloud APIs and message queuing telemetry transport (MQTT) protocol. As another example and not by way of limitation, the hub 302 may communicate with the cloud 310 using a specialized Bubble TCP protocol, which may be a lightweight means of communication between connected devices, subscribers, and a centralized server. After the server and client initially establish a Bubble TCP protocol, a large number of messages can be exchanged in both directions over the connection. In particular embodiments, the Bubble TCP protocol may allow a low overhead communication by enabling a simple client device to exchange a large number of messages over a local network at a high rate (e.g., from several times per second to 16000 times per second) with a server. The Bubble TCP protocol may have some initial connection overhead but have a very low per-additional-message overhead. The Bubble TCP protocol enables the connected devices to perform their networking logic on the same thread as where they run their other logic, and makes it possible to use low-cost and simple single-core micro controllers to create sensors and input devices. The Bubble TCP protocol may guarantee integrity of messages by guaranteeing the received messages are consistent with what were sent by the sender. In particular embodiments, the Bubble TCP protocol may receive the messages in the same order in which the messages were sent. The Bubble TCP protocol may be resilient by detecting the loss of connectivity and reconnecting the devices frequently and quickly. The Bubble TCP protocol may be easy to implement by making the command set small and making all messages readable to humans. The Bubble TCP protocol may be easy to implement and debug in any SDK and programming language combinations that support a TCP stack. The Bubble TCP protocol may be future-proofed by making the protocol versioned, which allows the protocol to be improved and extended over time without breaking compatibility. The Bubble TCP protocol may be provided as part of the Bubble cloud APIs. The Bubble cloud may communicate to one or more user devices, for example, but not limited to, fitness devices 312, mobile devices 314, or any third party controlling devices 316 (e.g., Amazon Alexa) through one or more communication protocols (e.g., MQTT, Bubble TCP, HTTP). In particular embodiments, when the mobile devices 314 is within the home (e.g., connected through home WIFI), the mobile devices 314 may directly communicate with the hub 302 or any other devices (e.g., 304, 306, 308) in the smart home system. Although this disclosure describes and illustrates a particular smart home software system architecture having a particular number of particular components in a particular arrangement, this disclosure contemplates any suitable smart home software system architecture having any suitable number of any suitable components in any suitable arrangement. The example smart home system as illustrated in FIG. 3A is for illustration purpose of particular embodiments only and the smart home software system is not limited thereof.

Software for Hub

Figure 3B:
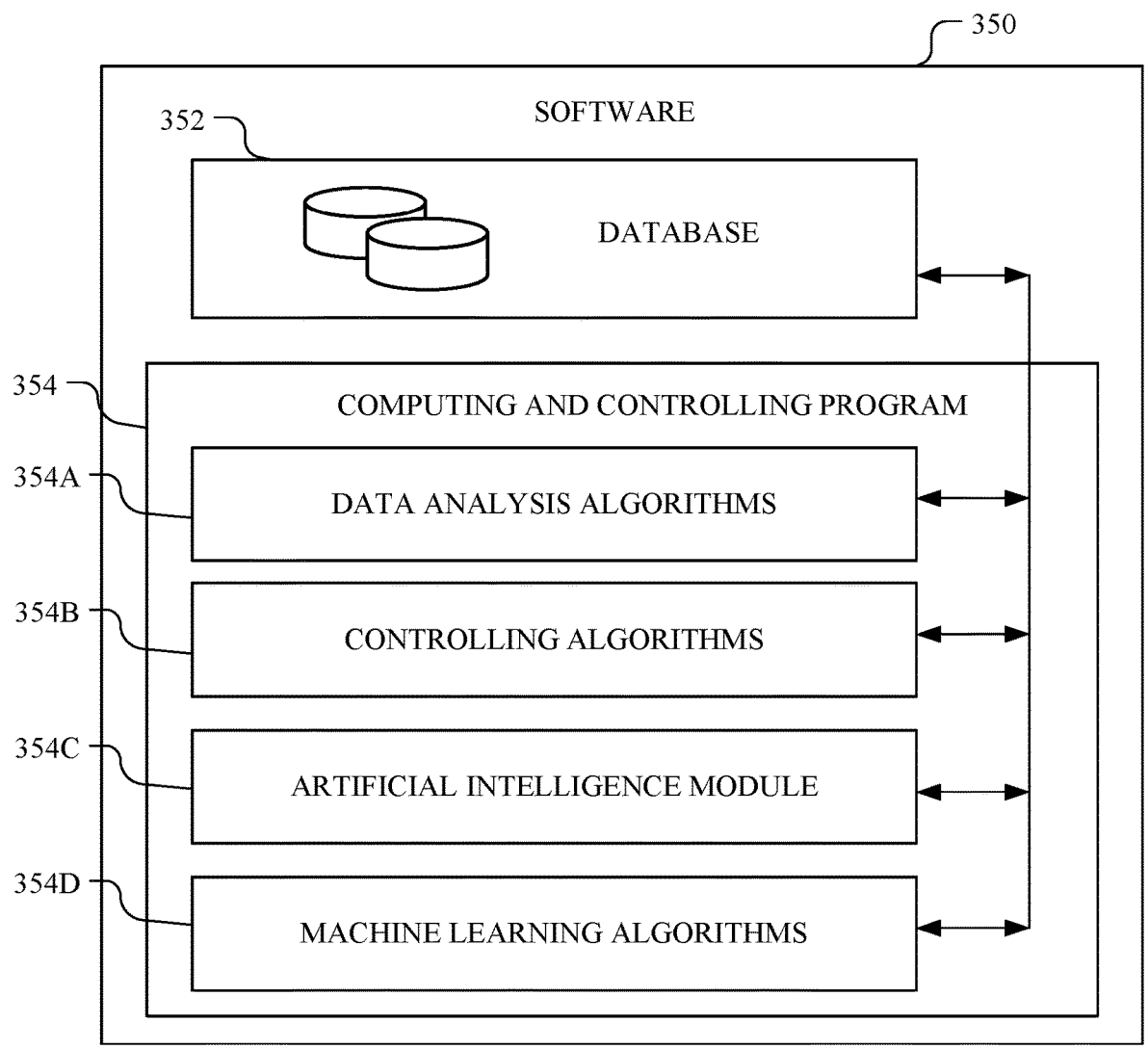
FIG. 3B illustrates an example high level software architecture for the controlling device

FIG. 3B illustrates an example high level software architecture 350 for the controlling device. In particular embodiments, the software 350 may include one or more local database 352 and one or more computing and controlling programs 354. The computing and controlling program 354 may include one or more data analysis algorithms 354A, one or more controlling algorithms 354B, an artificial intelligence (AI) module 354C, and one or more machine learning algorithms 354D. In particular embodiments, the data analysis algorithms 814A, the controlling algorithms 354B, the artificial intelligence module 354C, and the machine learning algorithms 354D are logically coupled to each other and may save and retrieve data from the local database 352. In particular embodiments, the data analysis algorithms 354A, the controlling algorithms 354B, the artificial intelligence module 354C, and the machine learning algorithms 354D are logically coupled to each other and may save and retrieve data from a remote database located in the server of the cloud.

In particular embodiments, the software system may include the home operating system, various cloud services, custom mobile application software, data analysis systems, machine learning (ML) algorithms, artificial intelligence (AI) algorithms, and etc. In particular embodiments, the software of the smart home system may run locally in the home (e.g., hub software, embedded device software), in the cloud (e.g., cloud software), and/or on mobile devices (e.g., client software, app). In particular embodiments, the system may continuously process input, infer changes in user presence, intent, and activity, and coordinate events (e.g., changes in lighting) to respond to those changes.

In particular embodiments, the user may use the app on the smartphone to interact with the devices through the hub when the internet at home is down. When the internet is down, the user may not be able to reach the cloud directly. The smartphone app may be able to connect directly to the hub and other devices in the home allowing the user to still have a good user experience when not connected to the internet, or otherwise unable to reach the first-party cloud. The cloud and the hub may be synchronized later when the connectivity problem has been resolved. In some other cases, the user may reach the first-party cloud directly (e.g., using a cellular data network) and interact with devices and other features of the system in the cloud (e.g., from a remote place other than home). The cloud server may keep the status in sync with the hub inside the home to allow the user to remotely control the home devices through the interaction with the devices in the cloud. The devices in the home are represented in the software architecture as objects (device representations) in the Bubble software, including but not limited to, in the hub software, in the cloud, or in the smartphone app regardless of whether they are currently reachable by the Bubble software. The devices may be managed from any of the software systems, which may maintain state and keep track of changes during connectivity issues, and resolve state differences automatically and transparently to the user when connectivity has been reestablished. In particular embodiments, the hub may decide to turn on or off a light bulb, using the internal device objects. The hub may decide to turn a light off, so it will set the state of the device representation to off, cause the actual light to turn off, and update to the cloud, while the user can see the change through the smartphone application. Although this disclosure describes and illustrates a particular software architecture having a particular number of particular components in a particular arrangement, this disclosure contemplates any suitable software architecture having any suitable number of any suitable components in any suitable arrangement. The example software as illustrated in FIG. 3B is for illustration purpose of particular embodiments only and the software of the controlling device is not limited thereof.

Device Controller and Services

Figure 3C:
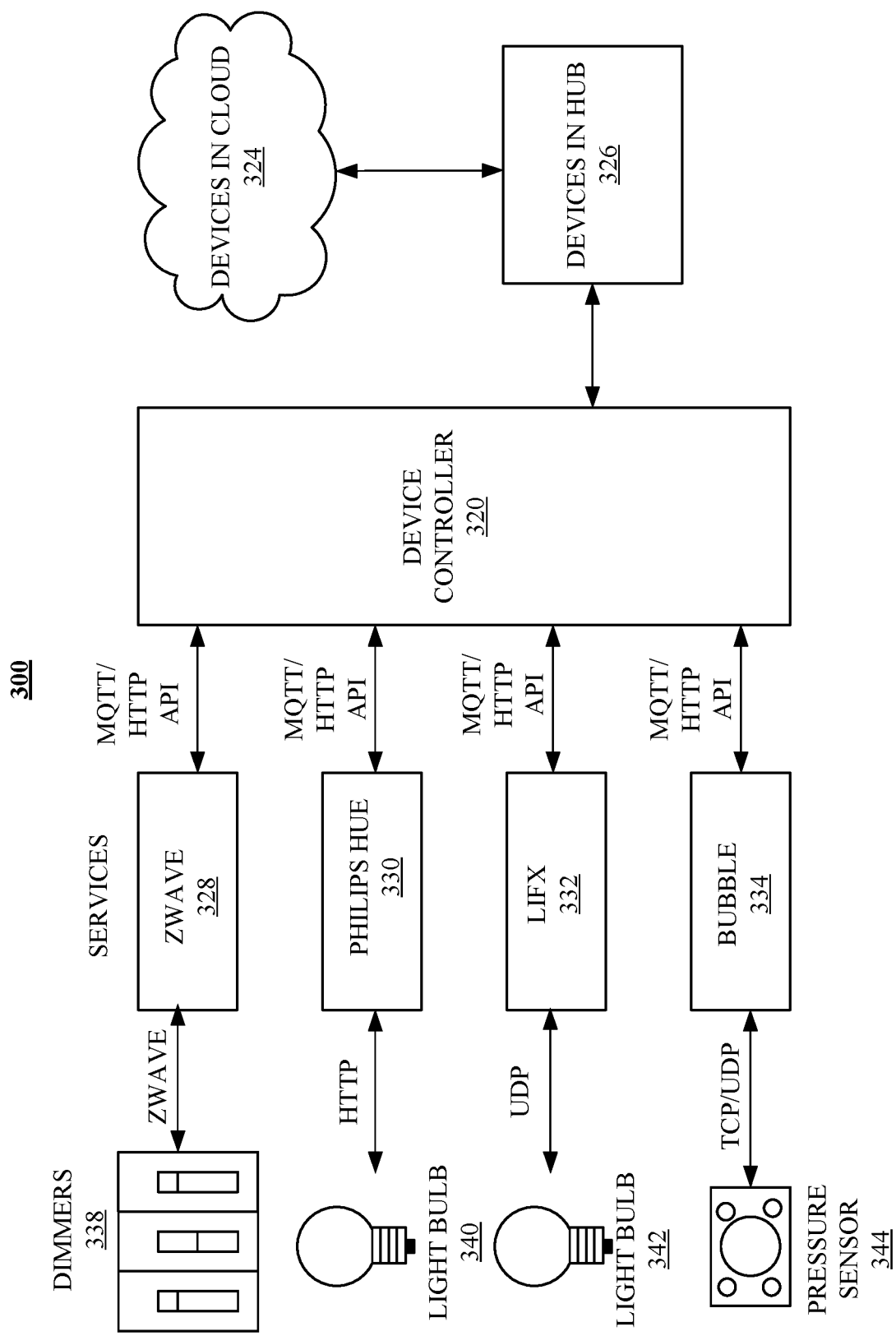
FIG. 3C illustrates an example software system of the smart home system.

FIG. 3C illustrates an example detailed architecture of the software system. In particular embodiments, the software system may include a device controller 320 which may communicate with and control the devices in the cloud 324 and the devices in the hub 326. In diagram, "devices on hub" and "devices in cloud" may refer to representations in memory of a hardware device that is kept in sync by the central device controller. Any change made to a "device" by the hub (e.g., a scheduled automation turns a light off) may be propagated to the "device" in the cloud, and any change made to the "device" in the cloud may be propagated to the "device" in the hub. In particular embodiments, the hub 302 may run one or more services for each supported protocol. The services may send and receive messages to/from the hardware (e.g., dimmers 338, light bulbs 340 and 342, pressure sensors 344). The service may also maintain communication with the device controller 320 over a suitable API protocol (e.g., MQTT, HTTP, or Bubble TCP) that can initiate network scans, get device lists, set device state, and subscribe to device updates. The first-party device controller may convert the raw hardware information into device objects, which are read/writable by the software system internally and from the cloud (e.g., over MQTT).

As an example and not by way of limitation, the device controller 320 may communicate with a z-wave services 328 though an API. The z-wave service may control and communicate with the dimmers 338 using z-wave protocol. As another example and not by way of limitation, the device controller 320 may communicate with a Philips hue service 330 through an API. The Philips hue service 330 may control and communicate with the light bulb 340 using HTTP. As another example and not by way of limitation, the device controller 320 may communicate with a LIFX service 332 through MQTT or HTTP APIs. The LIFX 332 may control and communicate with the light bulb 342 using UDP. As another example and not by way of limitation, the device controller 320 may communicate with a first-party service 334 through an API. The first-party service 334 may control and communicate with the pressure sensor 344 through UDP. Although this disclosure describes and illustrates a particular software implementation having a particular number of particular components in a particular arrangement, this disclosure contemplates any suitable software implementation having any suitable number of any suitable components in any suitable arrangement. The example software as illustrated in FIG. 3B is for illustration purpose of particular embodiments only and the software of the controlling device is not limited thereof.

Software Modules and Routing Paths

Figure 4A:
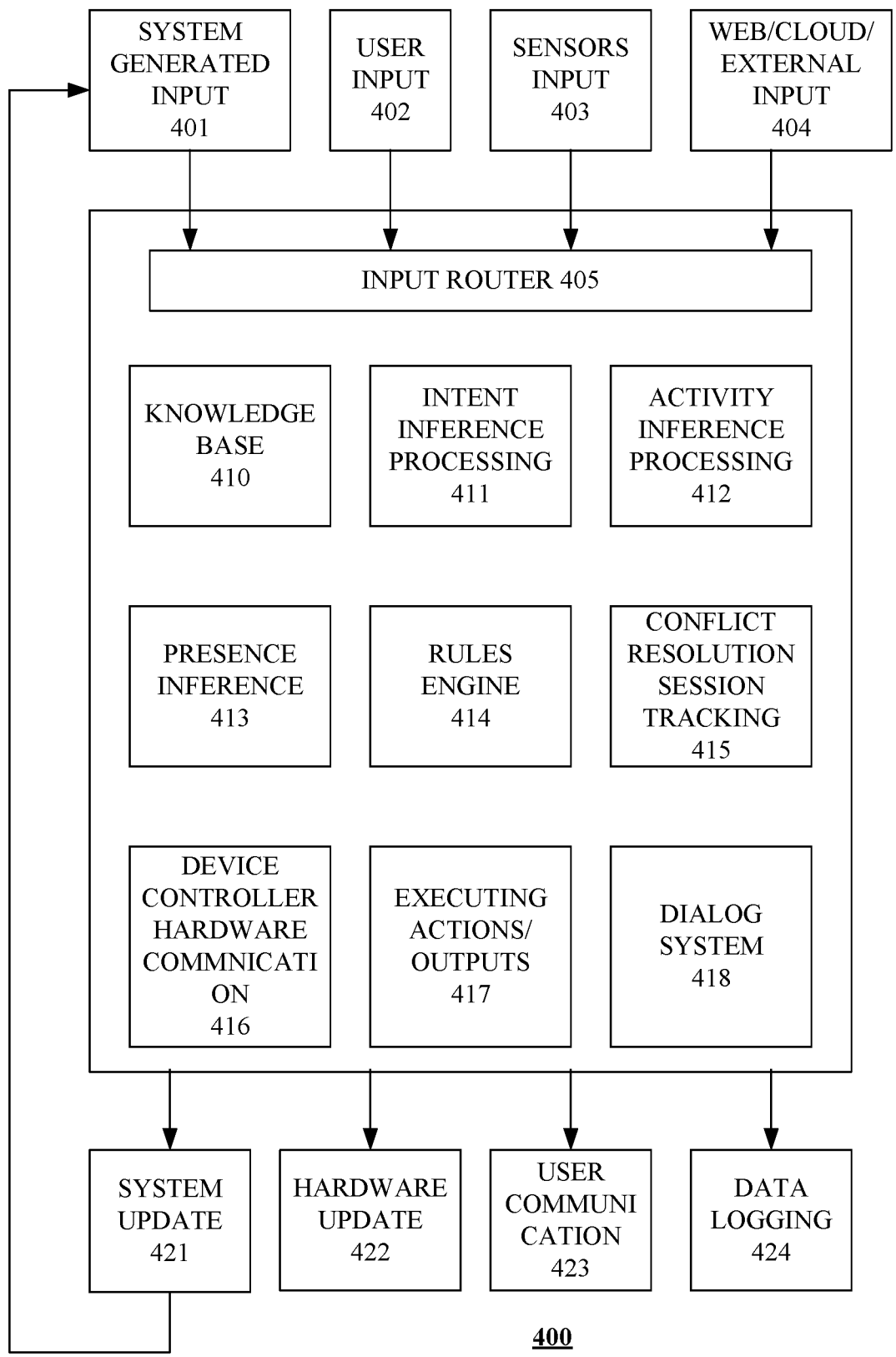
FIG. 4A illustrates the subsystems and modules of the software system.

FIG. 4A illustrates the subsystems and modules of the software system. In particular embodiments, the main software system may run locally in the home on the hub. In particular embodiments, the system may be comprised of a number of components, subsystems, or modules including, for example, but not limited to, input router 405, knowledge base 410, intent inference processing module 411, activity inference processing module 412, presence inference module 413, rules engine 414, conflict resolution session tracking module 415, hardware communication module 416, action executing and output processing module 417, dialog system 418, and anomaly/pattern detection module. In particular embodiments, the system may have a variety of inputs including, for example, but not limited to, system generated input 401, user input 402, sensors input 403, external input from web or cloud 404. The inputs may be transmitted to the input router 405 which may determine which module or subsystem the input should be routed to. As an example and not by way of limitation, the user input 402 may be routed to the intent inference and processing module 411 to infer the intent of the user based on the input. As another example and not by way of limitation, the sensors input 403 may be routed to the presence inference module to determine the presence of users.

In particular embodiments, the subsystems, modules, and components in the software system may be independent to each other but may interact with each other or any reasoning process about the input in order to synthesize an output. The software system may have a variety of outputs including, for example, but not limited to, system update 421, hardware update 422, user communication 423, and data logging 424. In particular embodiments, the system update 421 may be used as system generated input or contribute to the system generated input 401, which may be fed to the input router 405 of the software system. Therefore, in particular embodiments, the input of the software system may be system generated input 401 based at least in part on one or more of the former outputs. The hub may manage communication with the hardware installed in the home and act as a central gateway to multiple hardware communication protocols including, for example, but not limited to, z-wave, Philips Hue (e.g., over local http), LIFX (e.g., over local UDP), and Bubble protocol (e.g., over local UDP). Although this disclosure describes and illustrates a particular software implementation having a particular number of particular components in a particular arrangement, this disclosure contemplates any suitable software implementation having any suitable number of any suitable components in any suitable arrangement. The example software as illustrated in FIG. 4A is for illustration purpose of particular embodiments only and the software of smart home system is not limited thereof.

Figure 4B:
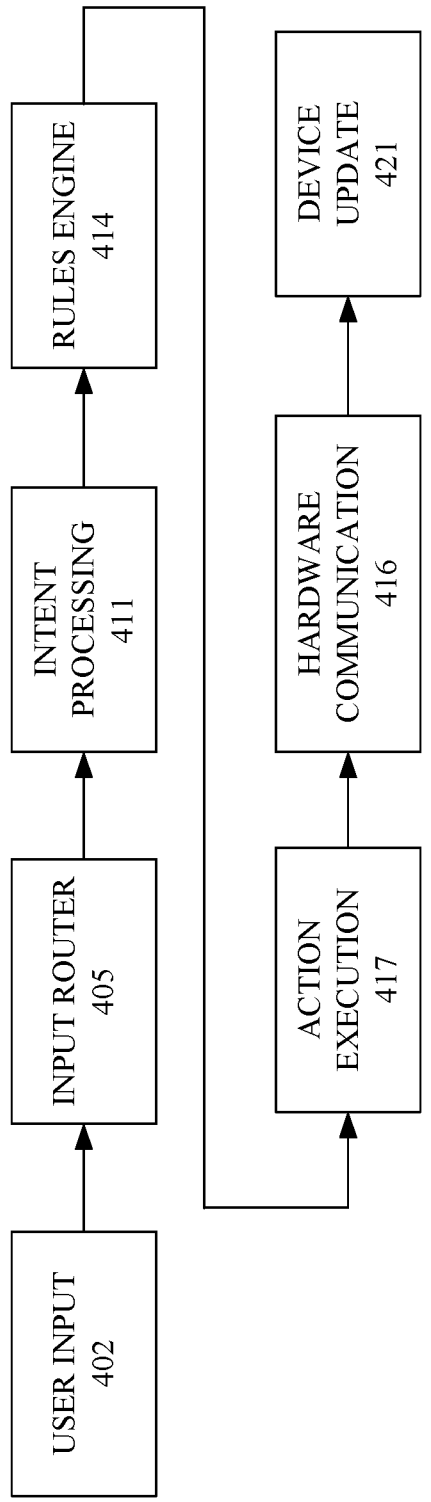
FIGS. 4B-F illustrate example routing paths of inputs being routed among different modules or subsystems.
Figure 4C:
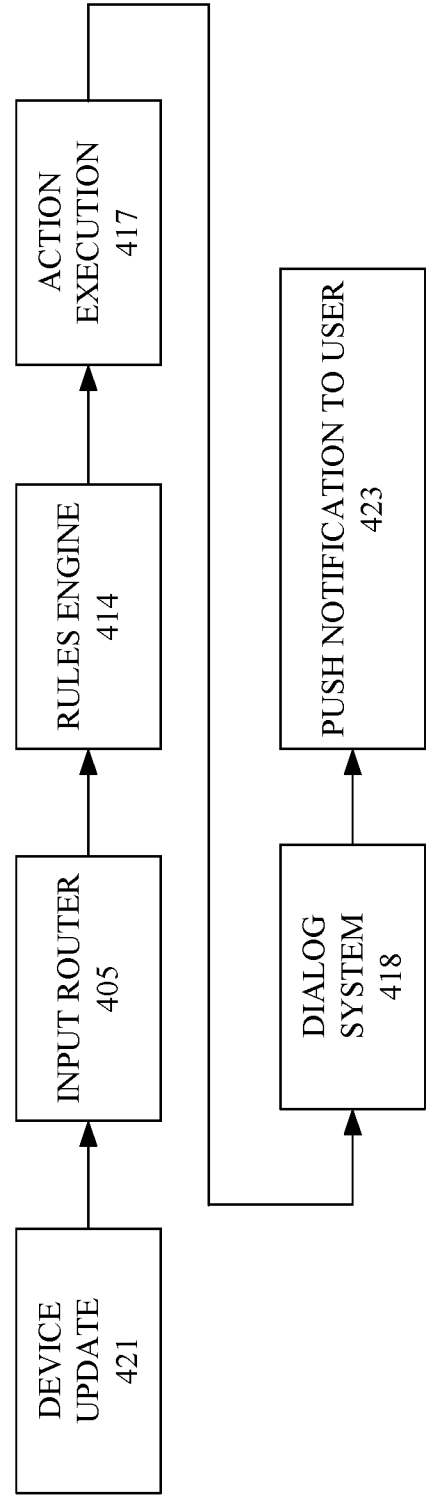

FIGS. 4B-F illustrate example routing paths of inputs being routed among different modules or subsystems. The inputs may be routed to different subsystems or modules based one or more characteristics of the inputs. As an example and not by way of limitation, as illustrated in FIG. 4B, the user input 402 may be sent to the input router 405. The input router 405 may route the user input 402 to the intent processing module 411 to infer the user intent. The inferred user intent may be sent to the rules engine 414 which may determine the actions need to be taken. The output of the rules engine 414 may be sent to the action execution module 417 for executing the actions. The action execution module 417 may send instructions to the hardware communication module 416 which may generate the output of device update 421. As another example and not by way of limitation, as illustrated in FIG. 4C, the device update 421 may be sent to the input router 405 (e.g., as the system generated input). The input router 405 may route the device update input to the rules engine 414 which may determine the actions to be executed. The rules engine 414 may send the actions to the action execution module 417 for executing the actions. The action execution module 417 may send instructions to the dialog system 418 which may send out push notification 423 to the user as output. The rules engine may subscribe to that update of the devices. When the devices are updated, the state change of the system may become inputs and be fed to the rules engine. The rule engine may send a push notification to user each time the device updated. The device updating that may trigger to push notification to use may include, for example, but are not limited to, smoker detector detecting smoke or a teenage unlocking the front door after 10:00 pm. The observer (e.g., rules engine) in the system may decide what will be observed. When the system determine that no actions are needed for certain input or devices updating, the devices updates or input may stop at the input router and may be not passed to other modules.

Figure 4D:
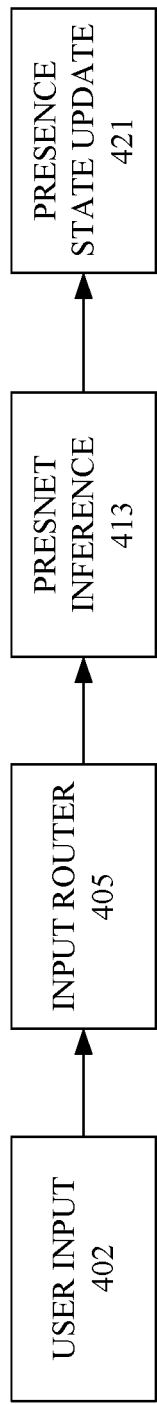
Figure 4E:
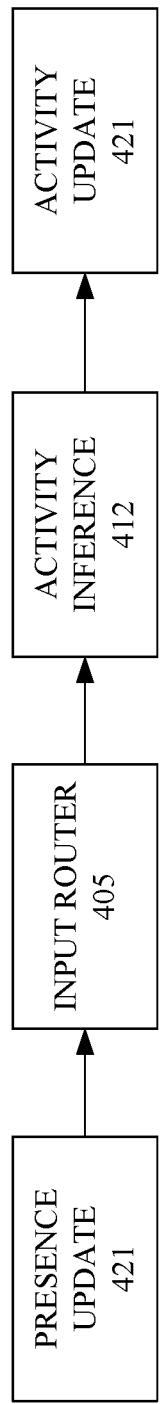
Figure 4F:
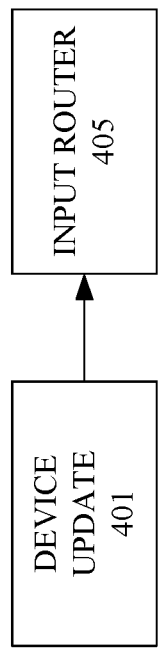

As another example and not by way of limitation, as illustrated in FIG. 4D, the user input 402 may be send to the input router 405. The input router 405 may route the user input 402 to the presence inference module 413. The presence inference module 413 may make the inference on the user presence and send information to update the presence state as output. As another example and not by way of limitation, as illustrated in FIG. 4E, the presence update 421 may be sent to the input router 405 as input. The input router may route the presence update 421 to the activity inference module 412 which may determine the user activities. The activity inference module 412 may update the activity information as output. As another example and not by way of limitation, the device update 401 may be sent to the input router 405 as input. The input router 405 may determine not to route the input to any subsystems or modules. Although this disclosure describes and illustrates particular routing paths having a particular number of particular steps in a particular arrangement, this disclosure contemplates any suitable routing paths having any suitable number of any suitable steps in any suitable arrangement. The example software as illustrated in FIGS. 4B-F is for illustration purpose of particular embodiments only and the software of smart home system is not limited thereof.

Input Router

In particular embodiments, the software system may include the input router which may collect and package raw input into input objects, which may be forwarded to interested subsystems of the software system. In particular embodiments, a subsystem may get input sent to it by subscribing to an input type and some conditions. In particular embodiments, input may be used by the reasoning system to infer presence, user intent, and activity, and the input may result in updates to the state of the home, updates to user sessions, updates to the home's devices (e.g., lighting changes, temperature adjustments, etc.), and communication back to the user in order to get confirmation or resolve ambiguity. In particular embodiments, input may also be used to generate more, higher level input that will feed back into the system. As an example and not by way of limitation, the system may use the raw motion events to generate presence events and activity events based on the raw motion events.

In particular embodiments, input may be used to train machine learning models and other AI algorithms in order to improve the system's reasoning abilities. In particular embodiments, input may be made available to users and third parties via the data stream APIs. In particular embodiments, the system may accept multiple channels of input via cloud APIs (e.g., HTTP, MQTT, Bubble TCP, etc.) and/or local network communications (e.g., z-wave, Zigbee, Bluetooth, WIFI, etc.) In particular embodiments, input may be initiated by the user or by automations running on the user's behalf, by changes to the environment that are picked up by sensors inside and outside of the home, by updates to information from external sources (e.g., weather, news, calendars, social accounts, online services, etc.), or by other sources.

In particular embodiments, the user may provide input to the system by interacting with physical controls in the home, such as, light switches or software control panels. Physical controls may be made by the first party (i.e., Bubble) or made by third parties. The physical controls may communicate to the system locally via wireless communication (e.g., WIFI, z-wave, Zigbee, Bluetooth, etc.) or via the cloud using first-party cloud service and APIs or a third-party cloud service or any combination.

In particular embodiments, the system may allow user to speak to a voice enabled device. The voice-controlled device or voice-enabled device may be a first-party device, or a third-party device like Amazon Echo. The device may be located in the home, or it may be a mobile device (e.g., phone or watch). The voice-controlled device may communicate to the system locally via wireless communication or through the cloud using first-party cloud services/APIs or a third-party cloud service with first-party integration (e.g., first-party Alexa Skill) or any combination.

In particular embodiment, the system may allow user to interact with a mobile application (e.g., smart phone app, smart watch app), which may send input to the system via the cloud API or locally using HTTP over WIFI. In particular embodiments, the app could also be a third party mobile app, such as, the Alexa app or Philips Hue app. In those cases, the input may be communicated via integration between a third-party API and the Bubble API (e.g., first-party Alexa Skill), or it may be inferred by the local system by noticing changes in the device states.

In particular embodiments, the system may allow user to send text messages/SMS to first-party agents. In particular embodiments, the cloud system may receive and send SMS messages using a third-party platform like Twilio. The content of the SMS may be parsed and sent to the system as language input, similar to voice input. In particular embodiments, sensor input may be from cameras (e.g., thermal cameras, RGB cameras) microphones, thermometers, dust, humidity, motion sensors, moisture sensors, and etc. Various sensors may be installed in the interior and exterior of the home to monitor the environment. The sensors may be first-party sensors or third-party sensors. The sensors may communicate with the hub via local wireless communication like WIFI or z-wave, or they may communicate to the cloud using the Bubble cloud APIs and SDKs or third-party APIs/SDKs.

In particular embodiments, the system may generate its own input, on top of user or sensor input. As an example and not by way of limitation, the system may generate input including updates to inferred presence or activity state. In particular embodiments, the system may collect input from external web APIs for data including, for example, but not limited to, weather, news, calendars, email, social media updates, service provider updates (e.g., DoorDash, Lyft, Instacart, etc.).

Rules Engine

In particular embodiments, the rules engine may collect and evaluate any number of rules. In particular embodiments, rules may be created at run-time. In particular embodiments, a rule may be a combination of an event (optional, if none, execute immediately), conditions to be evaluated (optional, if none, treat as conditions are met), and/or actions to take if conditions are met. For example, when the motion detector detects motion, the rules may allow the system to turn on the light.

Before executing the actions, the rules engine may perform conflict resolution. The rules engine may also keep track of intents that are the origin of the rule and may have a concept of a user session. The rules engine may perform conflict resolution based at least on the information about the rules, user intent, and information from the user session. As an example and not by way of limitation, if there is a rule of "turn on the bedroom lights to full brightness at this time", but there is a user session that expresses there is someone sleeping in the bedroom, the conflict resolution system may choose not the execute the action of that rule. The rules engine may determine priority and weight to action based on input. As an example and not by way of limitation, the input from light switches may have higher priority than schedule that was scheduled weeks ago. In particular embodiments, the rules engine may accept rules from user through a graphic user interface of the system software. The system may detect your routine and decide to create rules for the user. The intend processing may generate rules and input the generated rules to the rule engine. The rules engine may also accept state updates and logic update based on intend processing results.

Conflict Resolution

In particular embodiments, when the system has multiple active sessions, or one active session and a new intent-generating input, the system may have to decide between two or more different ways to react. As an example and not by way of limitation, a user enters a room on a time and the user is expected to enter that room for a certain activity (e.g., eating dinner), but another user is already present in that room and is thought to be engaged in another activity (e.g., reading at the dinner table) that has different ideal conditions associated with it. In these situations, the system may attempt to use an understanding of the various activities, contextual information, and previously monitored behaviors (among other things) to determine the correct cause of action autonomously. If the system is unable to make a confident choice, the system may use the agentive system to ask the user for disambiguation.

Database and Knowledge Graphs

In particular embodiments, the hub may maintain a database of "The Home" that describes the features of the particular home installation (e.g., rooms, areas, presence events and activities occurring in each area, devices, people living there, people's current location, preferences and configurations, etc.). In particular embodiments, the database may be kept up to date and always represent the current state of the home. In particular embodiments, the database of the home may also be available via an MQTT API, other publish/subscribe-based APIs, an HTTP API, the Bubble TCP API, or other request/response-based APIs from the cloud.

In particular embodiments, the system may have knowledge about the domain of "The Home" that the system can use to reason about input and make decisions about how to react properly. In particular embodiments, the knowledge may include, for example but is not limited to, what activities are typically associated with different types of rooms (e.g., bedroom, living room, kitchen, etc.), what are the best lighting conditions for different activities, what types of lighting (e.g., task, ambient, etc.) are generated from different types of light fixtures. In particular embodiments, this domain knowledge may allow the system to provide different outcomes depending on the context, by which the home may better support the people who live with it.

In particular embodiments, the database may include one or more knowledge graphs. In particular embodiments, the smart home system 100 may use a knowledge graph comprising multiple layers of knowledge to interpret the user's intention and infer the user's activities. In particular embodiments, the smart home system 100 may use the knowledge graph with the multiple layers of knowledge to operate more autonomously and respond more appropriately. In particular embodiments, the multiple layers of knowledge may be stored in a database associated with the smart home system. As an example and not by way of limitation, when the smart home system detects a motion in bedroom on 11 pm, the smart home system 100 may turn on a little bit of light to allow the user not to trip over stuff, and when the smart home detects that the user is walking, the smart home system 100 may actuate devices to get enough light to allow the user to more clearly see everything but with a warm color light to avoid waking the user too much. As an example and not by way of limitation, the lights in an entryway would respond differently to motion at night than those in a bedroom. As an example and not by way of limitation, the smart home system 100 may turn off the light at entryway when there is no motion for 2 minutes since typically people don't stand still in the entryway for a long time. As another example and not by way of limitation, the smart home system 100 may wait for a longer time (e.g., at least 20 minutes) after no motion is detected in the living room to turn off the lights there since there might still be somebody there.

In particular embodiments, the smart home system 100 may have the basic knowledge graph setup by the contractor installing the smart home system including the pre-defined list of types of rooms. The basic knowledge graph may be linked back to the generic description of room types provided with the smart home system.

In particular embodiments, the generic description of room types provided with the smart home system 100 may be customized based on different factors such as the culture of the users. The setup process and customization process of the smart home system 100 may be completed before the users have the first experience of coming into the home and living in the home.

In particular embodiments, the multiple layers of knowledge may include various types of information related to the home or space. The multiple layers of knowledge may include generic knowledge of types of rooms including, for example, but not limited to kitchen, bathroom, living room, bedroom, storage room, and entryway. The multiple layers of knowledge may include knowledge about the domain of "The Home". The multiple layers of knowledge may include specific knowledge of the rooms in the home where the smart home system is installed, such as, a name and semantically meaningful descriptions for each room. The multiple layers of knowledge may include specific knowledge of where specific devices are located in the home, such as, which devices are located in which rooms, where devices are located relative to each other as well as relative to various architectural features of the home. The multiple layers of knowledge may include an approximate 3-dimensional model of the home including, for example, but not limited to, approximate dimensions, orientations, transparency, and relative locations of areas, rooms, architectural features, fixtures, devices, and various interior and exterior objects that may have an effect on interior conditions, with variable levels of accuracy, precision, probability, and fidelity as well as variable metadata for each data point included in the approximate 3-dimensional model. The multiple layers of knowledge may include generic knowledge of relationships between tenants of a space including, for example, but not limited to familial relationships, visitors, or service providers. The multiple layers of knowledge may include specific knowledge about the people who live in the home, for example, the age of children. The multiple layers of knowledge may include specific knowledge about local conditions such as the weather. The multiple layers of knowledge may include specific knowledge about the tenants' calendar and schedules. The multiple layers of knowledge may include specific knowledge derived from machine learning algorithms that detect patterns in various sources of data, including but not limited to sensor data, user input, and other available metadata. The multiple layers of knowledge may include user-provided configuration parameters or user-provided preferences. The multiple layers of knowledge may include training data or other metadata that describes connections and relationships between elements in various layers of knowledge. The multiple layers of knowledge may interconnect raw input data, facts, probabilities, rules, skills, procedures, schedules, plans, strategies, language, and conceptual principles. The multiple layers of knowledge may be used to generate and choose between alternative possible inferences, actions, and/or outcomes. The multiple layers of knowledge may be used to facilitate the interpretation of previously unknown combinations of knowledge based on their similarities and differences to known combinations of knowledge.

In particular embodiments, the general knowledge may include type of rooms, what kind of activities likely to take places in each type of room, or what are the ideal conditions for each type of room and activity. In particular embodiments, the specific knowledge may include knowledge about a specific type of room in specific ways, for example, a living room having a specific design, the light of the living room in certain way for anticipated certain social interaction, or other customized behaviors.

In particular embodiments, the smart home system 100 may have a database for numerous types of persons as defined by their relationship to the household. In particular embodiments, the general knowledge in the database may include the relationship of tenants, age of tenants, ages of children, head of household, visiting family relationship, service providers like cleaner, gardener, or food delivery person. Each type of person may have different needs. As an example and not by way of limitation, when a frequent visitor, or scheduled service provider with specific needs different from those of the regular occupants of the house, such as a home cleaner enters the home, the smart home system 100 may override the normal mode by giving the cleaner the best possible light for cleaning purposes and go back to the normal mode after the cleaner leaves. As another example and not by way of limitation, the smart home system 100 may respond differently to adults in the household than it does to children in the household, such as not allowing children to unlock the exteriors doors after during certain hours. In particular embodiments, the smart home system 100 may have a database for numerous types of rooms in numerous types of buildings. In particular embodiments, the specific knowledge for a specific home may include, for example, "the home has one entry way", "the smart home system is installed in living room", "the kitchen has these configurations", or "each room is assigned with a room type". In particular embodiments, the generic knowledges and the specific knowledge may be logically linked or coupled. In particular embodiments, the knowledge of different layers may be logically linked and or coupled. Although this disclosure describes knowledge graphs and knowledge in a particular manner, this disclosure contemplates knowledge graphs, knowledge bases, and knowledge in any suitable manner.

Figure 5A:
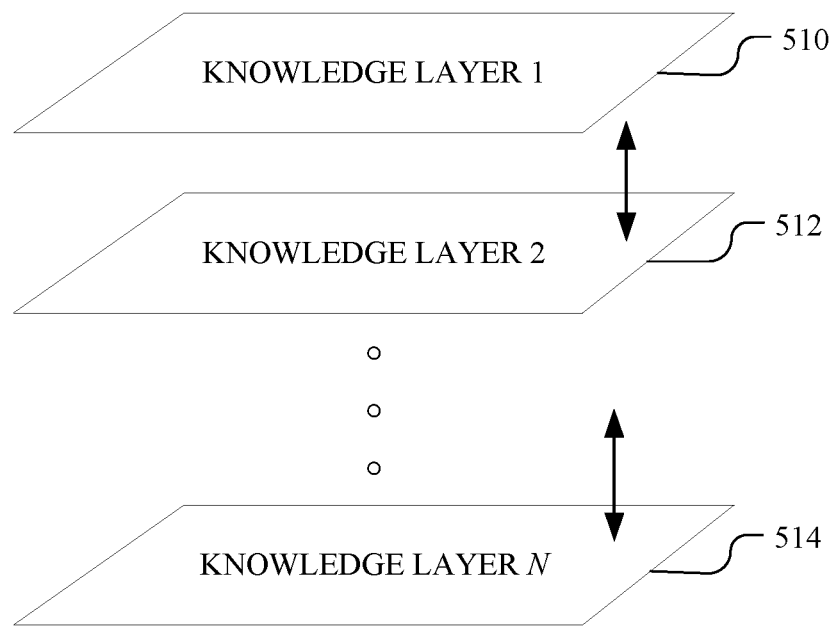
FIG. 5A illustrates an example of N layers of knowledge.

FIG. 5A illustrates an example of N layers of knowledge. In particular embodiments, the smart home system may use multiple layers of knowledge to interpret the user's intention and control the devices accordingly. In particular embodiments, the multi-layer knowledge may have N layers of knowledge, wherein N can be any positive integer. In particular embodiments, the knowledge layer with greater layer number may have more specific knowledge than the knowledge layer with smaller layer number and the knowledge layer with smaller layer number may have more general knowledge than the knowledge layer with greater number. As an example and not by way of limitation, the first layer knowledge 510 may include general knowledge about the types of rooms (e.g., kitchen, bathroom, and entryway), the second layer knowledge 512 may include specific knowledge of which room of the home the system is installed in, and the Nth layer knowledge 514 may include more specific knowledge about the user specific routines in specific rooms. The example of N layers of knowledge illustrated in FIG. 5A is for illustration purpose only and the multiple layers of knowledge are not limited thereof.

Figure 5B:
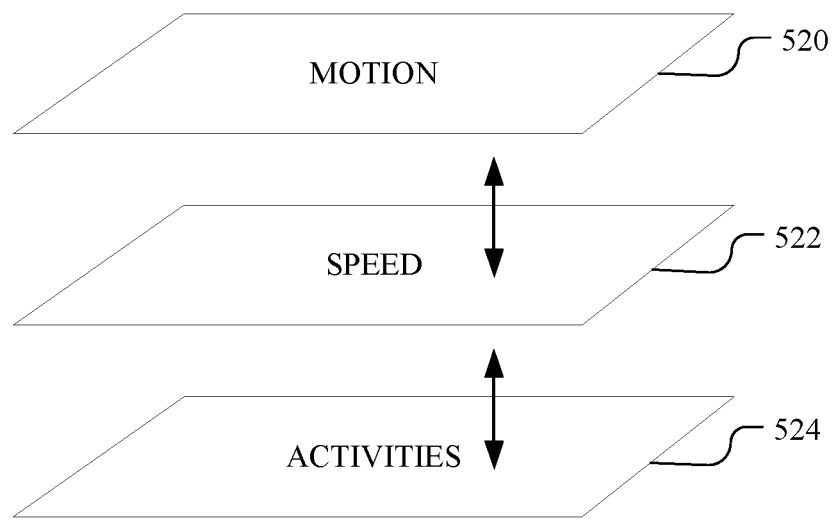
FIG. 5B illustrates an example of 3 layers of knowledge for data classification of a motion sensor.

FIG. 5B illustrates an example of N=3 layers of knowledge for data classification of a motion sensor. In particular embodiments, the smart home system may include a motion sensor which detects the motion of user and sends data to the smart home system. In particular embodiments, the motion sensor may include one or more thermal imaging devices. In particular embodiments, the thermal imaging devices may capture images of certain space at a speed of 9 frames per second. In particular embodiments, the smart home system may use the controlling device to process the data and interpret the data using the multiple layers of knowledge. In particular embodiments, the controlling devices may compare each frame with previous frame to detect and locate the motion. In particular embodiments, the smart home system may perform the first layer interpretation based on detected motion. As an example and not by way of limitation, the first layer of knowledge 520 may include the knowledge for data characterizations that can indicate a motion being detected. The second layer of knowledge 522 may include the classification of the motion data based on a number of parameters, such as, the frequency of the motion, the size of moving object, or the motion speed of the detected motion. In particular embodiments, the smart home system 100 may use a data classifier to classify the data based on different parameters. The third layer of knowledge 524 may include the knowledge for activities associated with the detected motion. In particular embodiments, the smart home system 100 may include knowledge about description of activities. An as example and not by way of limitation, the activity of reading a book may be described by a motion profile for a typical user reading a book. The motion profile may include different parameters on a scale of 0 to 1. The parameters may include, for example, a typical frequency of motion being 0.2 to 0.4, a speed of motion being 0.3. to 0.4, a size of moving object being 0 to 0.1. As an example and not by way of limitation, the activity of working out may be described by another motion profile depending on the specific activities of the user, such as, running or doing slow yoga. In particular embodiments, the smart home system may have knowledge of motion profiles for matching the likely activities based on the classified sensor data which is based on the basis sensor data. The example of 3 layers of knowledge illustrated in FIG. 5B is for illustration purpose only and the multiple layers of knowledge are not limited thereof.

Figure 5C:
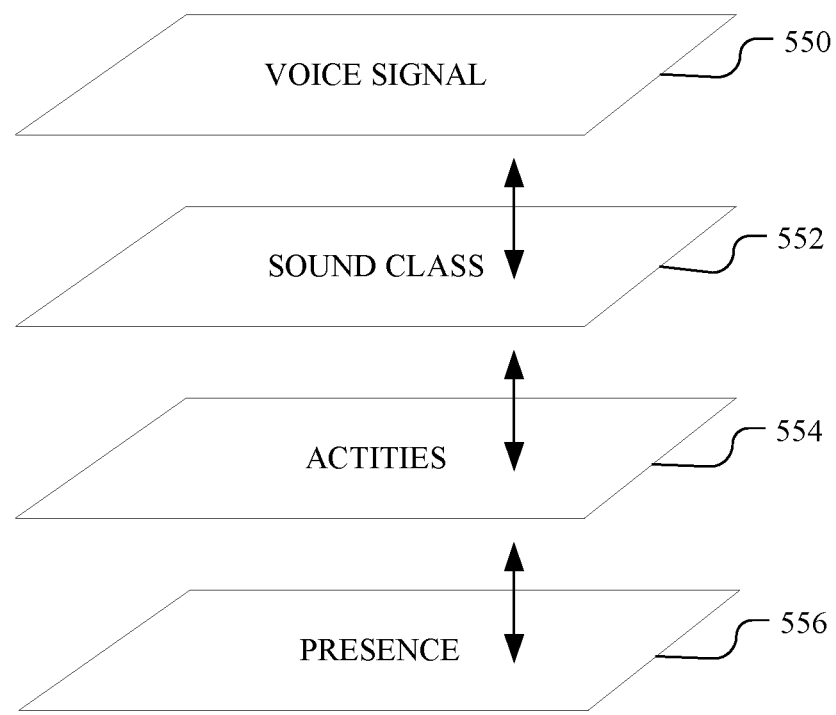
FIG. 5C illustrates an example of 4 layers of knowledge for data classification of a microphone sensor.

FIG. 5C illustrates an example of N=4 layers of knowledge for data classification of a microphone sensor. In particular embodiments, the smart home system may include a microphone sensor which detects the voice signal of the user and sends data to the smart home system. In particular embodiments, the smart home system may use the controlling device to process and interpret the sensor data using the multiple layers of knowledge. As an example and not by way of limitation, the first layer of knowledge 530 may include the knowledge for raw data characterizations that indicates a voice signal being detected. The second layer of knowledge 532 may include the semantic meaning knowledge for recognizing that the detected voice signal falls in a specific sound class, for example, a "Ding" sound. In particular embodiments, the semantic meaning may be assigned by classifying the data. The third layer of knowledge 534 may include the knowledge for recognizing the associated activities, for example, the completion of heating food with a microwave. The fourth layer of knowledge 536 may include the knowledge of the presence of user and the user is preparing food. The example of 4 layers of knowledge illustrated in FIG. 5C is for illustration purpose only and the multiple layers of knowledge are not limited thereof.

Dialog System

In particular embodiments, the system may include a dialog system which may be the central system that manages all dialog-based communication with the user or users. The dialog system may handle all dialog-based requests from users, manages all responses, and also may be responsible for initiating new conversations with users when requested by another subsystem. Other subsystems in the smart home system may issue requests to the dialog system. A request may contain a message, optionally parameter defining the type of response, which may include one or more possible and/or expected responses, as well as metadata to help prioritize the message, which may be expressed in the form of a self-assigned urgency score, importance score and optional expiration date and time. The dialog system then may use the information in the request, along with other information available (e.g., currently active sessions, current dialog state, the dialog system's ranking of the message, or its ranking of the requesting subsystem) to determine whether or not to present the request to the user, to which user or users to present the request, and if it does decide to present the request, when and how to present the request to the user. In particular embodiments, the dialog system may be responsible for initiating, receiving, and managing communication to and from third parties, such as home service providers, an alarm monitoring service, emergency dispatch service, or public safety answering point.

In particular embodiments, the anomaly detection system may determine there is a high chance that there is an intruder in the home. The anomaly detection system then may issue a high importance, high urgency request to the dialog system. The dialog system may determine to directly inform the user regardless of whether there is another currently ongoing dialog with the user, based on the severity of the request and its knowledge that the anomaly detection system rarely issues high importance, high urgency requests that turn out not to be urgent or important. The dialog system may also suspend other, lower-priority dialogs with the user.

The dialog system may respond to the anomaly detection system that the user has been informed and the request has been issued. The dialog system may wait for an amount of time that is based on the provided urgency, importance, expiration date and time, and other attributes of the request, and lacking a response from the user after that time has elapsed, inform the anomaly detection system that there was no response to the request.

In particular embodiments, the pattern detection system may detect a suggested automation. The pattern detection system may issue a high urgency, low importance request to the dialog system (e.g., "you just locked the front door and turned off the porch light, do you want to create a routine for this?"). The dialog system may decide not to relay the request within the high urgency window and may respond to the pattern detection system that it did not display the request. The pattern detection system now may issue the dialog system with a medium urgency, low importance request for the dialog system (e.g., "{time window}, you locked the front door and turned off the porch light, do you want to create a routine for this?"). The dialog system may decide to display this new request at a later time, substituting "Last night around 8 pm" for {time window}.

The dialog system may support different ways to initiate dialog including, for example, but not limited to, user-initiated dialog, system-initiated dialog, user-to-user dialog. The dialog system may use different types of conversational UI (e.g., through Amazon Alexa, Google Home, Facebook Messenger, SMS, phone calls, email, mail, mobile or desktop push notifications, other third party and first party apps). The dialog system may use different types of content to communicate to the user including, for example, text, emoji, visual, audio, haptic, or compositions of graphical UI elements. The dialog system may respond to different types of user responses including, for example, freeform text responses, voice, visual, emoji, multiple-choice options, and other interactions with graphical UI elements such as radio buttons, push buttons and sliders. The dialog system may support different types of metadata to facilitate its operation including, for example, priority, urgency, SLA-service-level agreement. The dialog system may facilitate dialog for different purposes including, for example, disambiguation dialog for the reasoning system, confirmation dialog for ML-training purposes, informative, or warning dialog for anomaly detection, or anomaly warnings, administrative dialog for system maintenance, support, or troubleshooting, tutorial dialog for new user experiences or introducing the user to and teaching the user about system features and functionality, marketing dialog for the promotion and sales of products and services, facilitative dialog to coordinate with third parties such as home service providers and emergency dispatch services, dialog to mediate between the user and other users, the user and third parties, or multiple parties.

Output

In particular embodiments, the system may have a few different main types of output. For example, the output may include device updates such as taking output from the synthesis system and managing communication with all involved devices across any number of protocols and device types to update their state. In particular embodiments, the system may automatically retry when there are partial failures and may escalate a request to the dialog system when there is a consistent and significant failure. In particular embodiments, the output may be used as new input by the system. The output may include output to the dialog system to interact with the users.

Session Tracking

In particular embodiments, the system may loosely correlate events, based on their relative time and contextual information (e.g., local sensor information, programmed schedules and patterns of behavior), and other sources of input. The system may use the correlation to group events together to create a concept of a "session", which may involve one or more users having a single or a connected series of experiences in the environment. These sessions may be then used to allow for a more robust inference that may go beyond instantaneous input from control devices, sensors, and etc. For example, a first user turned off the light when leaving the room, and the system may be more likely to turn on the light autonomously, when a second user enters the room minutes later, than the scenario in which the first user changed the lights in a room and stayed there. In particular embodiments, sessions may be used to influence the inference and disambiguation systems resulting in different interpretation of otherwise similar or identical input. For example, a first user is reading in the bedroom, a second user uses a voice interface to tell the system they are going to sleep. Because there is an active session concerning the first user in the bedroom, the bedroom lights may not be affected by the second user's command, which they would be if there was no such active session concerning the first user in the bedroom.

In particular embodiments, the system may include client applications which support remote monitoring and controlling of the home as well as updating and communicating with the home system. The system may include a first-party cloud service that supports these features. For each hub account, there may be a "virtual" copy that is updated and maintained in the cloud. Client apps may interact with the virtual hub, which may communicate to the actual hub in the home when needed. Various components of the software system may operate both in the cloud as well as on the local device, in the cloud exclusively (this is true for all subsystems described under hub), or have some of their functionality running on the device/hub and other parts of their functionality in the cloud. For example, the activity inference system may run a machine learning algorithm on a cloud server. In particular embodiments, the smart home system may be coupled to big data applications associated with smart city system and internet of things (IoT) systems.

Data Stream Platforms

In particular embodiments, the smart home system 100 may generate a lot of data that can be used to build new experiences. In particular embodiments, the data generated by the smart home system 100 may be accessible to third parties such as the application developers. As an example but not by way of limitation, the smart home system 100 may generate data about the user's sleeping conditions. In particular embodiments, the sleeping conditions may include, for example, but are not limited to when the lights go out or what the environmental conditions in the room are. In particular embodiments, a third party may access this data and develop an application to help people to develop better sleeping habits. In particular embodiments, the user may have 100% control over the access of their data and the users may grant the application developer permission to access only the data necessary for the application to function. In particular embodiments, the user may grant the application developer permission to access the data by enabling the application.

Privacy Controls

In particular embodiments, the smart home system 100 may give the user tools to best understand and control how the user data will be used. In particular embodiments, the user may grant access of the user data to the vendors, manufacturers, and developers of the smart home system. In particular embodiments, the user may grant access of the user data for third parties. In particular embodiments, the user may grant access of the user data based on the intended usage of the data instead of giving blanket permission to specific types of data. In particular embodiments, the user may be asked for permission when the data consumer wants to use the data for additional purpose. In particular embodiments, the user data may include, for example, but are not limited to the user preference data and the relationship data. As an example and not by way of limitation, the user may grant the Fitbit application permission to access the user's working out data excluding all other data of the user.

Access Controls

In particular embodiments, the smart home system 100 may allow the owner of the household to setup rules for other people while other people may not be allowed to setup or change the rules. An as example and not by way of limitation, the owner or the parent of the household may setup parent-control rules for children and children may not setup or change the rules. In particular embodiments, the smart home system 100 may be installed in a home shared by multiple tenants. In particular embodiments, the smart home system 100 may use the knowledge graph to create likely steps of what the user's command means as well as who else is in the room, and what their preference are.

In particular embodiments, the smart home system 100 may take all the users in the room into consideration when controlling the multiple devices and work out appropriate conditions for all users in the room. In particular embodiments, the smart home system 100 may work in a way allowing multiple people to control the devices in the system. As an example and not by way of limitation, the smart home system 100 may allow anyone who has the access to the wall control in the room to control the thermostat and light of the room through one or more user interfaces of the system. In particular embodiments, the smart home system 100 may have special control arrangement for exceptional personnel visiting the house, for example, cleaners or gardeners. In particular embodiments, the smart home system 100 may control the lights in the home to work with full light brightness when the switched are pressed by the cleaners of the home regardless the activities of the cleaners. In particular embodiments, the smart home system 100 may not allow the visitors of the home to change the preference of the normal tenants of the house. In particular embodiments, the smart home system 100 may ignore the input from the visitors and may not use that data for training and learning purpose. In particular embodiments, the smart home system 100 may ignore the data of the normal tenants when the visitors are present in the room and not use that data for training and learning purpose. In particular embodiments, the smart home system 100 may consider the multiple people's inputs and preferences in the room to provide a coordinated experience for all the people in the room.

In particular embodiments, the smart home system 100 may perform user detection via inference. In particular embodiments, the smart home system 100 may include sensor data classifiers. In particular embodiments, the smart home system 100 may perform transition detection and learning based on feedback from users. In particular embodiments, the smart home system 100 may parse user utterance and determines the device based on words describing the location of the device and the context like the location of the personal or inferred activities. In particular embodiments, the smart home system 100 may create a database for the all sensor data and the data may be classified and used for detecting the user's action, interacting with users, and checking the assumption against the user's inputs.

Inference

Types of Inference

In particular embodiments, inference may be the process of creating a meaningful understanding of user actions and behavior, which may allow the system to fulfill user needs in a more accurate and more dynamic way than a strict command-based control system. Some input may include explicit expression of user intent or activity, for example, the voice command "I am going to watch a movie". Every input that does not explicitly express a certain intent or activity may run through the inference subsystem to determine the likely intent or activity of the user. As an example and not by way of limitation, if the user is cooking in the kitchen, the user may hit a light switch to turn on the task lighting. The inference subsystem may use a combination of contextual information to determine the user's most likely intent with hitting the light switch, and the most likely activity.

In particular embodiment, the inference process may enable the smart home system to take action that is most appropriate for the given situation. For example, instead of turning the kitchen task lights on to their last known setting or to a static default setting, the system may turn them on to an appropriate color temperature and brightness level for cooking, which may be different than the ideal settings when the same user hits the same light switch late at night or when the user is passing through the kitchen on their way to the bathroom. In particular embodiment, the inference process may enable the smart home system to take action that the user necessarily thinks of taking themselves. For example, if it is determined that the user is cooking, the system may put smoke alarms in a mode allowing for more smoke signal before sounding an alarm while the activity of cooking is ongoing.

In particular embodiments, the system may have a variety types of inference, for example, intent inference, activity inference, and presence inference. In particular embodiments, intent inference may determine, for a given user input, what the user most likely intends the result to be. (e.g. set the lights to a certain setting, lock the front door, make this room more moody, send me an alert when the mail gets here, etc.). In particular embodiments, activity inference may determine, in a given area, what activity is likely going on and who are most likely participating (e.g. cooking, working out, entertaining, watching a movie, sleeping) or any part of the activities (e.g. moving a lot, sitting, standing). In particular embodiments, presence inference may determine if people are present in a given area (e.g., presence detection) and possibly which people are present in that room (e.g., presence recognition).

Intent-based Controls

In particular embodiments, the smart home system 100 may use an intention-based control model to control the devices in the smart home system. In particular embodiments, a press on a certain button may have a consistent meaning, for example, "more light", but may have different effects in how to manipulate the state of various devices based on the time of day and other conditions around the space where the button is located. As an example and not by way of limitation, during evening time, a warm and medium intensity light may be firstly turned on if the artificial light was off or at a lower setting when the button is pressed. As another example and not by way of limitation, during daytime, a cooler and higher density light may be turned on if the button is pressed. As another example and not by way of limitation, during certain time period of a day, different sets of lights may be turned on or different devices (e.g., automated blinds) may be actuated when the button is pressed. Although this disclosure describes intent-based controls in a particular manner, this disclosure contemplates intent-based control in any suitable manner.

Declarative Intent Models

In particular embodiments, the smart home system 100 may use a declarative interaction model for interacting with the user 101 by receiving declarative commands instead of imperative commands from the user 101. In particular embodiments, the declarative commands may describe the outcomes that the user wants while the imperative commands may describe the actions needs to be taken to facilitate the outcomes. In particular embodiments, the users may tell the smart home system 101 what the user "wants" instead of what the system needs "to do". As an example and not by way of limitation, the user may tell the smart home system 100 "I need more light here" instead of "set desk lamp to 100%". As another example and not by way of limitation, the user may tell the smart home system 100 "we are having a meeting" instead of "activate scene of 'meeting' in the meeting room". As another example and not by way of limitation, the user may tell the smart home system 100 "we are relaxing" instead of giving a sequence of commands to adjust all the lights in the space. As another example and not by way of limitation, the user may tell the smart home system 100 "I am expecting a guest" instead of "disarm the alarm system and notify me when there is someone at the door".

In particular embodiments, the smart home system 100 may have a level of understanding of the activities of the user 101 and the user's friends such as where they are and what they are doing. As an example and not by way of limitation, when the user 101 and the user's friends sit at the dining table, the smart home system 100 may understand that the user 101 and the user's friends are at the dining room and may start to have dinner.

In particular embodiments, the smart home system 100 may not require the user to know what the outcome will be and may instead automatically determine that settings to execute. As an example and not by way of limitation, the user may tell the smart home system 100 "we are having a meeting" and the smart home system 100 may tune the light suitable for meeting and may activate the microphones in the room.

In particular embodiments, the smart home system 100 may get the information from the user about what the outcome is but the users does not have to know how to achieve the desired outcome. As an example and not by way of limitation, the user may tell the smart home system 100 "I need more light here" and the smart home system 100 may actuate the blinds to have more light in the room if it is day time or may turn on a brighter light in the room if it is evening time.

In particular embodiments, the smart home system 100 may receive ambiguous commands from the user and the smart home system 100 may use context to fill in that ambiguity of the commands to get concrete results. As an example and not by way of limitation, the user may tell the smart home system 100 "I need more light here" and the smart home system 100 may detect the user is reading a book at the living room and may turn the reading lamp next to the user brighter.

In particular embodiments, the smart home may decouple the implementation from the user's intentions so that the user does not need to know or remember how the outcome is implemented. As an example and not by way of limitation, the smart home may free the user from remembering all the names of the controlled devices in order to give a command and the user may not need to create themes for the system.

In particular embodiments, the user may only need to give a high level intention or desired outcome with declarative commands having semantic meaning and the smart home system 100 may interpret automatically to determine the best conditions for the user. As an example and not by way of limitation, the use may tell the smart home system 100 "I am expecting a guest" and the smart home system 100 may disarm the alarm system.

In particular embodiments, the smart home system 100 may interpret the user's intention or activities based on the sensor inputs, other available metadata, and the pre-set knowledge graph comprising multiple layers of knowledge. As an example and not by way of limitation, when the user enters the kitchen, the smart home system 100 may detects the presence of the user using a motion sensor and may interpret the user's intention as to start cooking since the knowledge graph may indicate that the user usually cooks for dinner around this time.

In particular embodiments, the smart home system 100 may receive user's inputs or commands that have not been known to the system before and the smart home system 100 may appropriately interpret those inputs or commands based on the knowledge graph and other available information. As an example and not by way of limitation, the user may tell the smart home system 100 "I am tired" and the smart home system 100 may infer that the user wants to relax and may set the light around the user to relaxing mode although the smart home system 100 may have not received this command before.

In particular embodiments, the smart home system 100 may use a combination of the hardcoded programmatic setting and the dynamic interpretation to interpret the user's inputs and activities. As an example and not by way of limitation, the smart home system 100 may have hardcoded programmatic settings for some commands and determine what the user's command means using the knowledge based dynamic interpretation instead of hardcoding setting (e.g., "more light" may be interpreted by dynamic interpretation instead of hardcoded "more light means 100% on").

In particular embodiments, the knowledge based dynamic interpretation may be based on a variety of factors including the time of day, the location, and other available metadata. In particular embodiments, the smart home system 100 may response differently to the same user input or activity based on the results of the dynamic interpretation using the knowledge graph. As an example and not by way of limitation, when the user arrives at home, the smart home system 100 may set the light for relaxing mode or exercising model on different day of the week based on the user's routine and habit on that day. Although this disclosure describes interpretation of the user's commands and activities in a particular manner, this disclosure contemplates interpretation of the user's commands and activities in any suitable manner.

Figure 6:
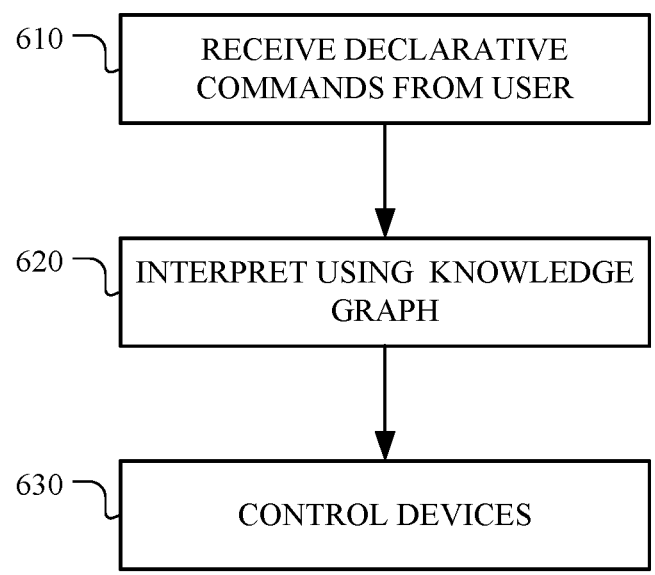
FIG. 6 illustrates an example method of controlling related devices based on the declarative commands from the user.

FIG. 6 illustrates an example method of controlling related devices based on declarative commands from the user. In step 610, the smart home system 100 may receive the declarative commands from the user. In step, 620, the smart home system 100 may interpret the declarative commands of the user using the knowledge graph which comprises multiple layers of knowledge. In particular embodiments, the smart home system 100 may interpret the declarative commands further based on the sensor data, the time of day, the location, and other available metadata. In particular embodiments, the smart home system 100 may perform the interpretation using the database and the programs in the cloud. In particular embodiments, the smart home system 100 may perform the interpretation locally. In step 630, the smart home system 100 may control the devices based on the interpretation results of the user's declarative commands.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for controlling related devices based on the declarative commands including the particular steps of the method of FIG. 6, this disclosure contemplates any suitable method for controlling related devices based on the declarative commands including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Intent Inference

In particular embodiments, the intent inference system may subscribe to any kind of user input. Intent inference and processing may occur across several subsystems including, for example, but not limited to NLP/NLU, disambiguation system, and outcome synthesis system. The result of intent inference and processing may be a list of rules or actions to be executed. For each intent and/or activity, the system may have a concept of a "desired outcome", which describes the ideal conditions, as well as possibly a range of acceptable conditions, to support that activity or intent. These conditions may include, for example, but not limited to, overall amount of light, color temperature, room temperature, humidity, or etc. When there is a change in intent or activity in a room or area, the system may look up appropriate desired outcome data in the knowledge graph and use that data to create or synthesize a desired outcome for that intent or activity. In particular embodiments, the system may use desired outcome data from the knowledge graph combined with contextual information to synthesize the desired outcome for that intent or activity.

In particular embodiment, the system may use a desired outcome in combination with sensor and contextual information (e.g., time of day, daylight conditions, user preferences, etc.) and device attributes (e.g., maximum light output, relative color temperature, correlation between brightness settings and light output levels, other device capabilities, device placement relative to other devices and other environmental features such as windows, etc.) to synthesize new state settings for one or more devices, with the goal of providing the desired outcome in the real world.

In particular embodiments, the system may use a feedback loop utilizing sensor data and user input to generate additional state updates to more closely approximate the desired outcome using the devices in the affected areas. In particular embodiments, the system may use a feedback loop utilizing sensor data and user input to refine its learned understanding of how various device settings affect a given area, and/or how certain device attributes affect real-world outcomes, and/or user preferences, to be used for later synthesis of device settings. In particular embodiments, the system may use feedback (e.g., sensor and user input), after a synthesized device state is set, to determine if the intent and/or activity was correctly inferred. In particular embodiments, the system may use the dialog system to disambiguate between incorrect inference, refinement of the desired outcome, or the synthesis process.

In particular embodiments, the system may have a rewriting process during the intent inference. The rewriting process by the system may result in different commands even for the same user inputs. As an example and not by way of limitation, the system may receive the command of "turn off light" and may determine different commands based on notion of light, scope to whole home and other factors using the rewriting process. As another example and not by way of limitation, when the system receives user command of "turn off light", the system may determine that the command is received at bed time and user may mean to turn off the light in the whole home to go to bed. Although the command has no explicit location specified, the system may use contextual information to re-infer the user's intent. As another example and not by way of limitation, user may be in the living room and tell the system to turn of the light. The system may determine that the user does not meant to turn off all light because the user is in the living room and may need light to go to bedroom. The system may re-interpret that command from turn off light to something like "start to shut down the home for preparing for sleep but keep some dim light along the way from living room to bedroom".

The disambiguation system may output whether the disambiguation has succeed or failed. In case of failed, the system may initiate dialog system to ask user to help to disambiguate the commands. In cases where disambiguation successes, the system may rewrite the command using context of time and day and also the rewriting history of this commands. The system may use the contextual information to rewrite a particular command (e.g., turn off light) to command for starting off a routine (e.g., turn off light for sleeping).

The command arguments that are not disambiguated may remain NULL. Some commands may have no command argument and some commands may have argument which may have to be determined during later processes. For example, the command of "turn on" may have arguments including a list of devices to be turned on. Before the system determines the list devices, which are low level information to dishabituate, the system may give the disambiguator a change to rewrite the commands. The rewriting process using contextual information may decide not to turn on certain devices as the original command means. The system may stop the original process of disambiguation for description of original commands which are not going to be executed. The system may replace the original commands (e.g., turn of light) with different commands (e.g., preparing for sleep routine commands) with the ID of the routine the system has decided to start. In particular embodiments, the system may map routine arguments to specific rules, or set of actions from package of rules. In particular embodiments, the system may set mode of home with self-generated conditional rules which can be referenced from other code dynamically. For example, when the system turns off light in the home for preparing for sleep and user walks back into the room and does something different, the system may determine to do something different (e.g., turn on relative dim light) with the light in that room.

As an example and not by way of limitation, the smart home system may receive a user command of "turn on living room lights". In particular embodiments, the system may process the intent inference following one or more steps as described below.

STEP: A user of the system may use a voice-operated device (e.g. Google Home, Amazon Echo, first-party hub) to relay the command "turn on living room lights" to the first-party system. For description purpose, the Amazon Echo may be used here as an example.

STEP: The first-party Amazon Echo skill may receive the raw utterance (herein defined as a string that is the output of the Amazon Echo voice recognition system, which can be an accurate or inaccurate representation of what the user said).

STEP: The first-party back-end may receive the Amazon Alexa Request from the skill.

STEP: In the first-party back-end, the hub router system may determine which first-party hub (in this example the back-end manages a large number of first-party hubs, each installed in different homes) the Alexa Request should be routed to, and it may attempt to relay the request to that hub. The hub itself may be located in the home of the user.

STEP: The first-party hub may receive the forwarded Alexa Request from the first-party back-end. The first-party back-end may have created its own request at this point that encapsulates the information contained in the original Alexa request, as well as possibly additional information. For the sake of simplicity, the request may be still referred as an Alexa request, even if it may technically be a different request at this point.

STEP: The first-party hub may handle the request and create an internal input object of type "user.voice.alexa". The input object type may contain all possibly relevant information from the Alexa Request.

STEP: The input system in the first-party hub may route the input object to all subscribed subsystems, including, for example, the presence inference system, the activity inference system, and the intent inference system.

STEP: When the intent inference system receives the request, the intent inference system may perform natural language processing on the received raw string "turn on living room lights". Specifically, the inference system may tokenize the utterance, vectorize it, and perform topic extraction. The output of this step may be the following object:

```
{
    "input": {
        "type": "user.voice.alexa"
        // all alexa request content
    },
    "topics": {
        "command" : "turn on",
        "location" : "living room",
        "device_category" : "lights"
    },
}
```

STEP: For each key-value pair in the above object, the intent inference system may perform additional natural language processing and/or natural language understanding using synonym tables and other mechanisms, data sources, and algorithms to find the key-value pair's canonical meaning, and create an "intent" object within the object. The output of this step may be the following:

```
{
    "input": {
```

-continued

```
        "type": "user.voice.alexa"
        // all alexa request content
    },
    "topics": {
        "command" : "turn on",
        "location" : "living room",
        "device_category" : "lights"
    },
    "result": {
        "command" : TURN_ON,
        "command_arguments": NULL,
        "locations": 12,
        "device category": DEVICE_LIGHTS,
        "time": NULL,
        "addressses" = NULL,
    }
}
```

In this code example, "TURN_ON" and "DEVICE_LIGHTS" both may represent constants in the first-party system's source code that have specific and unambiguous meaning to the system. The "12" may represent the internally used unique identifier of a specific room or area that is set up in the system, in this case that the system may have determined that this area is the most likely fit with the user's intent. The "NULL" may represent a placeholder for an empty or absent value, in this case it expresses that the NLP/NLU system did not find a time in the user's expression. In other possible examples, instead of a single value for each key, the system may provide an array of values for each key where the system may have determined multiple likely candidates (e.g. "command" may be [TURN_ON, TURN_OFF] if the word "on" was missing from the utterance) and the system may determine that "TURN_ON" and "TURN_OFF" as the likely commands. The "area_id" may be a list of many IDs, if the word "living" was missing from the utterance. In other possible examples, instead of a single value for each key, the system may have determined multiple likely candidates and provide a data structure containing all likely candidates and their respective confidence scores (e.g. "command" may be [(TURN_ON, 0.7), (TURN_OFF, 0.3)], "area_id" may be [(12, 0.6), (8, 0.3), (9, 0.1)]).

As another example and not by way of limitation, the below describes an example implementation of an intent processing function that uses the disambiguation system to interpret a simple command-based intent and generate actions from the intent that are then encapsulated in rules and executed by the rules engine. The order in which the various keys are processed matters because some keys may be more likely to affect the disambiguation outcome of other keys than the other way around. There may be a loose dependency that generally flows from command to locations to time to addresses. All of the above may be the disambiguation of input what is needed before actions can be generated.

Each of the calls to "disambiguator.handleRequest" may execute code where a lot of the more dynamic aspects of the system may come in. Each key may have its ambiguity resolved using a variety of different strategies. Some examples of potential embodiments of that part of the system are listed below. When the rules are published to the rules engine, they may be published along with the intent. The rules engine may keep track of each intent that may have any remaining rules in the system, so that the rules engine can use the information contained in the intent to resolve any potential conflicts between those rules and other active rules in the system.

```
function processIntent(intent) {
    // 1. Disambiguate so that there are no more NULL values in the intent object
    for (key in ["command", "locations", "time", "addresses"]) {
        if (intent[key] == NULL) {
            var request = {"key": key, "intent": intent};
            var response = disambigator.handleRequest(request);
            if (response.code == "success") {
                intent.result[key] = response.obj;
            } else if (response.code == "dialog") {
                // If the result of disambiguation is a dialog object, forward it to the dialog system and exit
                dialog.system.process(response.obj);
                return;
            }
        }
    }
    // 2. Generate Actions using the Desired Outcome System
    var actionObjects = [ ];
    forEach(address) {
        // for an address, what is the action for this intent
        var action = self.actionForAddressAndIntent(address, intent);
        if (action !== null) {
            actionObject.push(action);
        }
    }
    // 3. Create a rule to execute each action
    var rules = [ ];
    for (action in actionObject) {
        rules.push(self.ruleForAction(action));
        rulesEngine.addRulesForIntent(rules, intent);
    }
}
```

As another example and not by way of limitation, a more sophisticated implementation of the intent processing function is described below. The intent processing function may perform disambiguation on the entire intent in a more holistic way and may have an opportunity to rewrite the entire intent after it has been disambiguated. Additionally, instead of building a single action per address, the intent processing function may output complex sets of rules that may enable more dynamic behaviors as the outcome of the processed intent.

```
function processIntent(intent) {
    //1. Disambiguate response
    var response = disambigator.processIntent(intent);
    if (response.code == "success") {
        intent.result = response.obj;
    } else if (response.code == "dialog") {
        // If the result of disambiguation is a dialog object, forward it to the dialog system and exit
        dialog.system.process(response.obj);
        return;
    }
    // 2. If needed, rewrite result object given context
    var result = disambigator.rewriteResultForIntent(intent);
    // 3. What rules are needed to execute this command?
    var rules = self.rulesForIntent(intent);
    // 4. Add rules to rules engine
    rulesEngine.addRulesForIntent(rules, intent);
}
```

As another example and not by way of limitation, an intent processing function is described below for disambiguating location and time of user intent. The system may determine that the user command of "turn off the lights" means to shut down the home for night time when the user is preparing for bed. In this case the initial result object for the intent may be:

```
{
    "command" = "TURN_OFF",
    "time" = NULL,
```

-continued

```
    "locations" = NULL,
    "devicecategory" = DEVICE_LIGHTS,
    "commandarguments" = NULL
}
```

First, the function "disambiguator.processIntent" may be called with the intent object. The system may decide that an omitted time most likely (with high confidence score) means "right now" in the case of a "TURN_OFF" voice command, so the system may fill in the time key. The system may decide that the omitted locations may be most likely just the area the user is currently in the case of a "TURN_OFF" voice command and may fill that in as well. The "Command_arguments" may be not generated at this step. The output of this step may be:

```
Output:
{
    "command" = "TURN_OFF",
```

-continued

```
        "commandarguments" = NULL
        "time" = NOW,
        "locations" = 12,
        "devicecategory" = DEVICE_LIGHTS
}
```

Second, the "disambiguator.rewriteResultForIntent" may be called for the intent. Based on a combination of contextual information (e.g., time of day, presence data in the house) and learned or programmed information (e.g., learned routines and patterns like typical time the user goes to bed, training data on voice commands previously used by the user in a similar situation), the disambiguator may rewrite the intent to capture that most likely, the user does not just want to turn the lights off, but instead the user is preparing to go to bed. The output of this step may be:

```
Output:
{
    "command" = "START_ROUTINE",
    "command_arguments" = "id":"prepare_sleep"},
    "time" = NOW,
    "locations" = NULL,
    "device_category" = NULL
}
```

After the above second step, the system may know that the user may want to execute a routine named "prepare sleep". The routine of "prepare sleep" may refer to a specific routine that the system may be pre-programmed with. In particular embodiments, the "rewriteResultForIntent" function or its equivalent may get called multiple times recursively until no more changes are made by the rewriting process.

Third, rules may be generated for the rewritten command, using some template information that is programmed in the system to describe this routine. The function "addRulesForIntent" may first look up the template for this routine. The example template may be as follows:

for each room in the house:
CREATE_RULE(if presence is false, set room to scene "night light");
for each room in the house:
CREATE_RULE(if presence becomes false, set room to scene "night light");
CREATE_RULE(set mode "sleep");

The template may express the following meaning and may be meant to have the following consequences. For each room in the house, the system may generate the following rules: (1) if the room's presence is currently false, set the scene of the room to "nightlight" (i.e., a pre-programmed or dynamically generated scene that turns most lights in the room off, and sets some appropriate lights to very dim nightlight settings); (2) if the room's presence is currently true, wait for the event where the room's presence changes to false, and at that point set the scene of the room to "nightlight". The consequences may include, for example, but not limited to, set the mode of the home to "present sleeping" (as opposed to e.g. "away", or "present_awake"). Activating this "present sleeping" mode may create additional rules in the system. The mode may also be referenced by other rules and conditional responses to input. For example, in this mode, if the user hits the "light on" button in a bathroom (or when presence in the bathroom changes to true), the lights may turn on to a dim, warm setting, to provide enough light for bathroom use but not wake the person in the bathroom up any more than necessary. The result would be different amount of light that would be provided comparing to when the user hits the "light on" button (or presence in the bathroom changes to true) when the home is in for instance "present_awake" mode.

Fourth, rules may be created following the template. In a specific home with three rooms, that template may generate the following seven rules, which may be the output of third step. The generated rules may be then sent to the rules engine to process.

```
{
    {
        conditions: [
            {
                address: "/rooms/1/presence",
                conditional: "eq",
                value: false
            }
        ],
        actions: [
            {
                type: "setScene",
                value: "night_light",
                address: "/rooms/1"
            }
        ]
    },
    {
        conditions: [
            {
                address: "/rooms/2/presence",
                conditional: "eq",
                value: false
            }
        ],
        actions: [
            {
                type: "setScene",
                value: "night_light",
                address: "/rooms/2"
            }
        ]
    },
    {
        conditions: [
            {
                address: "/rooms/3/presence",
                conditional: "eq",
                value: false
            }
        ],
        actions: [
            {
                type: "setScene",
                value: "night_light",
                address: "/rooms/3"
            }
        ]
    },
    {
        event: {
            type: "valueChanged",
            address: "/areas/1/presence"
        }
        conditions: [
            {
                address: /areas/1/presence,
                conditional: "eq",
                value: false
            }
        ],
        actions: [
            {
                type: "setScene",
                value: "night_light",
                address: /areas/1
```

```
                }
            ]
        },
        {
            event: {
                type: "valueChanged",
                address: "/areas/2/presence"
            }
            conditions: [
                {
                    address: /areas/2/presence,
                    conditional: "eq",
                    value: false
                }
            ],
            actions: [
                {
                    type: "setScene",
                    value: "night_light",
                    address: /areas/2
                }
            ]
        },
        {
            event: {
                type: "valueChanged",
                address: "/areas/3/presence"
            }
            conditions: [
                {
                    address: /areas/3/presence,
                    conditional: "eq",
                    value: false
                }
            ],
            actions: [
                {
                    type: "setScene",
                    value: "night_light",
                    address: /areas/3
                }
            ]
        },
        {
            actions: [
                type: "setMode":
                value "sleep"
            ]
        }
    }
}
```

The rules engine may store a reference to the intent with each rule and may retain that reference while there is still at least one active rule in the rules engine that originated from that intent. This may enable the rules engine to handle potential conflicts that may occur with other rules in the rules engine. The intent may also be stored in a recent intent log, along with the intent's origin, timestamp, and other metadata. The log may be queried by the system at runtime and may be referenced by the intent processing system to help disambiguate and otherwise accurately process any future intents. For instance, in the case of the "prepare sleep" routine, any further utterances of "turn of lights" may be interpreted differently and may even invalidate or replace rules generated previously.

As another example and not by way of limitation, the smart home system may receive voice input command "turn on the lights". The system may analyze the user intent as following:

Functional scope: turn on, not ambiguous

Spatial or device scope: ambiguous. (The user did not express which lights, or in which rooms the lights needed to be turned on.)

Output from ambiguity inference system: "functional scope: [turn_on, 1.0]", "spatial_scope: not provided", "device_scope: not provided"

As another example and not by way of limitation, the system may receive user voice input "I need more light". The system may analyze the user intent as following:

Functional scope: more light, not ambiguous

Spatial scope: fully ambiguous. (The user did not express where they need more light.)

Output from ambiguity inference system: "functional scope: [more_light, 1.0]", "spatial_scope: not provided"

As another example and not by way of limitation, the system may receive user voice input "I need more_light here". The system may analyze the user intent as following:

Functional scope: more_light, not ambiguous

Spatial scope: partially ambiguous. (The user expressed they want the light localized to them, but not to what degree, or where exactly.)

Output from ambiguity inference system: "functional scope: [more_light, 1.0]", "spatial_scope: [user_room, 0.33; user_area: 0.33; user_closest_fixture: 0.33]"

As another example and not by way of limitation, the system may receive user voice input command "more". This command "more" may only make sense if it follows another recent change, most likely one also from a command, e.g. "dim the lights". The ambiguity resolution system may use information from recent commands (and how their resolved form) to determine suitable options for this follow-up command. The system may analyze the user intent as following:

Functional scope: partially ambiguous. (The user expressed they wanted more, but not of what.)

Spatial scope: fully ambiguous

Output from ambiguity inference system: "functional scope: [more_. . . ; more_. . . ; . . . ]", "spatial_scope: not provided"

Based on these examples, the ambiguity inference system may be able to return both concrete specific results (e.g., this room, this device, this action, etc.) as well as abstract placeholders (e.g., not provided, user_room, etc.).

In particular embodiments, the system may including reasoning system to support natural interactions including synonyms (e.g., "turn on lights in living room, family room, tv room, or sofa room"), ambiguous input (e.g., "I need more light here"), imprecise time (e.g., "after dinner"). In particular embodiments, the reasoning system may determine different output to identical input such as "presence detected in hallway" because of a conflict with existing session or different contextual info (e.g., activity, time of day). In particular embodiments, when the system has learned a certain pattern, or has a certain pre-programmed pattern, or has a user-created schedule, the system may notice deviation from that anomaly detection and may use the dialog system to verify the change with the user, and then may update its notion of current routines and schedules accordingly.

Activity Inference

In particular embodiments, the smart home system 100 may use a profile of an activity, the real-time sensor data, and other available metadata to determine the likely activities in a given place. The profile of an activity may describe the likely ways the activity manifests itself. As an example and not by way of limitation, cooking may be more likely at certain hours and the time period for cooking may be set by global defaults, inferred from other available data, specified by user, or observed by the smart home system using the history data. As another example and not by way of limita- tion, cooking may have consistent motion activities with low to medium size movements and may be likely in a kitchen. In particular embodiments, a profile for cooking may include all the above discussed information. In particular embodiments, the smart home system may include a number of profiles for different activities including, for example, but limited to cooking, reading, relaxing, meeting, studying, sleeping, and working out. In particular embodiments, the smart home system may analyze and identify the user's activities based on the data collected from the sensors and control a number of devices to prepare appropriate light for the activities. In particular embodiments, the smart home system may not require the user to give any commands and the smart home system may instead determine and implement appropriate light for the user's activities. As an example and not by way of limitation, the user may enter the kitchen to start cooking and the smart home system may detect that cooking activity and light up the kitchen appropriately (e.g. increasing lighting over particular counters). In particular embodiments, the smart home system may combine the detected activities or habits of the users with the knowledge graph that already in the smart home system and use the combination to interpret the current activities and determine the ideal conditions of the home for these activities. As an example and not by way of limitation, the smart home system may have a layer of interpretation using the knowledge graph even for the simple operation of a light switch knob. For example, if the user turns the knob clockwise, the smart home system may interpret that as the user wants more light since it is still dark here. If the user turns the knob counterclockwise, the smart home system may interpret that as the user wants less light since it is too bright here. In particular embodiments, the smart home system may use the knowledge graph and a predictability model to interpret the user activities to determine what is likely the ideal conditions for the space and the activities. In particular embodiments, when the user touches a light switch, the smart home system may response differently based on a variety of factors such as the time of day, the specific activities, or the specific places. In particular embodiments, the smart home may use the knowledge graph for all decisions that the smart home system makes. Although this disclosure describes activity inference in a particular manner, this disclosure contemplates activity inference in any suitable manner.

Figure 7:
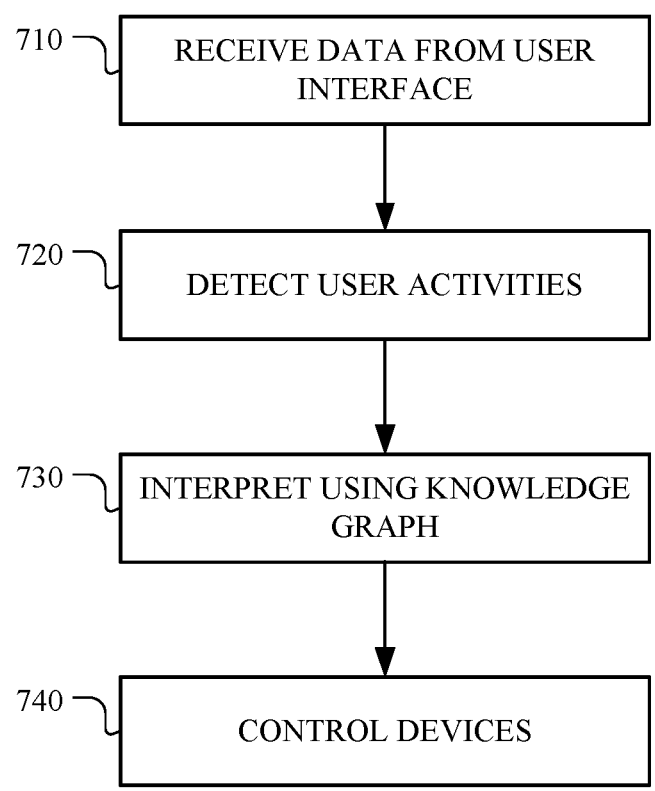
FIG. 7 illustrates an example method of using knowledge graph to infer user activity and control related devices automatically.

FIG. 7 illustrates an example method of using knowledge graph to infer user activity and control related devices automatically. In step 710, the smart home system may receive the data from the user interfaces, such as, a thermal imaging device as the motion sensor. In step 720, the smart home system may detect the user activities using the activities profiles in the database. In step 730, the smart home system may interpret the user activities using the knowledge graph with the multiple layers of knowledge to determine the best conditions for the detected activities. In step 740, the smart home system may control the devices based on the determined best conditions based on the knowledge graph. The smart home system may automatically detect the user activities using the sensor data and control the devices without receiving any command from the user. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for using knowledge graph to infer user activity and control related devices automatically including the particular steps of the method of FIG. 7, this disclosure contemplates any suitable method for using knowledge graph to infer user activity and control related devices automatically including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Selective Bias

In particular embodiments, the smart home system 100 may use a variety of sensor inputs and metadata to determine likely activities or intents of the user. In particular embodiments, a false positive or a false negative may include a mismatch between the user's actual activities or intents and the activities or intents inferred by the smart home system 100. In particular embodiments, a false positive may include a mistaken action taken by the smart home system 100 based on the falsely inferred activities or intents while the smart home system 100 shouldn't take these actions. As an example and not by way of limitation, the smart home system 100 may mistakenly turn off a light in the living room based on the falsely inferred activity that the user has left the room while the user is actually still in the room. In particular embodiments, a false negative may include a mistaken scenario of lack of an action by the smart home system 100 based on the falsely inferred status of lack of certain activities or intents.

As an example and not by way of limitation, the smart home system 100 may mistakenly keep the light on based on the inferred status that the user may be still in the room but the user has actually left the room. In particular embodiments, the smart home system 100 may use the knowledge of how harmful a false positive is comparing to a false negative in a specific scenario to change a bias on that decision. As an example and not by way of limitation, the smart home system 100 may detect a user is moving in the bedroom at 12:05 am, but a false positive (i.e., a mistaken action) to turn on the light in the bedroom in the middle of the night may be very undesirable to the user (e.g., because another user may be asleep in the room too, and may be woken up if the lights are turned on). Thus, the smart home system 100 may not turn on the lights in the bedroom until it has determined that there is a very high likelihood that the user would like the lights turned on. As another example and not by way of limitation, a false positive (i.e., a mistaken action) to turn on the light at the entryway when a motion is detected is harmless in most scenarios, and therefore, the smart home system 100 may take action as soon as the motion is detected without waiting for a very high likelihood.

As another example and not by way of limitation, around dinner time, the smart home system 100 may incorrectly determine the user is going to cook based on the detected motion by the motion sensor or the thermal camera. The smart home system 100 may be aware that the user is in the kitchen and determine the user is going to cook before the user actually starts to cook. The downside for incorrectly determining that the user is going to cook is very low, and therefore the smart home system 100 may be biased to take the actions without waiting for more likelihood. If the user leaves the kitchen without starting to cook, the smart home system 100 may automatically transition back to the original state. In particular embodiments, the false negative or false positive for evaluating an activity may also be included in the knowledge base for functionality. As another example and not by way of limitation, turning off the light in living room when the smart home system determines the user has left the room may have very undesired by the user. When the smart home system determines the user has left the room but is not entirely sure (e.g., the system has calculated a relatively low probability that the user has left the room), the smart home system 100 may instead not turn off the light until the smart home system is more certain (e.g., the system updates its calculations to determine the user has a higher probability of having left the room). In particular embodiments, the smart home system 100 may score the false positive and false negative events and may change the thresholds for those events accordingly. In particular embodiments, the smart home system 100 may have default thresholds for the transition of states. As an example but not by way of limitation, the smart home system 100 may have a default threshold for detected motion to turn on the light in the bedrooms.

In particular embodiments, the default thresholds for transitions may be customized by demographic knowledge and other metadata available about the household. In particular embodiments, the smart home system 100 may ask the users questions to get feedback from the users. As examples and not by way of limitation, the questions may include "are you reading a book", "what do you want when reading a book", "how do you use your house", "do you like watching TV", "do you cook a lot", and "do you use microwave most of time". In particular embodiments, the smart home system 100 may use appropriate mechanisms and parameters to reach the users to initiate the interaction with users to confirm and refine the system. In particular embodiments, the smart home system 100 may use a machine learning (ML) algorithm to analysis the feedback information from the users. In particular embodiments, the smart home system 100 may customize the transition thresholds based on the users' feedback and may not treat every other input signals as learning data. In particular embodiments, the smart home system 100 may setup experience to establish the conversation with users. In particular embodiments, the mechanism used by the smart home system to establish conversation with the users may include, for example, but are not limited to a text or message user interface, an audio system including speaker and microphone, a control surface, a switch, or a sensor. In particular embodiments, the smart home system 100 may have transitions of states computed based on a variety of factors including, for example, time of day, specific room, or other metadata. Although this disclosure describes selective bias for determining the user's activities and intents in a particular manner, this disclosure contemplates selective bias for determining the user's activities and intents in any suitable manner.

Figure 8:
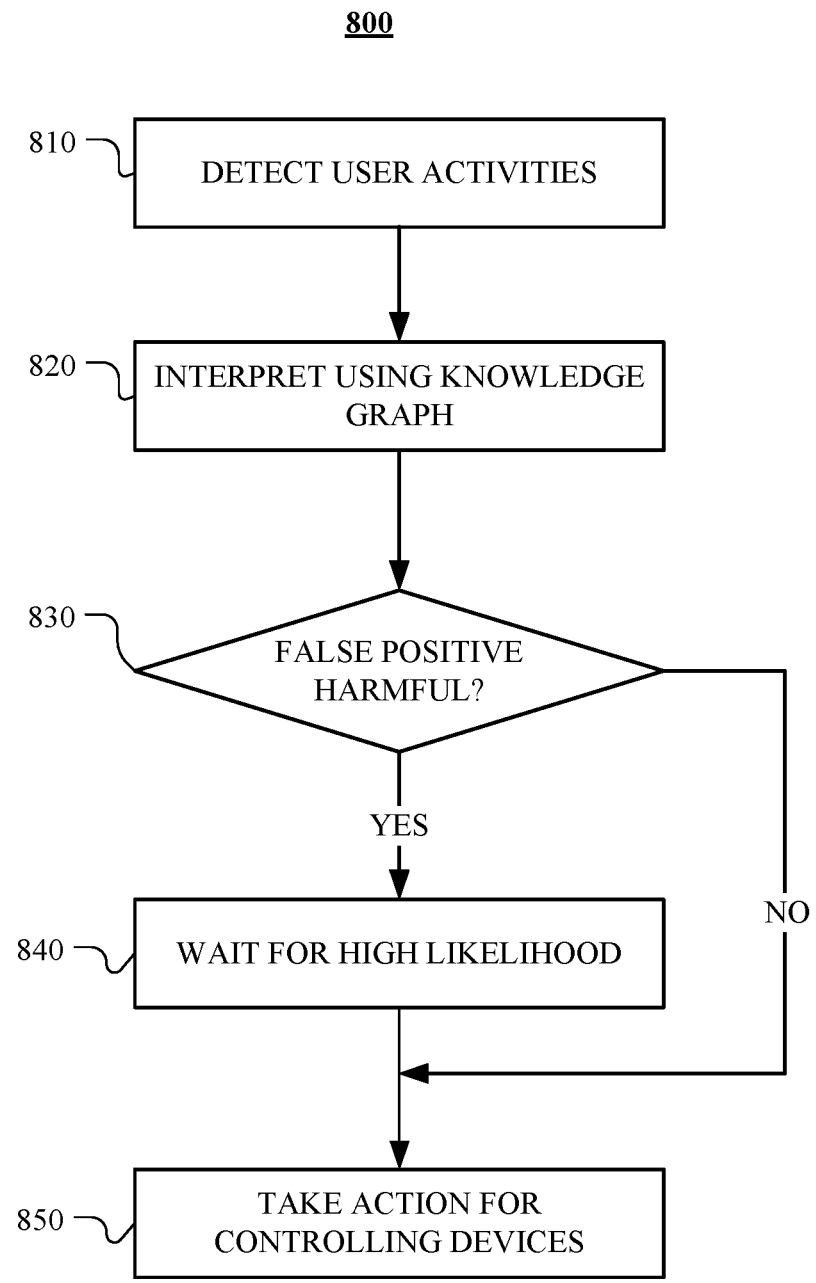
FIG. 8 illustrates an example method of controlling the devices using selective false positive bias.

FIG. 8 illustrates an example method of controlling the devices using selective false positive bias. In step 810, the smart home system 100 may detect the user activities using the sensor data. In step 820, the smart home system 100 may interpret the user activities using the knowledge graph with multiple layers of knowledge to decide the corresponding actions to take. In step 830, the smart home system 100 may check the level of harmfulness to the user for a false positive action to decide a selective bias for taking actions. If the false positive action is highly harmful to the user, the smart home system 100 may wait for high likelihood, in step 840, before taking actions for controlling the devices based on the detected user activities. If the false positive is not harmful to the user, the smart home system 100 may take actions immediately for controlling the devices in step 850 without waiting for high likelihood. In particular embodiments, the smart home system 100 may check the level of harmfulness for the false negative action. If the false negative action is highly harmful to the user, the smart home system 100 may take action immediately without waiting for high likelihood. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for detecting the user activities and controlling the devices of the smart home including the particular steps of the method of FIG. 8, this disclosure contemplates any suitable method for detecting the user activities and controlling the devices of the smart home including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Pattern Detection

In particular embodiments, the pattern detection subsystem may apply a machine learning algorithm to various sources of input data to detect patterns in user behavior. In particular embodiments, the various sources of input data may be recorded using multiple types of timekeeping, including, for example, but not limited to, the date, time zone, and the time of day, the time in seconds or milliseconds since midnight or another reference time, the time relative to celestial events on that day (e.g., solar noon, sunrise and sunset). The types of timekeeping may be expressed in the form of the most recent celestial event combined with a fraction of time passed between the most recent and the subsequent celestial event, for example, "sunrise start+0.5" may represent halfway between the start and end of sunrise. The time relative to culturally defined segments of that day, such as morning or afternoon, may be expressed as the current segment combined with a fraction of the time passed within the duration of the current segment, for example, "morning+0.5" may be halfway between morning and afternoon. The time may be relative to weather and ambient lighting changes, or relative to other events in the system, such as another input event or the start or end time of a session. In particular embodiments, the pattern detection subsystem may use the multiple types of timekeeping to improve the performance of the pattern detection system, and to enable it to express patterns based on one or more types of timekeeping, for example, "20 minutes before sunset" or "solar_noon+0.3". In particular embodiments, these detected patterns may be used for suggested automations. For example, if the user always turns off the outdoor light when checking if the front door is locked at a similar time at night, the system may offer to set up a daily automation. In particular embodiments, the detected patterns may be used for learning typical times of day for certain events to happen. For example, if dinner consistently happens between 7:30 and 8:30 pm, this information may enable the system to more reliably infer when dinner starts and ends as opposed to other activities in a similar space. In particular embodiments, the detected pattern may be used for learning typical or normal behavior for the tenants of the home, and registering an anomaly when there is a deviation from this typical or normal behavior. The anomaly detection system may generate anomalies based on a variety of conditions.

The anomaly detection system may generate anomalies based on current input information does not match typical or normal behavior. For example, daily routine indicates that users return home from work every weekday between 5 and 7 pm, but one day there is still no one home until 8 pm. The anomaly detection system may generate anomalies based on current input information conflicts with explicitly or implicitly set intents. For example, when the user has expressed to the system the intent to secure the house, and an intruder is detected. When an anomaly is detected, the anomaly detection system may attempt to inform the user by using the dialog system.

In particular embodiments, the smart home system 100 may detect a usage pattern or user behavioral pattern of user actions. In particular embodiments, the smart home system 100 may detect a pattern when the user repeats similar direct control actions on a regular basis. In particular embodiments, the smart home system 100 may offer to automate those actions for the user through a graphical user interface or other user interfaces.

In particular embodiments, when the user deviates from the routines, the smart home system 100 may notice and decide whether to engage the user based on what is likely happening and how important it is to behave differently based on the disambiguation the user can provide. As an example and not by way of limitation, the smart home system 100 may ask the user "are you coming home tonight" when no presence is detected at home at a time when there normally is presence. The answer may be used to determine whether to switch to a long-term or short-term away mode affecting alarm system, indoor and outdoor lights, thermostat, and etc. As another example and not by way of limitation, the smart home system 100 may detect a repeated pattern that the user turns the bedroom lights, (e.g., mood light or accent light) to similar setting before bed time every evening. The smart home system 100 may offer to make this a preset or automatically change these setting if the user enters the bedroom after a certain time in the evening. In particular embodiments, the smart home system 100 may ask the users questions to get information about the user's activities associated with detected patterns.

In particular embodiments, the questions that the smart home system 100 may ask the user may include, for example, "I am learning, do you mind if I ask question from time to time" or "just let me know what you are doing". In particular embodiments, the smart home system 100 may ask users questions through a speaker and receive the user's answer using a microphone. In particular embodiments, the smart home system 100 may send the user text message to ask questions and collect the answer from the replies of the user.

In particular embodiments, the smart home system 100 may use different mechanisms to establish a relationship with the user and re-engage the user. As an example and not by way of limitation, the smart home system 100 may further ask the questions including, for example, but not limited to "how do you like the light", or "would you like to fine-tune it". The user may come up with different answers such as "yes", "no", "not me", or other answers. The smart home system 100 may use the conversation with the user for introducing new features that the user has not used.

In particular embodiments, when the smart home system 100 is not specific for learning, the smart home system 100 may determine the best transition of states for the user without bothering the users. In particular embodiments, the transitions of states of the smart home system 100 may include, for example, but are not limited to turning on or off the light, changing the light temperature, changing the room temperature, actuating the blinds, or controlling and actuating other devices. As an example and not by way of limitation, the smart home system 100 may turn on the light in appropriate brightness and temperature for reading activities when the smart home system detects the user's reading activities. Although this disclosure describes usage and behavioral pattern detection in a particular manner, this disclosure contemplates usage and behavioral pattern detection in any suitable manner.

Figure 9:
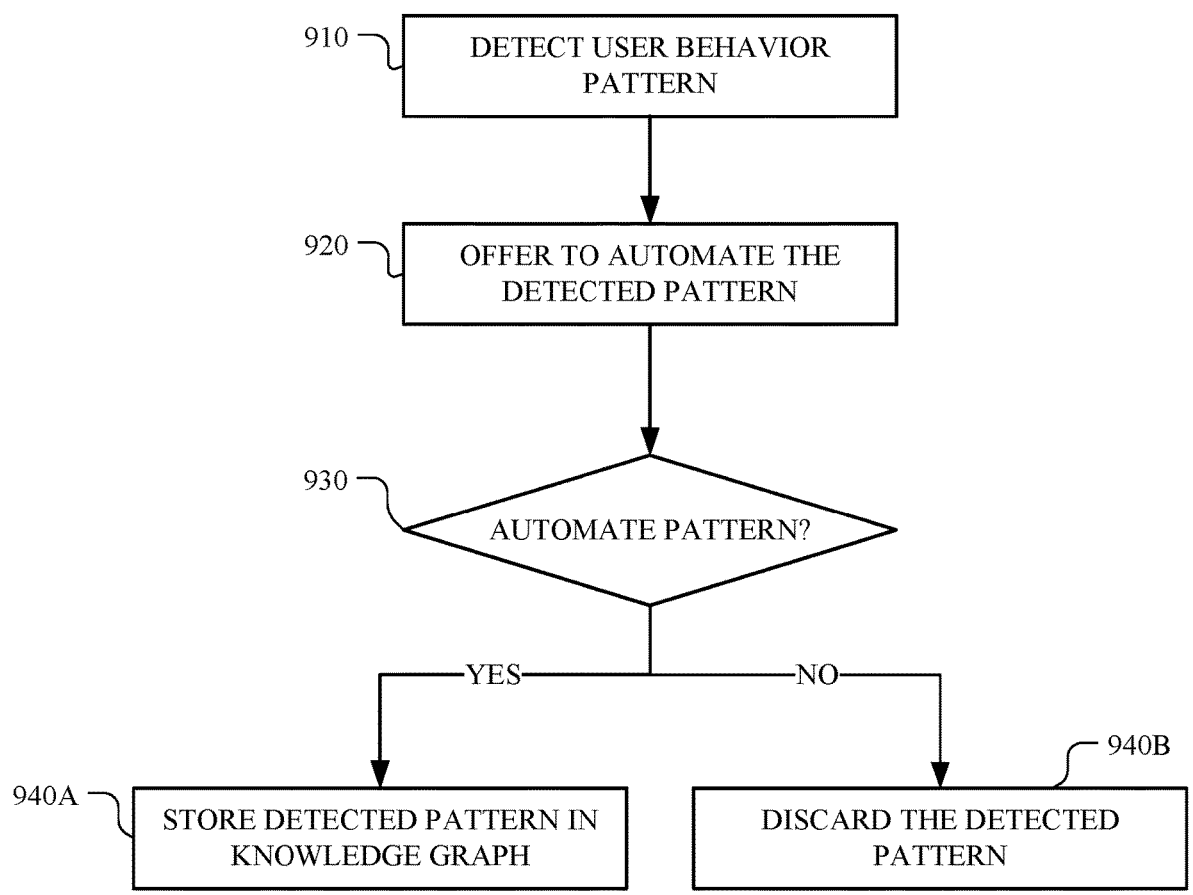
FIG. 9 illustrates a method of detecting the user behavioral pattern and automating the detected pattern.

FIG. 9 illustrates a method of detecting the user behavioral pattern and automating the detected pattern. In step 910, the smart home system 100 may detect a user behavior pattern based on the collected sensor data. In step 920, the smart home system 100 may offer to the user to automate the detected pattern. In particular embodiments, the smart home system 100 may promote the offer to the user using a speaker or a graphic user interface. In step 930, the smart home system 100 may check the user's response to confirm whether or not the user wants to automate the detected pattern. If the user confirms to automate the detected pattern, the smart home system 100 may store the detected pattern in the knowledge graph stored in the database and use the detected pattern to automatically control the device when the same pattern is detected in future in step 940A. If the user does not want to automate the detected pattern, the smart home system 100 may discard the detected behavior pattern in step 940B. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for detecting the user behavioral pattern and automating the detected pattern including the particular steps of the method of FIG. 9, this disclosure contemplates any suitable method for detecting the user behavioral pattern and automating the detected pattern including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Dynamic Setting Generation

In particular embodiments, the smart home system 100 may use approximate knowledge to generate and set settings for the controllable devices in the room to realize the environmental conditions as close as possible with the available capabilities. In particular embodiments, the controllable devices may have the capabilities to control the lighting conditions in the room. In particular embodiments, the approximate knowledge may include, for example, but are not limited to: (1) what are the lighting fixtures setup in a space including natural light attenuation devices like blinds, what are the relative locations of the lighting fixtures, and what light output they are capable of; (2) the overall lighting conditions in the space based on external lighting conditions; (3) a symbolic description of the desired lighting conditions in the room based on the user's expressed intent or the detected activity. In particular embodiments, the smart home system 100 may dynamically generate lighting setting based on the approximate knowledge. In particular embodiments, the smart home system 100 may obviate the needs for scenes as well as direct control and may generate default scenes for a space equipped with the smart home system.

Presence Tracking

In particular embodiments, the smart home system 100 may use a thermal imaging device to detect the user presence using a detected motion as an initial signal for presence. In particular embodiments, when the motion ends, the smart home system 100 may continue to detect the presence with a crop algorithm using the area where motion took place as an input signal. In particular embodiments, the smart home system 100 may use a thermal infrared video camera in fixed location to capture a sequence of frames. In particular embodiments, the smart home system 100 may compare each frame to the previous frame by generating a pixel by pixel difference mask to detect areas of change. In particular embodiments, the smart home system 100 may use basic thresholding of different masks to determine whether there is motion or not. In particular embodiments, the basic thresholding may include a minimum number of pixels or a minimum level of contrast per pixel. In particular embodiments, the smart home system 100 may use the detection of motion as a primary signal that there is presence. In particular embodiments, the smart home system 100 may group the disparate areas of pixels together if they are close enough together to belong to the same person or object moving through space and fill the blanks between the disparate areas to create a single "blob" that comprises the entire moving person or object. In particular embodiments, as the movement gets smaller with a partial subset of pixels in subsequent frames, the smart home system 100 may keep track of the previously larger dimensions for the blob. In particular embodiments, when the movement stops or at any earlier time, the smart home system 100 may perform an interactive crop by creating a boundary area around each pixel blob or its previously larger dimensions plus some padding proportional to the blob. In particular embodiments, the smart home system 100 may use a similarity analysis crop algorithm on the source image (e.g., the current frame image) to determine which of the pixels inside the area are different from the background. In particular embodiments, the background may include all the pixels that are not inside the crop areas. In particular embodiments, the smart home system 100 may use the presence of a substantial number of different pixels or foreground pixels in the crop areas to determine presence of a person. In particular embodiments, when there is no longer motion, the smart home system 100 may use the foreground pixel selection method as a secondary signal to determine presence allowing the system to maintain presence state independent of perceived motion.

Figure 10A:
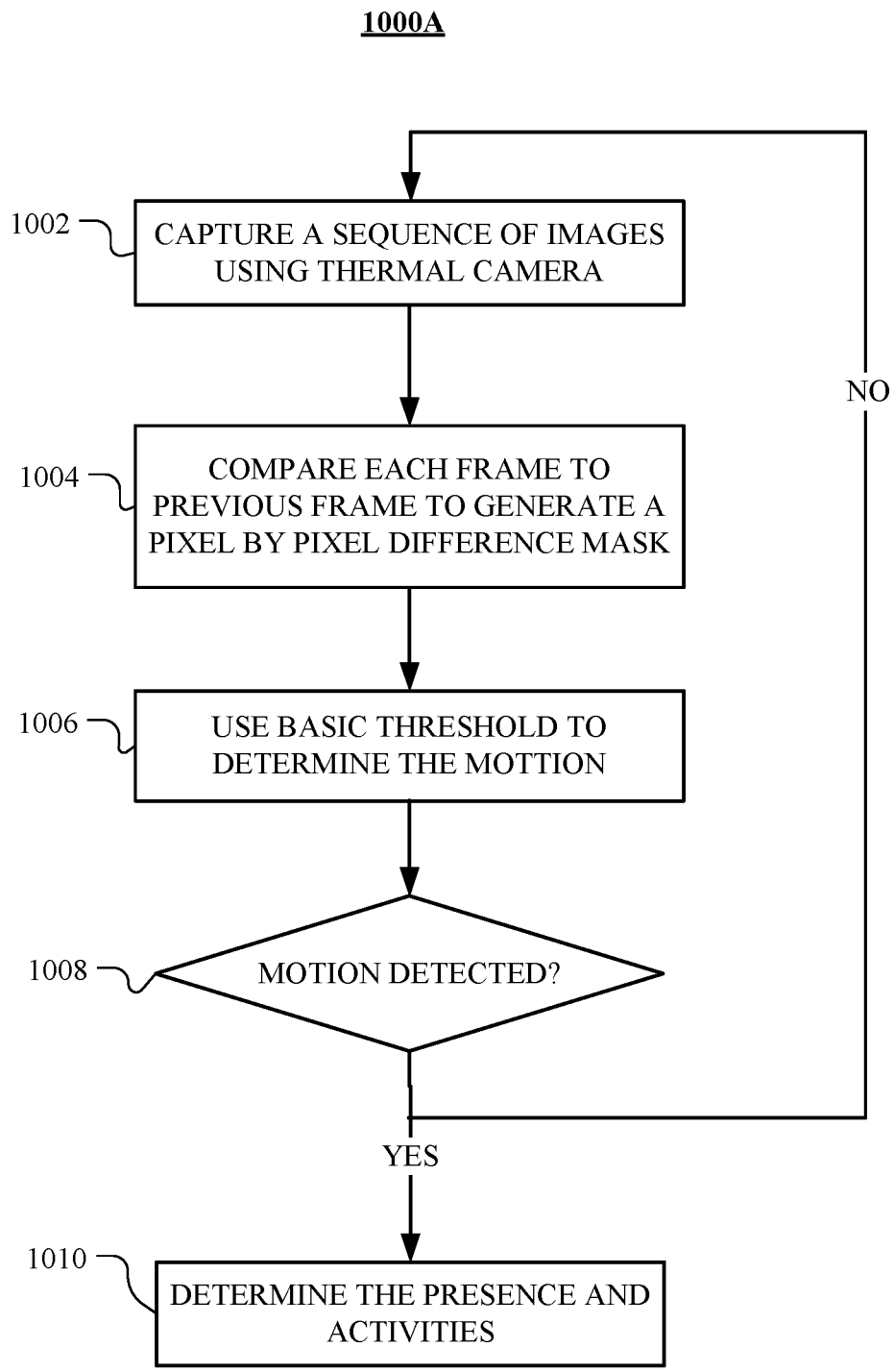
FIG. 10A illustrates a method of detecting the motion of the user.

FIG. 10A illustrates a method of detecting the motion of the user. In step 1002, the smart home system 100 may capture a sequence of images of a specific space using a thermal camera. In step 1004, the smart home system 100 may compare each frame of image to the previous frame to generate a pixel by pixel difference mask. In step 1006, the smart home system 100 may use a basic threshold of different masks to determine whether there is motion or not. In particular embodiments, the threshold may be a minimum number of pixels or a minimum level of contrast per pixel of the different masks. If the motion is detected, the smart home system 100 may use the detected motion as a primary signal of the user's presence and use the detected motion to identify the user's activities in step 1010. Although this disclosure describes and illustrates particular steps of the method of FIG. 10A as occurring in a particular order, this disclosure contemplates any suitable steps of the method of FIG. 10A occurring in any suitable order. Moreover, although this disclosure describes and illustrates an example method for detecting the motion of the user including the particular steps of the method of FIG. 10A, this disclosure contemplates any suitable method for detecting the motion of the user including any suitable steps, which may include all, some, or none of the steps of the method of FIG. 10A, where appropriate. Furthermore, although this disclosure describes and illustrates particular components, devices, or systems carrying out particular steps of the method of FIG. 10A, this disclosure contemplates any suitable combination of any suitable components, devices, or systems carrying out any suitable steps of the method of FIG. 10A.

Figure 10B:
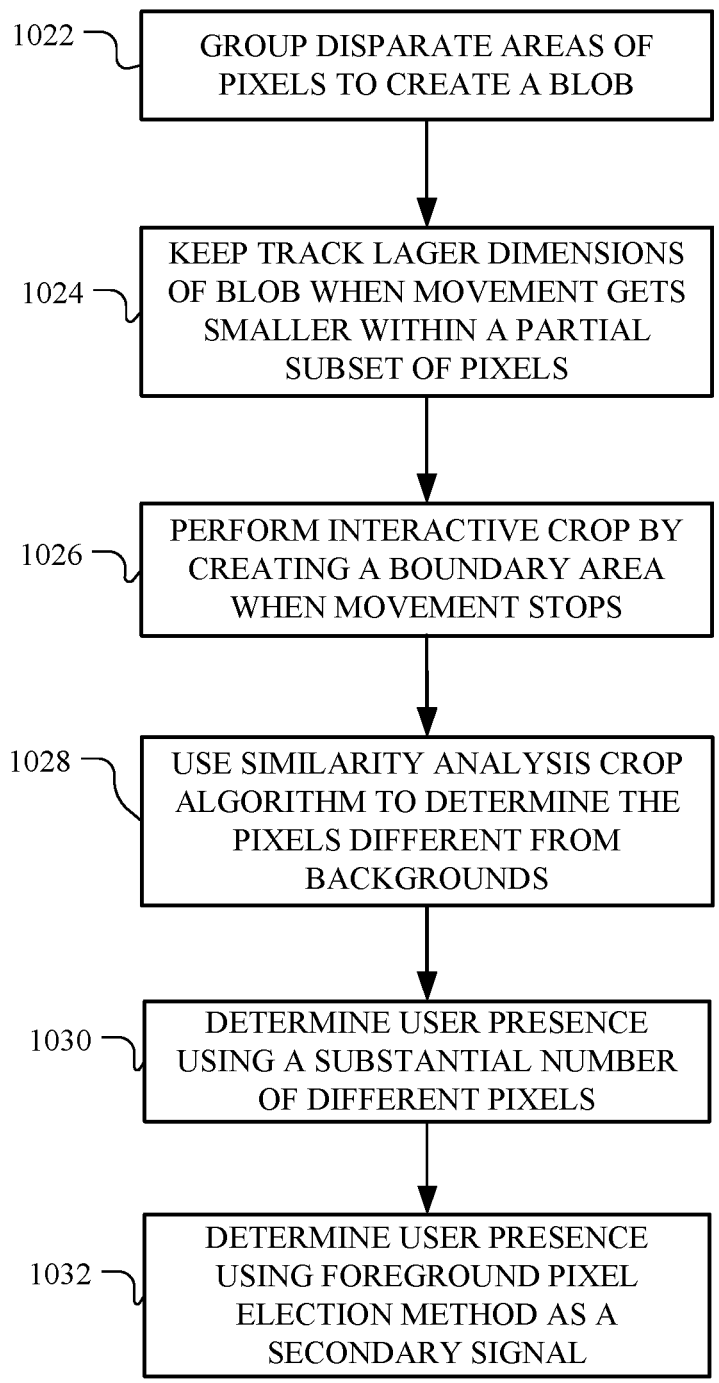
FIG. 10B illustrates a method of tracking the user presence using the detected motion as a primary signal.

FIG. 10B illustrates a method of tracking the user presence using the detected motion as a primary signal. In step 1022, the smart home system 100 may group the disparate areas of pixels together if the pixels are close enough to belong to the same person or object moving through the space. The smart home system 100 may fill the blanks between the pixels to create a single "blob" comprising the entire person or object. In step 1024, the smart home system 100 may keep tracking of the previous large dimension for the blob when the movement gets smaller within a partial subset of pixels in subsequent frames. In step 1026, when movement stops, the smart home system 100 may perform an interactive crop by creating a boundary area around each pixel blob. In step 1028, the smart home system 100 may use a similarity analysis crop algorithm on the source image (e.g., current frame image) to determine which of the pixels inside the area are different from the background which includes all the pixels not inside the crop areas. In step 1030, the smart home system 100 may determine the user presence using the presence of a substantial number of different foreground pixels in the crop areas. In step 1032, when there is no longer motion, the smart home system 100 may determine the user presence using the foreground pixel section method as a secondary signal and allow the system to maintain presence state independent of perceived motion. Although this disclosure describes and illustrates particular steps of the method of FIG. 10B as occurring in a particular order, this disclosure contemplates any suitable steps of the method of FIG. 10B occurring in any suitable order. Moreover, although this disclosure describes and illustrates an example method for tracking the user presence including the particular steps of the method of FIG. 10B, this disclosure contemplates any suitable method for tracking the user presence including any suitable steps, which may include all, some, or none of the steps of the method of FIG. 10B, where appropriate. Furthermore, although this disclosure describes and illustrates particular components, devices, or systems carrying out particular steps of the method of FIG. 10B, this disclosure contemplates any suitable combination of any suitable components, devices, or systems carrying out any suitable steps of the method of FIG. 10B.

Dynamic Scheduling

In particular embodiments, the smart home system 100 may use a mix of sensor data and programmed routines to dynamically trigger setting changes in the controlled devices. In particular embodiments, the programmed routines may include, for example, but are not limited to user-specified routines, system-default routines, or system generated routines. As an example and not by way of limitation, the smart home system 100 may set up a fuzzy schedule that activates the dinner scene every weekday around dinner time as soon as people start sitting down at the dinner table instead of scheduling a "dinner" scene to activate every weekday on a specific time such as 6:30 pm. In particular embodiments, the smart home system 100 may ask user the questions to get information about the user's schedule instead of programming a bunch of schedule in the system. In particular embodiments, the questions that the smart home system 100 may ask the user may include, for example, but are not limited to "what you do", "how do you do these things", or "how do you like the light to be when doing these things". In particular embodiments, the smart home system 100 may capture the information from the user's answers and may use this information to customize the knowledge graph about users. In particular embodiments, the smart home system 100 may further ask questions to the users in a later time.

Routine Tuning

In particular embodiments, the smart home system 100 may use a guided and unguided learning process to tune the routines in the system knowledge base. In particular embodiments the smart home system 100 may use a guided learning process involving the user's inputs and review. The smart home system 100 may start with the sane defaults and use various mechanisms to refine the defaults. When the smart home system is installed in a house, each room of the home may have designated names and meaningful descriptions comprising semantic meaningful concepts. The smart home system 100 may use the meaningful descriptions of each room as a part of the knowledge graph for making decisions. The smart home system 100 may create a hybrid approach between hard-coded heuristics, configurability, and training to refine the system's knowledge of routines in the household.

In particular embodiments, the smart home system 100 may start from a system that has global and approximate routines. As an example and not by way of limitation, dinners are usually between 5 pm and 8 pm in most household. In particular embodiments, the smart home system 100 may refine the routines based on provided demographic information and other metadata of the tenants in the home that are likely correlated with certain modifications to the global defaults. As an example and not by way of limitation, if there are school-going children in the family, dinner is likely to start at a time very close to the same time in every weekday.

In particular embodiments, the smart home system 100 may allow the users to directly input some aspects of the default routines to further refine the routines. As an example and not by way of limitation, the user may refine the routines by telling the smart home system that the user never eats before 5 pm.

In particular embodiments, the smart home system 100 may use actual usage data to further refine the routines. As an example and not by way of limitation, the actual usage data may be "nobody shows up at the dinner table before 6:20 pm on Thursday". In particular embodiments, the smart home system 100 may allow the user to give inputs to the knowledge graph directly or indirectly. As an example and not by way of limitation, the user may give inputs to the smart home system such as "I never want light in this room when there is motion between these hours", "I tend to prefer less light when reading", "I tend to prefer more light when reading", or "my partner wants less light when reading".

All these different inputs from the users may be stored in the knowledge graph in the database. In particular embodiments, the smart home system 100 may use the knowledge graph for making all decisions in order for the system to be consistent. In particular embodiments, the user may give the smart home system hard and fast rules like "never do this" and the rules may be stored in the same data structure for the knowledge graph. In particular embodiments, the users may not need to setup any rule for the smart home system and the smart home system 100 may monitor user behavior and feedback and automatically determine the best transitions for the users.

Example Method

Figure 11:
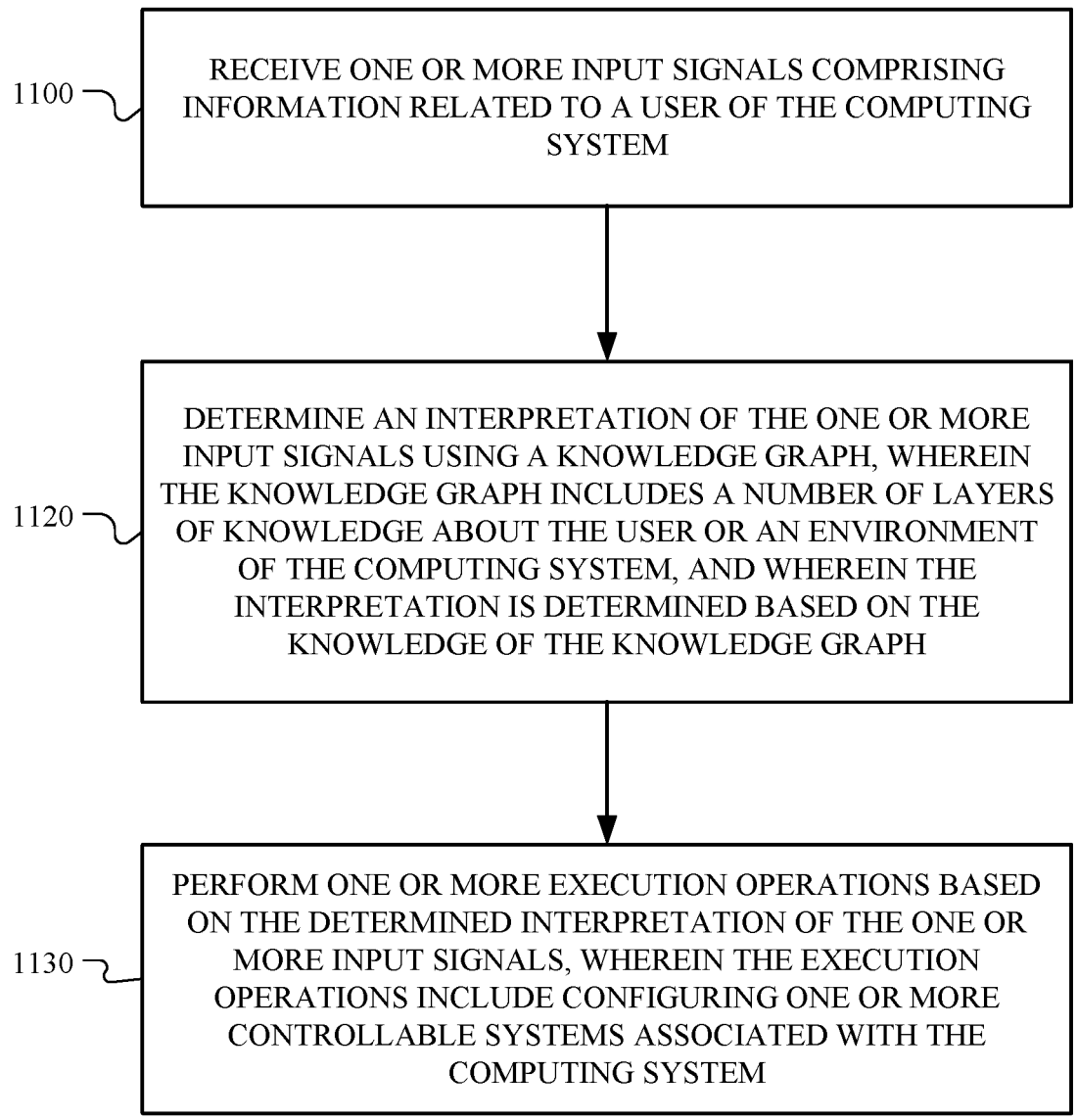
FIG. 11 illustrates an example method for interpreting input signals using knowledge graph and configuring controllable systems based on the interpretation of the input signals.

FIG. 11 illustrates an example method 1100 for interpreting input signals using knowledge graph and configuring controllable systems based on the interpretation of the input signals. The method may begin at step 1100, where a computing system may receive one or more input signals comprising information related to a user of the computing system. At step 1120, the system may determine an interpretation of the one or more input signals using a knowledge graph. The knowledge graph may include a number of layers of knowledge about the user or an environment of the computing system. The interpretation of the input signals may be determined based on one or more layers of knowledge in the knowledge graph. At step 1130, the system may perform one or more execution operations based on the determined interpretation of the one or more input signals. The execution operations may include configuring one or more controllable systems associated with the computing system based on the interpretation of the one or more input signals. In particular embodiments, the one or more input signals may include, for example, but are not limited to, a declarative command of the user, an interactive operation of the user, a sensor signal related to an activity of the user, a sensor signal related to the environment of the computing system, a message received through a cloud, a system generated input, etc.

In particular embodiments, the one or more controllable systems of the computing system may be configured based on the interpretation of the one or more input signals. The execution operations may include, for example, but are not limited to, initiating a communication to the user through a dialog system, logging data related to the one or more input signals or one or more status parameters of the environment, updating one or more hardware elements of the computing system, updating one or more software elements of the computing system, updating one or more status of the computing system, updating one or more knowledge elements of the plurality of layers of knowledge of the knowledge graph, etc.

In particular embodiments, the interpretation of the input signals may include an inferred intent of the user. The one or more controllable systems of the computing system may be configured based on the inferred intent of the user. In particular embodiments, the interpretation of the input signals may include an inferred activity of the user. The one or more controllable systems of the computing system may be configured based on the inferred activity of the user. In particular embodiments, the system may determine contextual information of the environment of the computing system based on one or more sensors associated with the environment of the computing system. The interpretation of the one or more input signals may be determined dynamically based at least on the contextual information of the environment. In particular embodiments, the contextual information may include, for example, but are not limited to, a time of day, a daylight condition, a user preference, a maximum light output of a lighting device, a relative color temperature of a light device, a device replacement, a correlation of a brightness setting and a light output level, location of the user within the environment, etc.

In particular embodiments, the multiple layers of knowledge in the knowledge graph may include one or more knowledge components including, for example, but not limited to, an activity associated with a place of the environment, a lighting condition associated with an activity, a lighting type associated with a light fixture, a configuration of the computing system, a setting of a controllable system associated with the computing system, a preference of the user, a routine of the user, an activity pattern of the user, an activity category of the user, a characteristic of a user activity, a threshold value for a related parameter, a confidence level of an interpretation, a harm level of an execution operation, a pre-determined command of the user, a location of a device of the computing system, a 3D model of the environment, a calendar of the user, a generical knowledge component a specific knowledge component, a contextual information component of the environment, etc.

In particular embodiments, the system may use a rule engine, which may include a number of rules, to determine the execution operations. The system may track one or more user sections using one or more sensors associated with the environment of the computing system. The system may perform a conflict resolution operation based on the rules and the one or more user sections. The conflict resolution operation may be performed based on contextual information of the environment, previously monitored user behaviors or a disambiguation input from the user. In particular embodiments, the system may generate one or more rewritten execution operations by performing a rewriting process on one or more of the execution operations based on results of the conflict resolution operation and perform the one or more rewritten execution operations. In particular embodiments, the system may detect, using a machine learning algorithm, a user behavior pattern using a number of input data sources. The system may present, through a user interface and to the user, a recommendation for automating the detected user behavior pattern. The system may receive a positive confirmation from the user through the user interface and store the detected user behavior pattern in the knowledge graph.

In particular embodiments, the system may generate a setting for a controllable system associated with the computing system based on an approximate knowledge component in the knowledge graph. In particular embodiments, the system may determine a harm level for a false positive execution of an execution operation. The system may keep the computing system from performing the execution operation when the harm level of the false positive execution is above a threshold harm level. The system may perform the execution operation when the harm level of the false positive execution is below a threshold harm level. In particular embodiments, the system may determine a confidence level of the interpretation of the one or more input signals and perform the execution operation when the confidence level is above a threshold confidence level. In particular embodiments, the system may initiate a communication to the user when the confidence level of the interpretation is below the threshold confidence level. The system may receive one or more user inputs in response to the communication. The system may disambiguate the interpretation of the one or more input signals based on the received one or more user inputs. The system may refine one or more execution operations based on the disambiguated interpretation. In particular embodiments, the system may determine, using an anomaly detection system, that an urgent event is happening in the environment of the computing system. The system may send an urgent message to the user through a user interface. The urgent message may have a high priority score among a number of messages being sent to the user. In particular embodiments, the system may capture a sequence of images using a camera associated with computing system.

The system may generate a difference mask by comparing each frame to a previous frame and detect a motion event based on one or more thresholds associated with the difference mask. Then, the system may determine a presence of the user based on the detected motion event.

Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for interpreting input signals using knowledge graph and configuring controllable systems based on the interpretation of the input signals including the particular steps of the method of FIG. 11, this disclosure contemplates any suitable method for interpreting input signals using knowledge graph and configuring controllable systems based on the interpretation of the input signals including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Computer Systems

Figure 12:
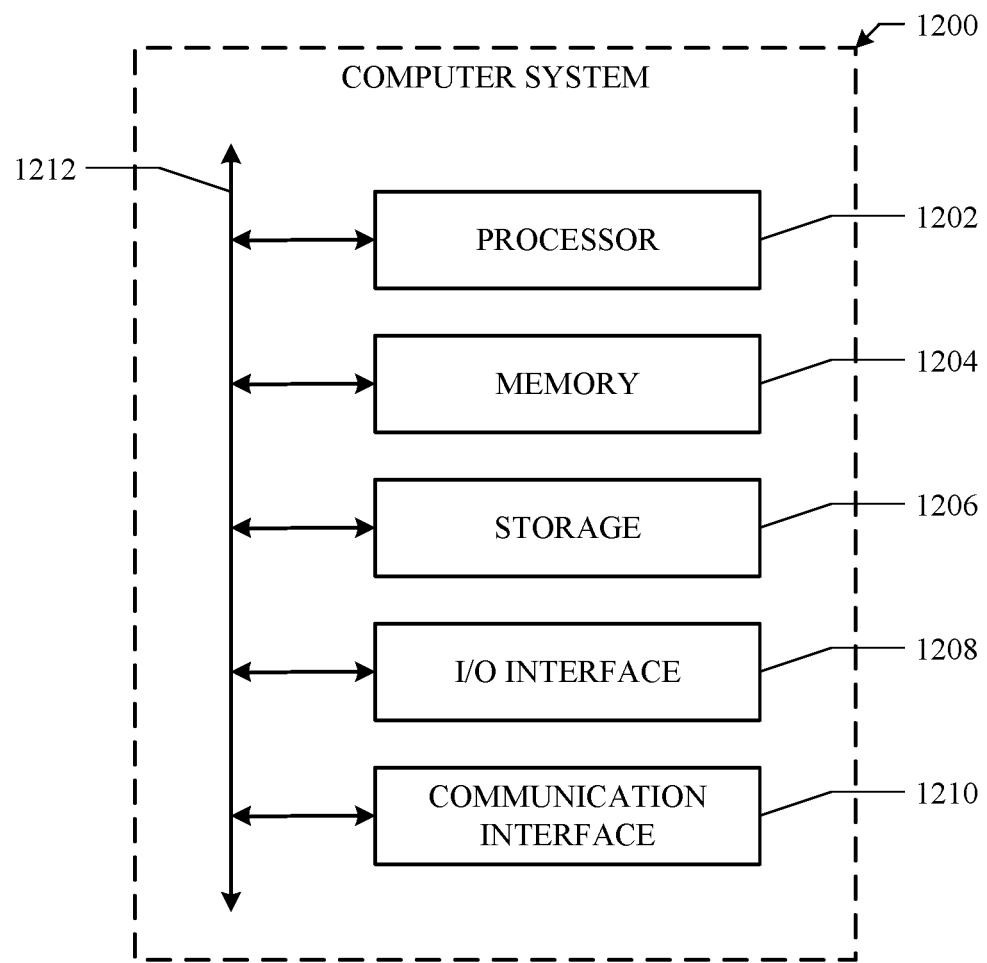
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide the functionalities described or illustrated herein. In particular embodiments, software running on one or more computer systems 1200 performs one or more steps of one or more methods described or illustrated herein or provides the functionalities described or illustrated herein. Particular embodiments include one or more portions of one or more computer systems 1200. Herein, a reference to a computer system may encompass a computing device, and vice versa, where appropriate. Moreover, a reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 that are to be operated on by computer instructions; the results of previous instructions executed by processor 1202 that are accessible to subsequent instructions or for writing to memory 1204 or storage 1206; or any other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs), be a multi-core processor, or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described in further detail below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving, by the computing system, input signals comprising one or more user inputs from a user of the computing system and sensor data from one or more sensors associated with an environment of the computing system;
   determining, by the computing system, that the one or more user inputs comprise ambiguous information;
   in response to determining that the one or more user inputs comprise ambiguous information, automatically determining, by the computing system, an interpretation of the one or more user inputs based on (1) a knowledge graph comprising a plurality of layers of pre-determined knowledge about one or more preferences of the user and the environment of the computing system, (2) the sensor data received from the one or more sensors associated with the environment of the computing system, and (3) the ambiguous information of the one or more user inputs, wherein the interpretation disambiguates the ambiguous information in the one or more user inputs, and wherein the interpretation comprises an inferred intent of the user, and wherein the inferred intent is associated with a confidence score;
   in response to a determination that the confidence score of the inferred intent is lower than a threshold confidence score, predicting, by the computing system, a degree of an adverse impact of one or more execution operations based on the inferred intent of the user, wherein the adverse impact results from a possibility of a mismatch between the inferred intent and an actual intent of the user and is determined based on the sensor data and the pre-determined knowledge about the environment; and in response to a determination that the degree of the adverse impact is less than a threshold degree of impact, performing, by the computing system, the one or more execution operations based on the inferred intent of the user, wherein the execution operations comprise configuring one or more controllable systems associated with the computing system.

2. The method of claim 1, wherein the one or more user inputs comprise one or more of: a declarative command of the user; an interactive operation of the user; or a message received through a cloud, and wherein the sensor data comprises one or more of: a sensor signal related to an activity of the user; a sensor signal related to the environment of the computing system; or a system generated input.

3. The method of claim 1, wherein the one or more controllable systems associated with the computing system are configured based on the inferred intent of the user.

4. The method of claim 1, wherein the interpretation comprises an inferred activity of the user, and wherein the one or more controllable systems associated with the computing system are configured based on the inferred activity of the user.

5. The method of claim 1, further comprising:
determining contextual information of the environment of the computing system based on the one or more sensors associated with the environment of the computing system and the pre-determined knowledge in the knowledge graph about the environment of the computing system, wherein the interpretation of the one or more user inputs is determined dynamically based at least on the contextual information of the environment.

6. The method of claim 5, wherein the contextual information comprises one or more of:
a time of day;
a daylight condition;
a user preference;
a maximum light output of a lighting device;
a relative color temperature of a light device;
a device replacement;
a correlation of a brightness setting and a light output level; or
a location of the user within the environment.

7. The method of claim 1, wherein the one or more execution operations comprise one or more of:
outputting control signals to one or more actuators or switches associated with the environment of the computing system;
initiating a communication to the user through a dialog system;
logging data related to the input signals or one or more status parameters of the environment of the computing system;
configuring the one or more hardware components associated with the computing system;
updating one or more software components associated with the computing system;
updating one or more status of the computing system; or
updating one or more knowledge elements of the plurality of layers of pre-determined knowledge of the knowledge graph.

8. The method of claim 1, wherein the plurality of layers of pre-determined knowledge in the knowledge graph comprises one or more pre-determined knowledge components comprising one or more of:
an activity associated with a place of the environment;
a lighting condition associated with an activity;
a lighting type associated with a light fixture;
a configuration of the computing system;
a setting of a controllable system associated with the computing system;
a preference of the user;
a routine of the user;
an activity pattern of the user;
an activity category of the user;
a characteristic of a user activity;
a threshold value for a related parameter;
a confidence level of an interpretation;
a harm level of an execution operation;
a pre-determined command of the user;
a location of a device in the environment of the computing system;
a 3D model of the environment;
a calendar of the user;
a generical knowledge component;
a specific knowledge component; or
a contextual information component of the environment.

9. The method of claim 1, wherein the one or more execution operations are determined using a rule engine comprising a plurality of rules, further comprising:
determining a priority for one or more user activities using the one or more sensors associated with the environment of the computing system; and
performing a conflict resolution operation based on the plurality of rules and the priority of the one or more user activities.

10. The method of claim 9, wherein the conflict resolution operation is based on contextual information of the environment of the computing system, previously monitored user activities, or subsequent user inputs from the user.

11. The method of claim 10, further comprising:
adjusting the one or more execution operations based on results of the conflict resolution operation; and
performing one or more adjusted execution operations.

12. The method of claim 1, further comprising:
detecting, using a machine learning algorithm, a user behavior pattern based at least on the input signals;
presenting, through a user interface and to the user, a recommendation for automating the detected user behavior pattern;
receiving a positive confirmation from the user through the user interface; and
storing the detected user behavior pattern in the knowledge graph.

13. The method of claim 1, wherein the knowledge graph comprises one or more approximate knowledge components, and wherein the interpretation is determined based on the one or more approximate knowledge components in the knowledge graph.

14. The method of claim 1, further comprising:
capturing a sequence of images using a camera associated with computing system;
generating a difference mask by comparing each frame to a previous frame;
detecting a motion event based on one or more thresholds associated with the difference mask; and
determining a presence of the user based on the detected motion event.

15. The method of claim 1, further comprising:
in response to a determination that the degree of the adverse impact is greater than the threshold degree of impact, holding the one or more execution operations from being executed.

16. The method of claim 1, further comprising:
in response to a determination that the degree of the adverse impact is greater than the threshold degree of impact, determining an adjusted inferred intent of the user based on contextual information of the environment; and determining one or more subsequent execution operations based on the adjusted inferred intent of the user.

17. The method of claim 1, wherein the one or more sensors comprise one or more thermal image sensors, and wherein the one or more execution operations are determined based on one or more motions detected using the one or more thermal image sensors.

18. The method of claim 17, wherein the one or more motions are detected by:

generating a background image comprising a noise pattern for a scene based on previously images of the scene captured by the one or more thermal imaging sensors;

detecting a motionless object based on a comparison between a subsequent image captured by the one or more thermal imaging sensors and the background image;

updating the background image in response to a temperature change in a pixel area being above a pre-determined threshold, wherein the background image is updated by substituting one or more pixel values in the pixel area of the background image with one or more new pixel values in a new subsequent image; and comparing the background image to a current image captured by the one or more thermal image sensors.

19. The method of claim 17, further comprising:

capturing a series of images of a scene using the one or more thermal image sensors;

detecting one or more motions of an object in the scene based on the series of images;

grouping one or more pixel areas in the current image associated with the object into a pixel group area in response to a determination that the one or more pixel areas being are within a threshold distance to each other;

tracking one dimension of the pixel group area when the object moves in the scene; and separating background pixels from foreground pixels based on the tracked pixel group area, wherein the one or more motions are determined based on the background pixels and the foreground pixels separated based on the tracked pixel group area.

20. One or more computer-readable non-transitory storage media embodying software that is operable when executed to:

receive, by the computing system, input signals comprising one or more user inputs from a user of the computing system and sensor data from one or more sensors associated with an environment of the computing system;

determine, by the computing system, that the one or more user inputs comprise ambiguous information;

in response to determining that the one or more user inputs comprise ambiguous information, automatically determine, by the computing system, an interpretation of the one or more user inputs based on (1) a knowledge graph comprising a plurality of layers of pre-determined knowledge about one or more preferences of the user and the environment of the computing system, (2) the sensor data received from the one or more sensors associated with the environment of the computing system, and (3) the ambiguous information of the one or more user inputs, wherein the interpretation disambiguates the ambiguous information in the one or more user inputs, and wherein the interpretation comprises an inferred intent of the user, and wherein the inferred intent is associated with a confidence score;

in response to a determination that the confidence score of the inferred intent is lower than a threshold confidence score, predict, by the computing system, a degree of an adverse impact of one or more execution operations based on the inferred intent of the user, wherein the adverse impact results from a possibility of a mismatch between the inferred intent and an actual intent of the user and is determined based on the sensor data and the pre-determined knowledge about the environment; and in response to a determination that the degree of the adverse impact is less than a threshold degree of impact, perform, by the computing system, the one or more execution operations based on the inferred intent of the user, wherein the execution operations comprise configuring one or more controllable systems associated with the computing system.

21. A computing system comprising: one or more processors; and one or more computer-readable non-transitory storage media coupled to one or more of the processors and comprising instructions operable when executed by one or more of the processors to cause the system to:

receive, by the computing system, input signals comprising one or more user inputs from a user of the computing system and sensor data from one or more sensors associated with an environment of the computing system;

determine, by the computing system, that the one or more user inputs comprise ambiguous information;

in response to determining that the one or more user inputs comprise ambiguous information, automatically determine, by the computing system, an interpretation of the one or more user inputs based on (1) a knowledge graph comprising a plurality of layers of pre-determined knowledge about one or more preferences of the user and the environment of the computing system, (2) the sensor data received from the one or more sensors associated with the environment of the computing system, and (3) the ambiguous information of the one or more user inputs, wherein the interpretation disambiguates the ambiguous information in the one or more user inputs, and wherein the interpretation comprises an inferred intent of the user, and wherein the inferred intent is associated with a confidence score;

in response to a determination that the confidence score of the inferred intent is lower than a threshold confidence score, predict, by the computing system, a degree of an adverse impact of one or more execution operations based on the inferred intent of the user, wherein the adverse impact results from a possibility of a mismatch between the inferred intent and an actual intent of the user and is determined based on the sensor data and the pre-determined knowledge about the environment; and in response to a determination that the degree of the adverse impact is less than a threshold degree of impact, perform, by the computing system, the one or more execution operations based on the inferred intent of the user, wherein the execution operations comprise configuring one or more controllable systems associated with the computing system.

* * * * *